United States Patent
Lange-Mao et al.

(10) Patent No.: US 11,999,290 B2
(45) Date of Patent: Jun. 4, 2024

(54) COMPONENT FOR VEHICLE INTERIOR

(71) Applicant: Shanghai Yanfeng Jinqiao Automotive Trim Systems Co. Ltd., Novi, MI (US)

(72) Inventors: Wei Lange-Mao, Hagen (DE); Christian Kitzel, Kaarst (DE); Iris Wegner, Neuss (DE)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 18/119,817

(22) Filed: Mar. 9, 2023

(65) Prior Publication Data

US 2023/0278490 A1    Sep. 7, 2023

Related U.S. Application Data

(63) Continuation of application No. PCT/US2021/049869, filed on Sep. 10, 2021.
(Continued)

(51) Int. Cl.
*B60Q 3/62* (2017.01)
*B60H 1/22* (2006.01)
(Continued)

(52) U.S. Cl.
CPC ............ *B60Q 3/62* (2017.02); *B60H 1/2227* (2019.05); *B60Q 3/217* (2017.02); *B60Q 9/00* (2013.01);
(Continued)

(58) Field of Classification Search
CPC ........ B60R 13/0243; B60R 2013/0287; B60H 1/2227; B60Q 3/57; B60Q 3/62; B60Q 3/64
See application file for complete search history.

(56) References Cited

U.S. PATENT DOCUMENTS 5,210,801 A     5/1993   Fournier et al.
5,994,722 A    11/1999   Averbeck et al.
(Continued)

FOREIGN PATENT DOCUMENTS

CN        206575646 U     10/2017
DE    10 2012 110 153 A1   8/2013
(Continued)

OTHER PUBLICATIONS

International Search Report and Written Opinion received for International PCT Application Serial No. PCT/US21/49869 dated Feb. 4, 2022, 17 pages.

*Primary Examiner* — Matthew J. Peerce
(74) *Attorney, Agent, or Firm* — Amin, Turocy & Watson, LLP

(57) ABSTRACT

A component for a vehicle interior configured to be illuminated by a light source may comprise a substrate; a light guide; and a cover comprising an exterior surface. The light guide may transmit light between the substrate and the cover. The cover may be at least partially light-transmissive. The cover may present an effect on the exterior surface. The effect may comprise an illumination/dynamic lighting effect when illuminated. The cover may comprise a profile configured to present a visual effect and/or a surface effect. The component may comprise a concealed heating element between a cover base and a cover layer of the cover. The heating element may comprise a three-dimensional form behind the cover. The cover layer may be formed into a three-dimensional form and the cover base may be formed into a three-dimensional form for the surface effect. The light guide may comprise micro-optical structures.

14 Claims, 39 Drawing Sheets

Related U.S. Application Data

(60) Provisional application No. 63/077,152, filed on Sep. 11, 2020.

(51) Int. Cl.
    *B60Q 3/217*    (2017.01)
    *B60Q 9/00*    (2006.01)
    *B60R 13/02*    (2006.01)

(52) U.S. Cl.
    CPC .. *B60R 13/0243* (2013.01); *B60R 2013/0287* (2013.01)

(56) References Cited

U.S. PATENT DOCUMENTS

| | | | |
|---|---|---|---|
| 6,144,424 A | 11/2000 | Okuda et al. | |
| 6,566,824 B2 | 5/2003 | Panagotacos et al. | |
| 6,594,417 B1 | 7/2003 | Hulse | |
| 6,733,166 B2 | 5/2004 | Hulse | |
| 6,915,062 B2 | 7/2005 | Hulse et al. | |
| 7,344,277 B2 | 3/2008 | Anderson, Jr. et al. | |
| 7,862,220 B2 | 1/2011 | Cannon et al. | |
| 8,264,622 B2 | 9/2012 | Gourlay | |
| 8,358,207 B2 | 1/2013 | Lenneman et al. | |
| 8,373,821 B2 | 2/2013 | Sampsell et al. | |
| 8,419,986 B2 | 4/2013 | Gourlay | |
| 8,467,013 B2 | 6/2013 | Gourlay | |
| 9,010,983 B2 | 4/2015 | Gourlay | |
| 9,077,345 B2 | 7/2015 | Gourlay | |
| 9,086,516 B2 | 7/2015 | Gourlay | |
| 9,109,776 B2 | 8/2015 | Smith | |
| 9,168,864 B2 | 10/2015 | Anderson et al. | |
| 9,214,101 B2 | 12/2015 | Richmond et al. | |
| 9,243,780 B2 | 1/2016 | Anderson et al. | |
| 9,285,531 B2 | 3/2016 | Sherman et al. | |
| 9,340,151 B2 | 5/2016 | Ramey et al. | |
| 9,354,376 B2 | 5/2016 | Englert | |
| 9,625,641 B2 | 4/2017 | Gourlay | |
| 9,709,721 B2 | 7/2017 | Gourlay | |
| 9,949,334 B2 | 4/2018 | Salter et al. | |
| 9,950,659 B2 | 4/2018 | Backes | |
| 10,059,259 B2 | 8/2018 | Cannon et al. | |
| 10,059,263 B2 | 8/2018 | Paszkowicz et al. | |
| 10,196,010 B2 | 2/2019 | Haas et al. | |
| 10,343,622 B2 | 7/2019 | Dellock et al. | |
| 10,364,961 B2 | 7/2019 | Irgang et al. | |
| 10,449,911 B2 | 10/2019 | Stössel et al. | |
| 10,480,775 B2 | 11/2019 | Yamada | |
| 10,486,587 B2 | 11/2019 | Irgang et al. | |
| 10,549,687 B2 | 2/2020 | Fleurence | |
| 10,562,446 B2 | 2/2020 | Cannon | |
| 10,576,878 B2 | 3/2020 | Lenz et al. | |
| 10,746,918 B2 | 8/2020 | Irgang et al. | |
| 10,864,851 B2 | 12/2020 | Eitel et al. | |
| 10,939,836 B2 | 3/2021 | Gourlay et al. | |
| 10,974,663 B2 * | 4/2021 | Cannon | H05B 3/86 |
| 11,460,721 B2 | 10/2022 | Rosero et al. | |
| 2006/0239001 A1 | 10/2006 | Mandler et al. | |
| 2008/0144333 A1 * | 6/2008 | Gourlay | G09F 9/305 264/1.24 |
| 2009/0219730 A1 | 9/2009 | Syfert et al. | |
| 2014/0328082 A1 | 11/2014 | Gourlay | |
| 2015/0043243 A1 | 2/2015 | Gourlay | |
| 2015/0274066 A1 | 10/2015 | Del Pozo Gonzalez et al. | |
| 2016/0311366 A1 | 10/2016 | Lisseman | |
| 2018/0037174 A1 | 2/2018 | Seegers et al. | |
| 2018/0238513 A1 | 8/2018 | Measel et al. | |
| 2019/0064431 A1 | 2/2019 | Keränen et al. | |
| 2019/0176692 A1 | 6/2019 | Betz et al. | |
| 2019/0243056 A1 | 8/2019 | Irgang et al. | |
| 2020/0164795 A1 | 5/2020 | Degrote et al. | |

FOREIGN PATENT DOCUMENTS

| | | |
|---|---|---|
| DE | 20 2016 104 031 U1 | 7/2017 |
| DE | 20 2016 104 100 U1 | 8/2017 |
| DE | 10 2016 212 817 B4 | 4/2018 |
| DE | 10 2012 101 315 B4 | 7/2018 |
| DE | 20 2017 104 082 U1 | 7/2018 |
| DE | 20 2017 104 262 U1 | 7/2018 |
| DE | 20 2017 104 984 U1 | 8/2018 |
| DE | 20 2017 105 057 U1 | 8/2018 |
| DE | 20 2017 105 063 U1 | 8/2018 |
| DE | 20 2017 105 880 U1 | 9/2018 |
| DE | 20 2017 105 883 U1 | 9/2018 |
| EP | 1 249 369 A1 | 10/2002 |
| EP | 3 575 121 B1 | 4/2021 |
| FR | 2 827 662 B1 | 3/2005 |
| FR | 3 053 276 B1 | 12/2021 |
| JP | 2007-316653 A | 12/2007 |
| JP | 4547734 B2 | 9/2010 |
| WO | 04/001705 A1 | 12/2003 |
| WO | 2009/075924 A1 | 6/2009 |
| WO | 2011/148173 A3 | 2/2012 |
| WO | 2015/128240 A1 | 9/2015 |
| WO | 2017/097471 A1 | 6/2017 |

* cited by examiner

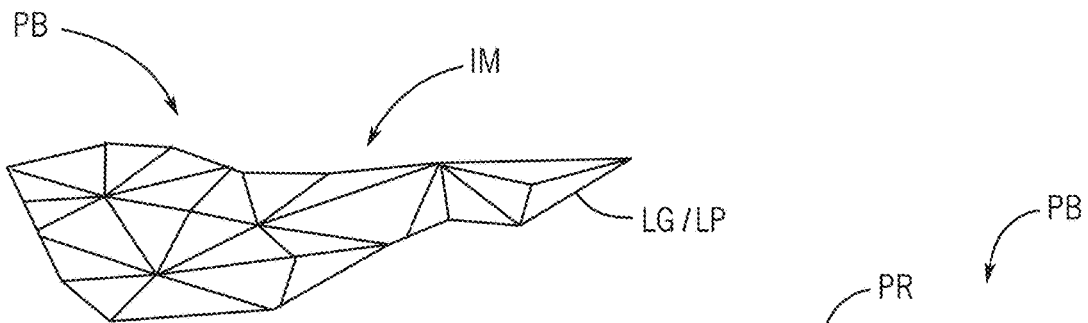
FIG. 4A
FIG. 4B
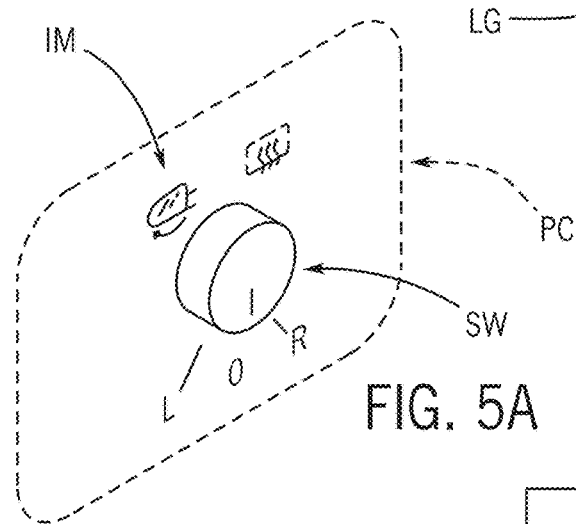
FIG. 5A
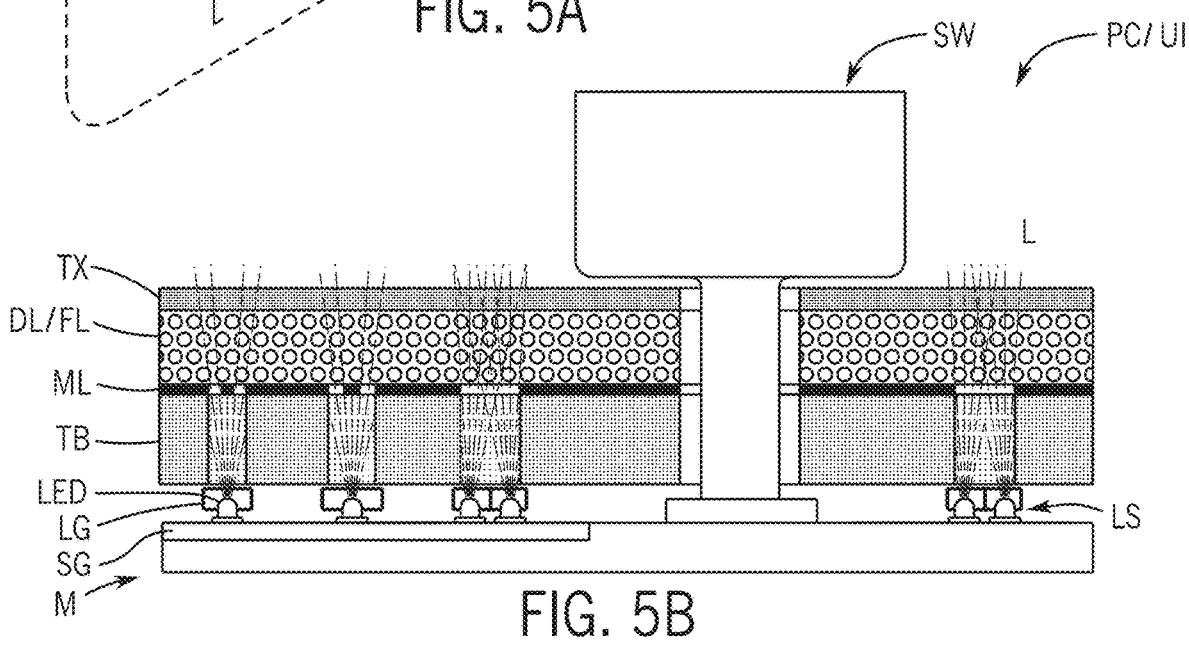
FIG. 5B

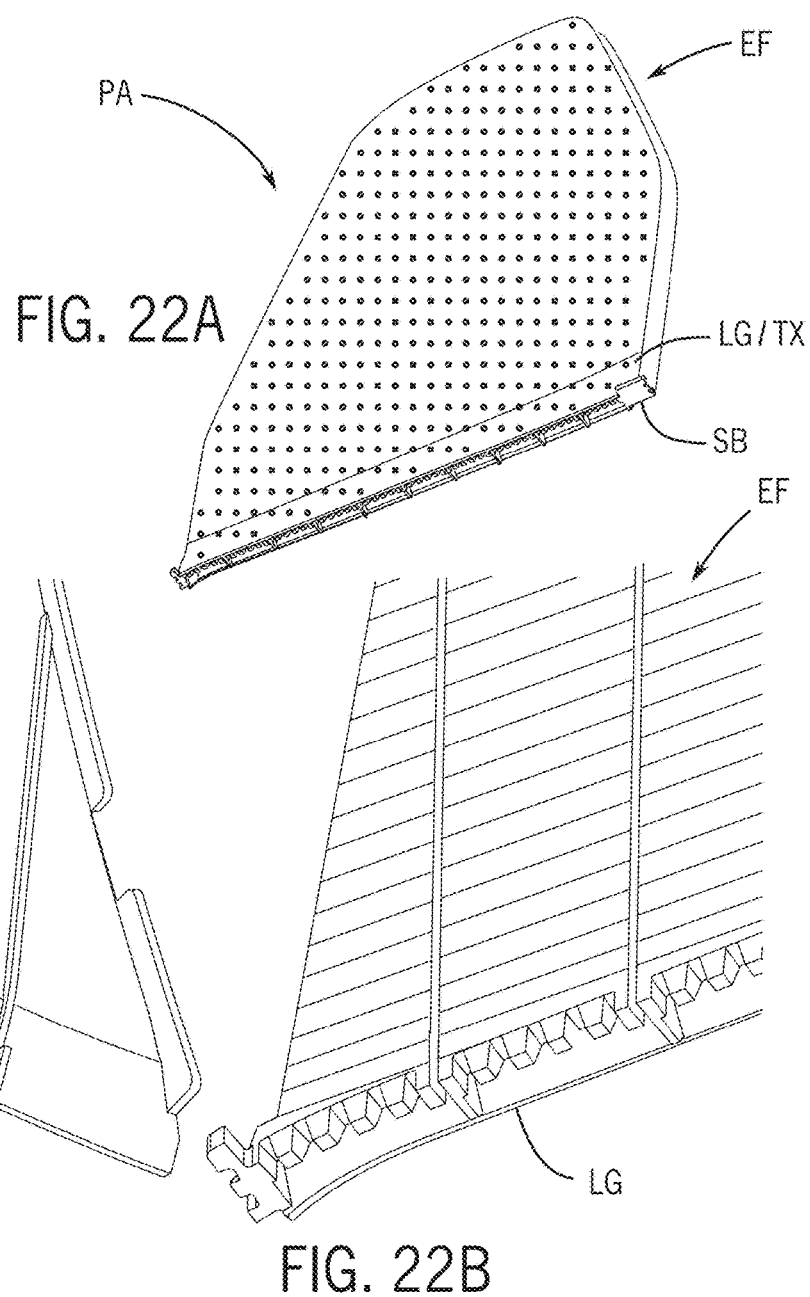
FIG. 22A
FIG. 22B
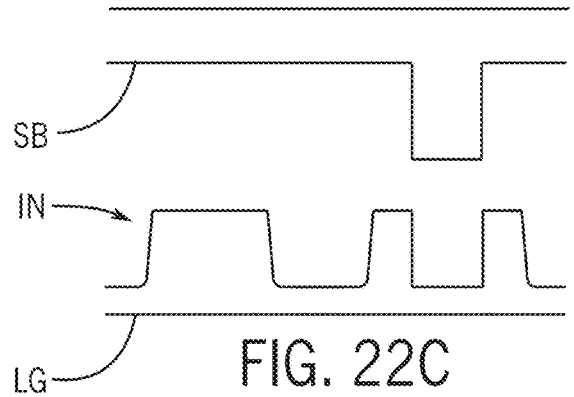
FIG. 22C
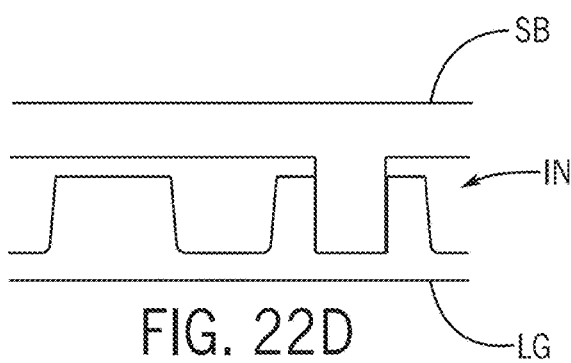
FIG. 22D

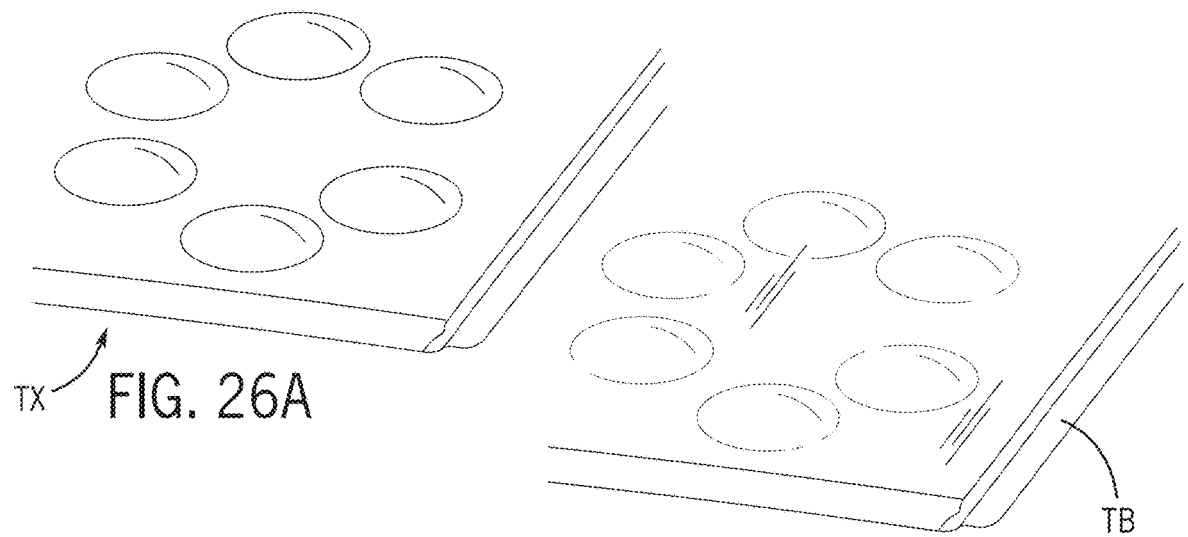
FIG. 26A
FIG. 26B
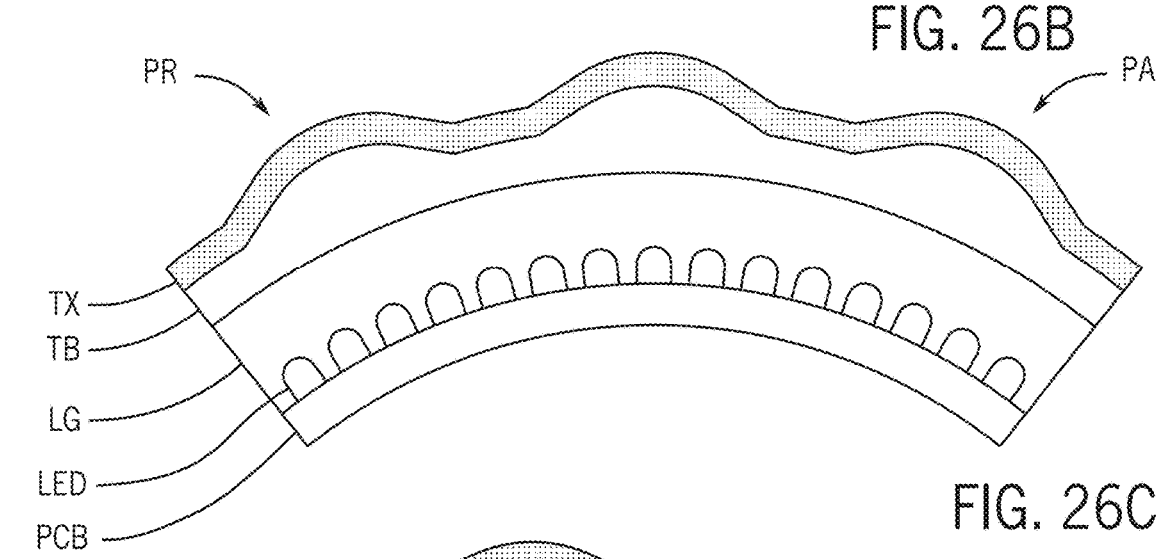
FIG. 26C
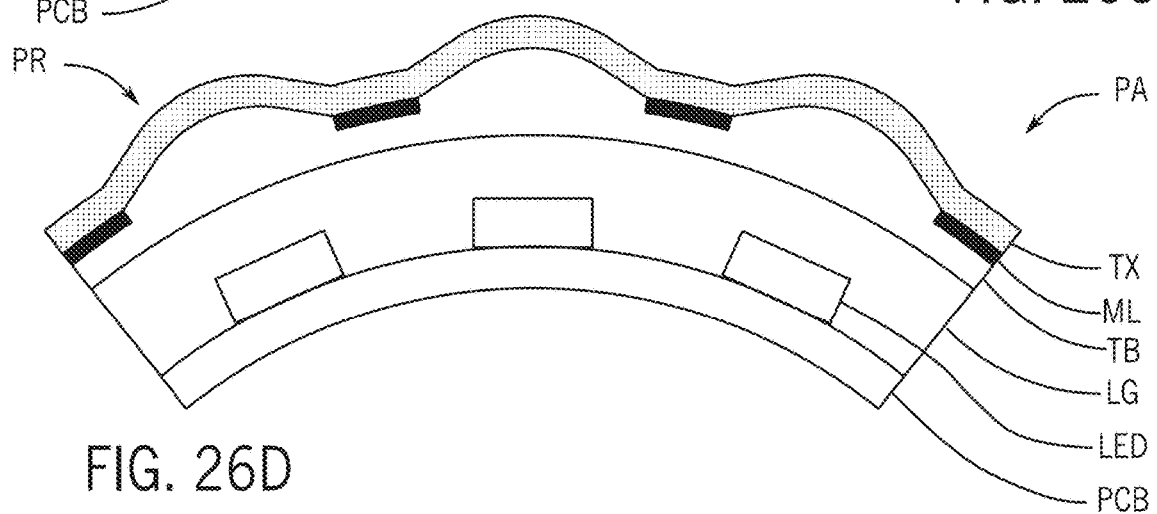
FIG. 26D

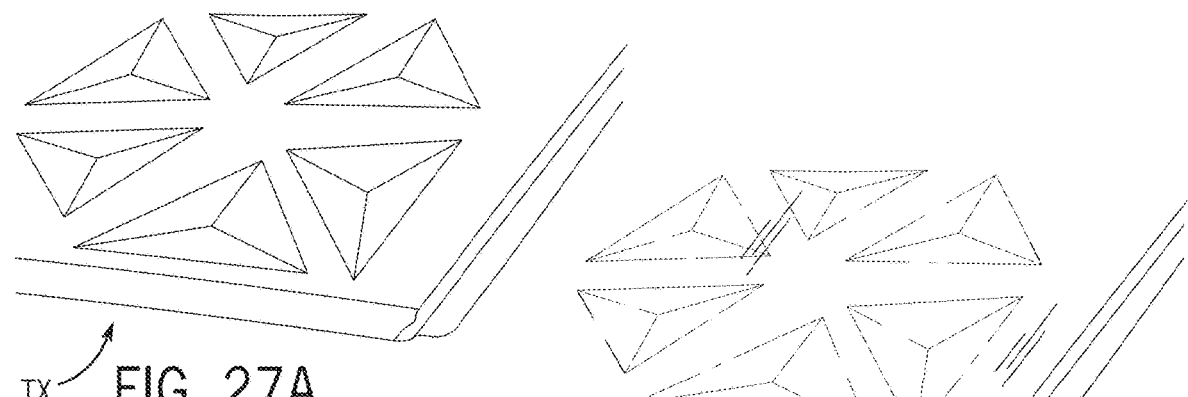
FIG. 27A
FIG. 27B
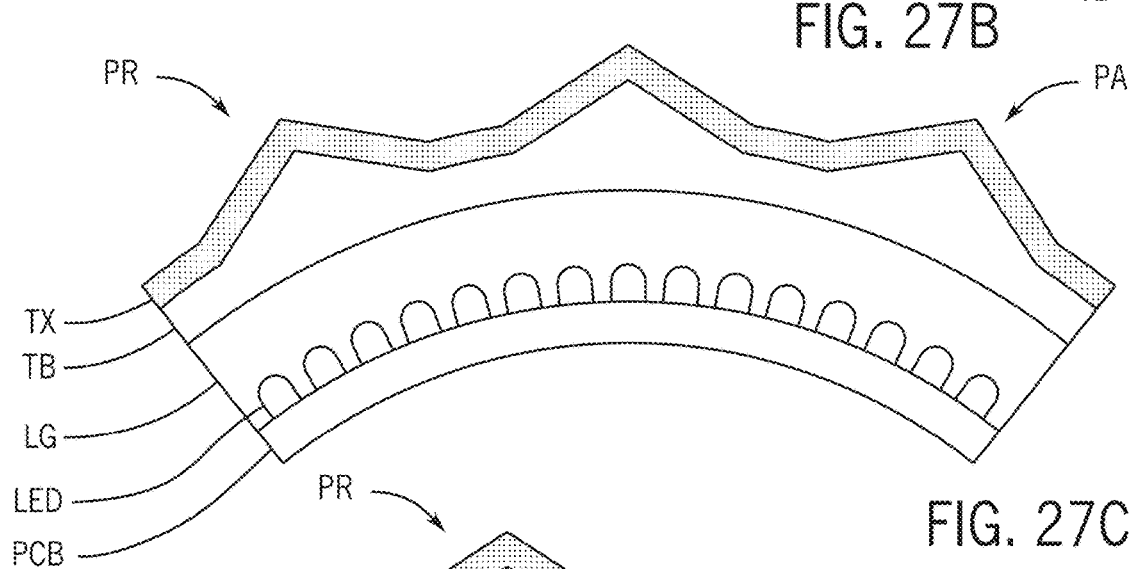
FIG. 27C
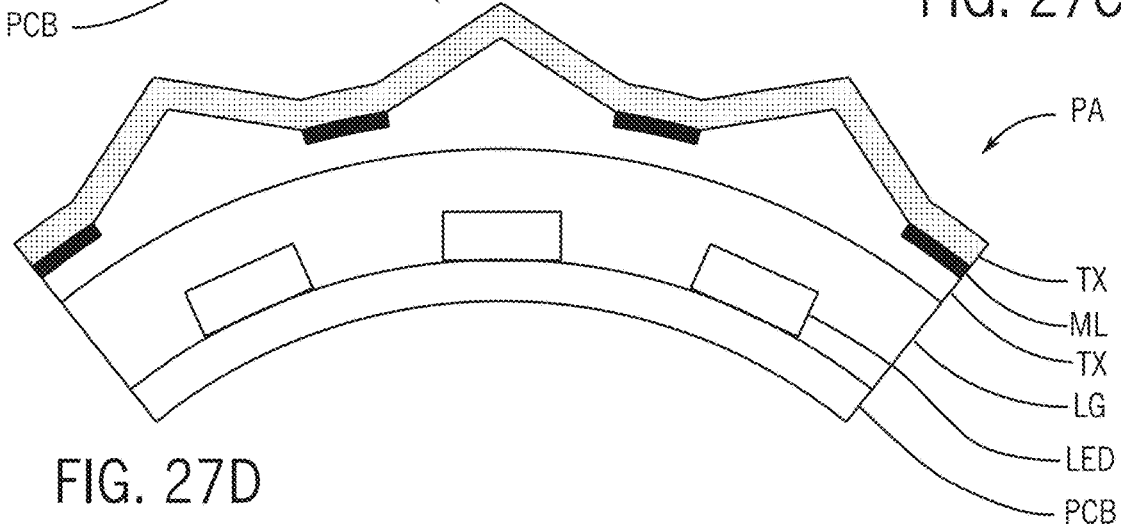
FIG. 27D

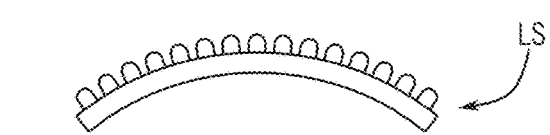
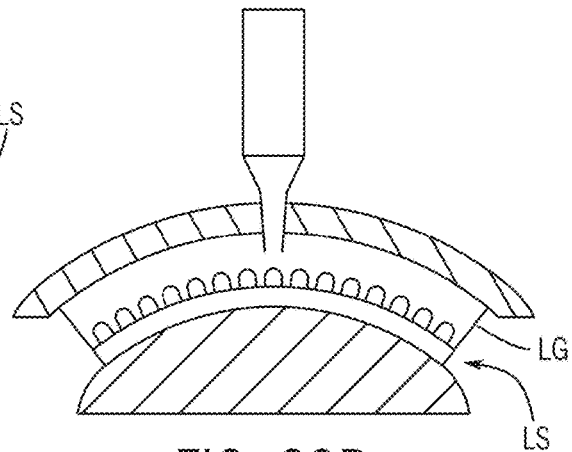
FIG. 29A
FIG. 29B
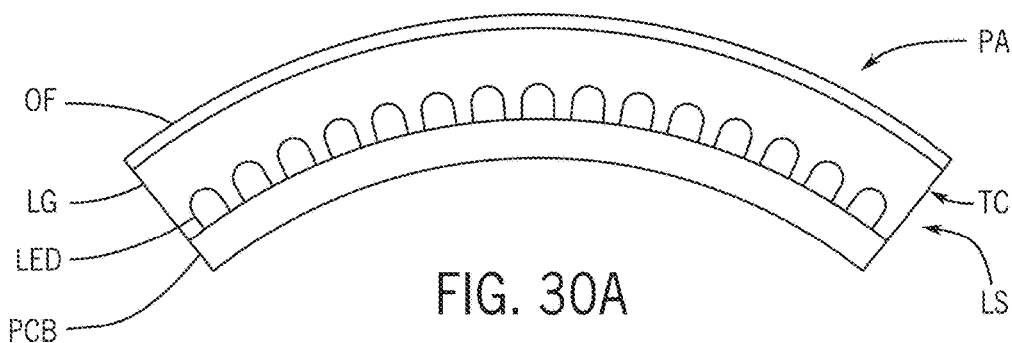
FIG. 30A
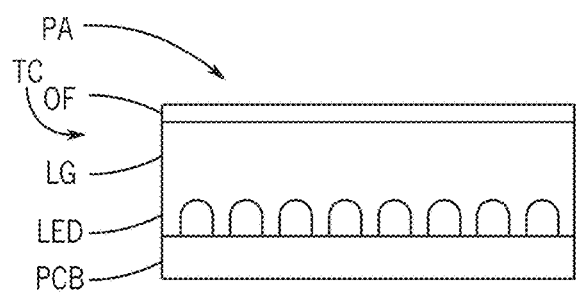
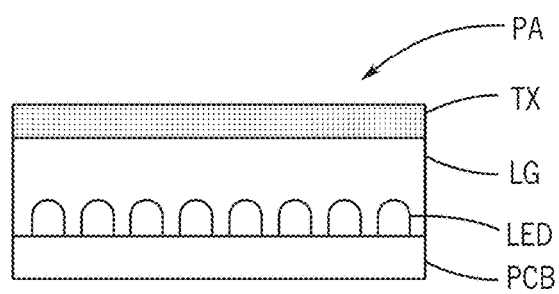
FIG. 30B
FIG. 30C

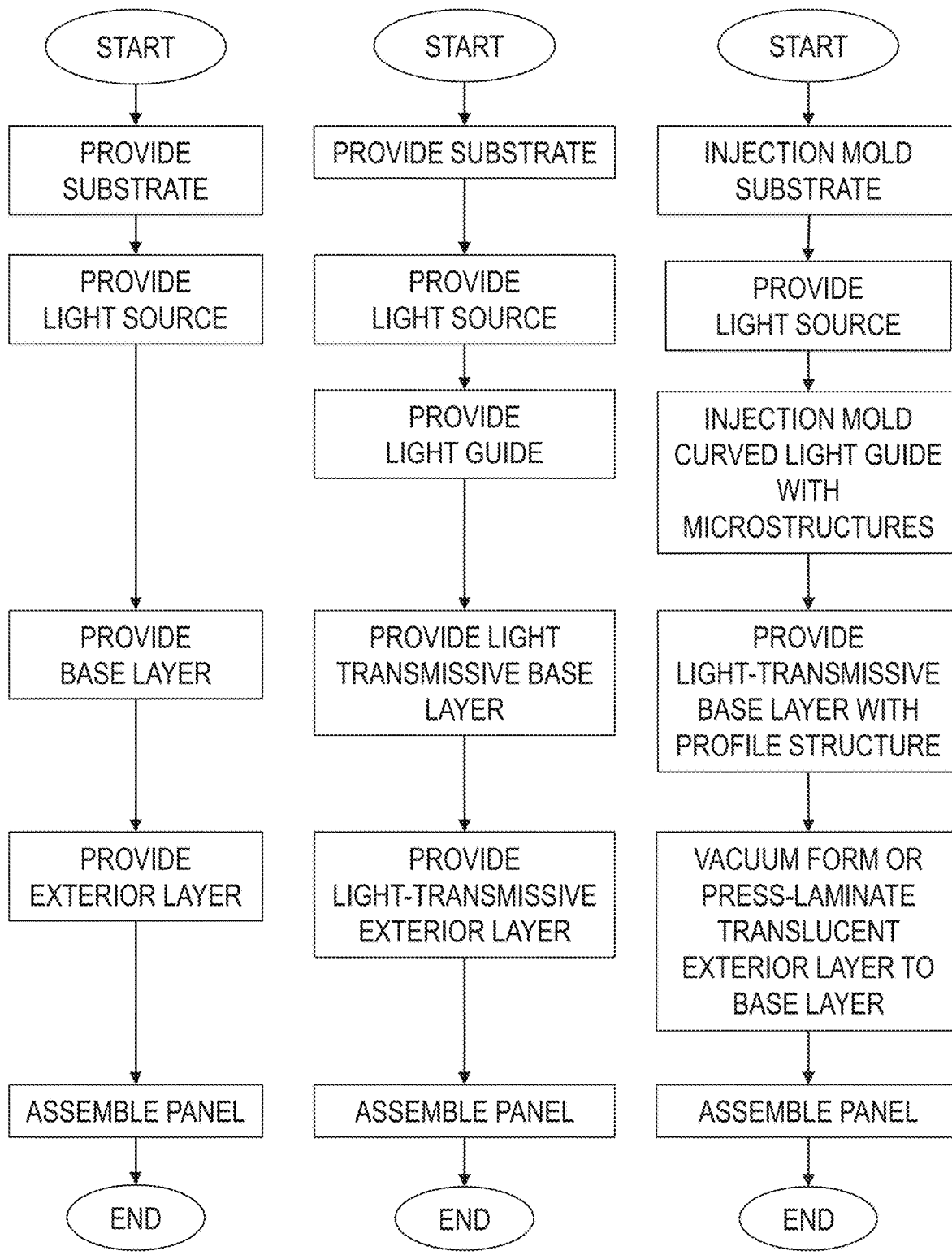

COMPONENT FOR VEHICLE INTERIOR

CROSS-REFERENCE TO RELATED APPLICATIONS

The present application is a continuation of PCT/International Patent Application No. PCT/US2021/049869 titled "VEHICLE INTERIOR COMPONENT" filed Sep. 10, 2021, which claims the benefit of U.S. Provisional Patent Application No. 63/077,152 titled "VEHICLE INTERIOR COMPONENT" filed Sep. 11, 2020.

The present application claims priority to and incorporates by reference in full the following patent applications: (a) U.S. Provisional Patent Application No. 63/077,152 titled "VEHICLE INTERIOR COMPONENT" filed Sep. 11, 2020; (b) PCT/International Patent Application No. PCT/US2021/049869 titled "VEHICLE INTERIOR COMPONENT" filed Sep. 10, 2021.

FIELD

The present invention relates to a component for a vehicle interior. The present invention also relates to a process to manufacture a component for a vehicle interior.

BACKGROUND

It is known to provide a vehicle interior component in a vehicle interior to present a user interface and/or a heating element for a vehicle occupant.

It would be advantageous to provide an improved vehicle interior component comprising a panel configured to present a user interface comprising output for a vehicle occupant.

It would be advantageous to provide an improved vehicle interior component comprising a panel with a base/substrate and a cover configured to present an effect and a user interface.

It would be advantageous to provide an improved vehicle interior component that may comprise a panel with an integrated healing element for comfort of a vehicle occupant.

It would be advantageous to provide an improved vehicle interior component that may comprise a panel configured to present a user interface comprising output and/or input for interaction with a vehicle occupant.

It would be advantageous to provide an improved vehicle interior component that may comprise multiple panels each configured to present a user interface for a vehicle occupant.

It would also be advantageous to provide for a method of manufacturing the improved vehicle interior component.

SUMMARY

The present invention relates to a component for a vehicle interior configured to be illuminated by light from a light source comprising a substrate; a light guide; and a cover comprising an exterior surface. The light guide may be configured to transmit light between the substrate and the cover. The cover may be at least partially light-transmissive. The cover may be configured to present an effect on the exterior surface. The effect may comprise an illumination effect when illuminated by light from the light source. The illumination effect may comprise a dynamic lighting effect. The cover may comprise a profile configured to present the effect; the effect may comprise a visual effect and/or a surface effect. The component may comprise a heating element. The cover may comprise a cover base and a cover layer. The component may comprise a heating element between the cover base and the cover layer. The effect may be configured to conceal the heating element. The heating element may comprise a set of heating wires; the cover may comprise a profile; the set of heating wires may be provided on the profile; the profile may comprise a three-dimensional form at the cover. The heating element may comprise a three-dimensional form behind the cover. The heating element may be configured for simultaneous operation with the illumination effect at the exterior surface of the cover. The effect may comprise a surface effect; the cover may be formed into a three-dimensional form for the surface effect. The effect may comprise a surface effect; the cover may comprise a cover base and a cover layer; the cover layer may be formed into a three-dimensional form and the cover base may be formed into a three-dimensional form for the surface effect. The light guide may comprise a set of segments and a set of dividers between each set of segments; the set of dividers may be configured to provide an optical barrier; the light source may be configured to selectively illuminate each set of the set of segments of the light guide. The light source may comprise a set of LED elements configured to illuminate each set of the set of segments of the light guide, the set of LED elements may comprise at least one LED element optically coupled to a segment of the set of segments of the light guide. The component may comprise a heating element between the cover and the substrate. The light guide may comprise micro-optical structures.

The present invention relates to a component for a vehicle interior configured to provide a user interface illuminated by light from a light source comprising a base; and a light-transmissive cover comprising an exterior surface. The base may comprise a housing. The cover may be configured to present an effect on the exterior surface. The effect may comprise an illumination effect when illuminated by light from the light source. The illumination effect may comprise a dynamic lighting effect. The component may comprise a light guide configured to transmit light to the cover; the light guide may comprise micro-optical structures on a three-dimensional form. The dynamic lighting effect may comprise at least one of an ambient light for the vehicle interior and/or a signal for at least one vehicle system and/or an alert for an occupant of the vehicle interior and/or a warning from a vehicle system and/or a warning from a network and/or information from a vehicle system or network. The light source may comprise a set of LED elements; the illumination effect may comprise selective illumination of at least one LED element of the set of LED elements.

The present invention relates to a method of manufacturing a component into a three-dimensional form for a vehicle interior comprising the steps of providing a substrate; and providing a light-transmissive cover with an external surface on the substrate. The cover may be formed by at least one of injection molding, deep-draw forming; vacuum forming; lamination so that the component may comprise the three-dimensional form; and so that the cover may be configured to transmit light from a light source to provide an effect at the external surface. The method may comprise the step of forming a heating element for the component; the three-dimensional form may comprise a profile for the cover; the heating element may comprise the profile; the heating element may be integrated and concealed within the component.

The present invention relates to a component for a vehicle interior configured to be illuminated by light from a light source comprising a substrate, a light guide and a cover comprising an exterior surface. The light guide may be configured to transmit light between the substrate and the cover. The cover may be at least partially light-transmissive. The cover may be configured to present an effect on the exterior surface. The effect may comprise an illumination effect when illuminated by light from the light source. The cover may comprise a profile. The profile may be configured to present the effect; the effect may comprise a visual effect and a surface effect. The effect may comprise a visual effect. The cover may be configured to present a user interface; the user interface may comprise the illumination effect. The illumination effect may comprise a dynamic lighting effect. The cover may comprise a cover base and a cover layer. The cover base may comprise a carrier. The cover base may comprise a carrier for the light guide. The cover may comprise a cover base and a cover layer configured to present the effect. The cover may comprise the light guide. The cover may comprise a profile; the profile of the cover may be configured to present the effect; the effect may comprise a visual effect and a surface effect. The effect may comprise a visual effect. The component may comprise a heating element. The heating element may comprise a foil. The cover may comprise a cover base and a cover layer; the heating element may be between the cover base and the cover layer. The effect may be configured to conceal the heating element. The illumination effect at the exterior surface of the cover may be configured to conceal the heating element. The heating element may comprise a set of heating wires. The heating wires may be concealed by the effect. The cover may comprise a profile; the heating wires may be provided on the profile. The profile may comprise a three-dimensional form at the cover. The profile at the cover may be configured to form the heating element behind the cover. The heating element may comprise a three-dimensional form behind the cover. The illumination effect at the exterior surface of the cover may be configured to conceal the heating element. The heating element may be configured for simultaneous operation with the illumination effect at the exterior surface of the cover. The cover may comprise at least one of a TPO, TPE, TPU. The profile may comprise a surface effect for the cover. The cover may be formed into a three-dimensional form for the surface effect. The cover may comprise a cover base and a cover layer; the cover base of the cover may be provided on the substrate. The cover layer may be formed into a three-dimensional form for the surface effect. The cover base may be formed into a three-dimensional form for the surface effect. The cover base may comprise a light-transmissive carrier. The cover base may comprise a transparent carrier. The cover base may comprise a light-transmissive carrier formed into a three-dimensional form. The cover base may comprise a three-dimensional form; the three-dimensional form may comprise a relief structure. The relief structure may comprise a profile for the cover. The cover may comprise a decorative layer. The cover may comprise a light-transmissive three-dimensional form with a decorative layer. The light guide may be optically coupled to the light source. The light source may comprise at least one LED. The light source may comprise a set of LED elements. The light source may comprise a module. The component may comprise a module comprising the light source. The module may comprise a circuit board comprising a set of LED elements. The circuit board may comprise a flexible circuit board. The LED elements may comprise surface mount LEDs. The component may comprise an interface between the light source and the light guide. The component may comprise an interface at the light source and the light guide. The interface may comprise a mechanical connection. The component may comprise an interface for the light source and the light guide. The component may comprise an interface between the light source and the light guide. The interface may comprise an optical connection. The interface may comprise an optical coupling of the light source to the light guide. The interface may comprise a mechanical connection. The mechanical connection may comprise engagement between the light guide and the substrate. The engagement may comprise fit of the light guide into the substrate. The interface may comprise fit of the light guide into the substrate. The substrate may comprise a set of slots; the mechanical connection may comprise engagement of the light guide into the set of slots. The light guide may comprise a set of segments; the mechanical connection may comprise fit of the set of segments of the light guide into the set of slots/grooves of the substrate. The light guide may comprise a set of segments. The light guide may comprise a set of dividers between each set of segments. The substrate may comprise a set of dividers configured to provide an optical barrier. The substrate may comprise a set of dividers configured to provide an optical barrier between each set of segments. The substrate may comprise an opaque material. The substrate may comprise a set of ribs. The set of ribs may be configured to provide an optical barrier. The substrate may comprise a set of projections configured to provide an optical barrier. The substrate may comprise a set of projections configured to provide an optical barrier adjacent to the interface. The substrate may comprise a set of flanges configured to provide an optical barrier. The light source may be configured to selectively illuminate each set of the set of segments of the light guide. The light source may comprise a set of LED elements configured to illuminate each set of the set of segments of the light guide. Each set of LED elements may comprise at least one LED element optically coupled to each set of segments of the light guide. The substrate may comprise a base. The substrate may comprise a housing. The substrate may comprise a carrier. The component may comprise a diffuser between the light source and the cover. The diffuser may comprise a light-transmissive layer. The diffuser may comprise a diffuser layer between the light guide and the cover. The component may comprise a mask layer between the substrate and the cover. The mask layer may be between the light guide and the cover. The mask layer may comprise an opaque material. The component may comprise a functional layer between the substrate and the cover. The functional layer may comprise a diffuser. The functional layer may comprise a spacer. The functional layer may comprise a spacer fabric. The functional layer may comprise a heating element. The heating element may comprise a set of wires. The functional layer may comprise a film. The functional layer may comprise an optical film. The functional layer may comprise micro-optical structures. The light guide may comprise micro-optical structures. The cover may be configured to present a user interface; the user interface may comprise the illumination effect. The user interface may comprise a light display. The user interface may comprise an input device. The illumination effect may comprise an ambient lighting effect for the vehicle interior. The illumination effect may comprise an alert for an occupant in the vehicle interior. The component may comprise a trim component. The component may comprise a panel. The panel may be configured for installation on a vehicle interior component. The panel may comprise a light display configured to provide the user interface on the vehicle interior component. The panel may be configured for installation on a door panel.

The present invention relates to a component for a vehicle interior configured to provide a user interface illuminated by light from a light source comprising a base and a light-transmissive cover comprising an exterior surface. The base may comprise a housing. The cover may be configured to present an effect on the exterior surface. The effect may comprise an illumination effect when illuminated by light from the light source. The illumination effect may comprise a dynamic lighting effect. The component may comprise a light guide configured to transmit light to the cover. The component may comprise a light guide configured to transmit light through the cover. The cover may comprise a light guide. The light guide may comprise micro-optical structures. The light guide may comprise printed micro-optical structures. The light guide may comprise micro-optical structures on a three-dimensional form. The light guide may comprise micro-optical structures formed by injection molding. The cover may comprise a cover base and a cover layer. The dynamic lighting effect may comprise an ambient light for the vehicle interior. The dynamic lighting effect may comprise a signal for at least one vehicle system. The dynamic lighting effect may comprise an alert for an occupant of the vehicle interior. The dynamic lighting effect may comprise a user-selectable lighting effect for the vehicle interior. The dynamic lighting effect may comprise at least one of an ambient light for the vehicle interior and/or a signal for at least one vehicle system and/or an alert for an occupant of the vehicle interior and/or a warning from a vehicle system and/or a warning from a network and/or information from a vehicle system. The dynamic lighting effect may comprise a user-selectable lighting effect for the vehicle interior; the user-selectable lighting effect may comprise an ambient light effect. The dynamic light effect may comprise an on state with the illumination effect and an off state with no illumination effect. The illumination effect may comprise ambient lighting for the vehicle interior. The illumination effect may comprise a multi-color visual effect. The base may comprise an opaque material. The cover may comprise a substantially transparent cover base. The cover may comprise a mask layer. The component may comprise a module comprising the light source. The light source may comprise a set of LED elements. The illumination effect may comprise selective illumination of each set of LED elements of the light source. The component may comprise a light guide comprising a set of segments configured to be illuminated by the module. Where the base may comprise a set of dividers for each set of segments of the light guide. The base may comprise a housing; the cover may comprise a light guide configured to fit within the base. The illumination effect may comprise a gradient of light along the cover. The gradient may comprise variation in the illumination effect along the cover. The light source may comprise a side light. The light source may comprise a back light. The light source may comprise a display panel. The cover may comprise a cover base and a cover layer; the cover layer may comprise a decorative layer; the illumination effect may be presented at the decorative layer. The component may comprise a functional layer. The functional layer may comprise at least one of a light guide and/or a mask layer and/or a spacer layer and/or a diffuser layer and/or a heating element and/or a decorative layer. The functional layer may comprise a diffuser layer. The diffuser layer may comprise a spacer fabric. The diffuser layer may comprise a foam material. The diffuser layer may comprise a molded plastic material. The diffuser layer may be positioned between the light guide and the cover. The functional layer may comprise a diffuser; the diffuser may comprise a spacer fabric and/or a foam material and/or a plastic material and/or a molded plastic material and/or a diffuser layer. The component may comprise a heating element between the cover and the substrate. The component may comprise a heating element between the cover base and the cover layer. The component may comprise a heating element behind the cover. The cover may comprise a profile. The component may comprise a heating element with the profile of the cover. The heating element may be thermally formed into a three-dimensional form. The heating element may comprise heating wires formed into a three-dimensional form. The heating element may be formed into a three-dimensional form. The heating element may be thermo-formed into a three-dimensional form. The heating element may be molded into a three-dimensional form. The heating element may comprise a heating foil formed into a three-dimensional form. The heating element may be integrated with a light guide so that the illumination effect conceals the heating element. The heating element may comprise a conductive material comprising at least one of (a) wires; (b) copper alloy wires (c) carbon fiber wires; (d) light transmissive conductive polymers; (e) polyaniline (PANI) (f) light transmissive conductive ceramics; (g) indium tin oxide (ITO); (h) antimony tin oxide (ATO); (i) polyaniline (PANI); (j) Poly (3,4-ethylenedioxythiophene); (k) PEDOT; (l) PEDT; (m) EDOT. The heating element may comprise conductive wires stitched in loops to a spacer fabric or a non-woven fabric. The heating element may comprise conductive ceramics or polymers applied by a coating process to a foil or substrate. The heating element may provide a heated surface at the cover configured to provide uniformity of temperature at the cover and comfort. The illumination effect may be configured to provide information relating to the operation of the heating element. The dynamic lighting effect may comprise integration with the operation of the heating element; the dynamic lighting effect may comprise a color effect; the color effect may comprise red for warm and blue for cold.

The present invention relates to a component for a vehicle interior comprising a first user interface comprising a panel comprising a substrate and a cover and a light source configured to provide light to present an illumination effect at the cover and a second user interface at the cover. The panel of the second user interface may be behind a decorative layer of the cover.

The illumination effect of the first user interface may comprise a dynamic lighting effect. The panel of the first user interface may comprise a functional layer. The functional layer may comprise at least one of a light guide and/or a mask layer and/or a spacer layer and/or a diffuser layer and/or a heating element and/or a decorative layer. The cover of the first user interface may comprise a cover base and a cover layer. The cover of the first user interface may comprise a light-transmissive cover. The second user interface may comprise a panel configured to provide light to present an illumination effect at the cover. The second user interface may comprise a mechanical operator. The mechanical operator may comprise at least one of a dial and/or a button and/or a switch and/or a sensor. The second user interface may comprise a mechanical operator and a panel configured to provide light to present an illumination effect at the cover. The component may comprise a third user interface; the third user interface may comprise a panel. The third user interface may comprise an input device for at least one vehicle system. The panel may comprise a set of control elements. The panel may be configured to present an illumination effect. The panel may comprise at least one button. The component may comprise a fourth user interface; the fourth user interface may comprise a panel; the panel may comprise at least one switch. The fourth user interface may comprise output from an illumination effect and input detected at or adjacent to the cover.

The present invention relates to a method of manufacturing a component into a three-dimensional form for a vehicle interior comprising the steps of providing a substrate and providing a light-transmissive cover with an external surface on the substrate. The cover may be formed by at least one of injection molding, deep-draw forming, vacuum forming, lamination; so that the component may comprise the three-dimensional form; so that the cover may be configured to transmit light from a light source to provide an effect at the external surface. The method may comprise the step of providing a light guide behind the cover. The method of may comprise the step of providing a light guide for the cover. The method may comprise the step of providing a decorative layer on the cover. The step of providing a light-transmissive cover may comprise the step of forming a light-transmissive cover base and a cover layer for the cover. The three-dimensional form may comprise a profile for the cover. The method may comprise the step of forming a heating element for the component; the heating element may be provided by at least one of injection molding, thermo-forming, vacuum forming, deep-draw forming, lamination, stamping. The step of providing a light-transmissive cover may comprise the step of forming a light-transmissive cover base and a cover layer for the cover; the heating element may be formed between the cover base and the cover layer. The heating element may comprise the profile. The heating element may be integrated and concealed within the component. The method may comprise the step of forming the light source on a base by at least one of (a) as a polymer resin casting with LED elements on the base or (b) as surface-mount LED elements arranged on the base; wherein the base comprises at least one of a flexible board and/or a flexible circuit board and/or a flexible film and/or a formable film.

The present invention relates to a vehicle interior component. The component may comprise a trim panel. The component may comprise a rear housing, a light source and a main carrier. The component may comprise a relief structured carrier and/or a relief structured cover layer. The relief structured carrier may be light transmissive. The relief structured carrier may comprise at least two injection molded materials. The materials may have different light transparency grades. The relief structured cover layer may be light transmissive. The component may comprise a light guide. The light guide may comprise a micro-structured surface. The light guide may comprise microstructures prepared by a printing, engraving or a lasering process. The light guide may be in direct contact with the light source. The component may comprise a light diffuser. The light diffuser may comprise at least one of foam; a non-woven fabric; a spacer fabric; polymeric resin; a plastic film; a plastic sheet. The component may comprise a heating layer. The heating layer may comprise a relief structured heating layer. The heating layer may comprise a plastic film. The heating layer may comprise at least one of thin electrical conductive wires; conductive ink; printed conductive ink; a conductive foil. The component may comprise a functional layer to improve heat insulation and/or haptics. The functional layer may comprise at least one of a foam; a spacer fabric; a non-woven fabric. The functional layer may be light transmissive. The component may comprise a masking layer.

FIGURES

FIG. 4A is a schematic plan view of a panel for a vehicle interior component according to an exemplary embodiment.

FIG. 4B is a schematic partial section view of a vehicle interior component according to an exemplary embodiment.

FIG. 5A is a schematic perspective view of a panel for a vehicle interior component according to an exemplary embodiment.

FIG. 5B is a schematic partial section view of a vehicle interior component according to an exemplary embodiment.

FIG. 22A is a schematic perspective view of a panel for a vehicle interior component according to an exemplary embodiment.

FIG. 22B is a schematic partial cut-away exploded perspective view of a panel for a vehicle interior component according to an exemplary embodiment.

FIG. 22C is a schematic exploded partial cut-away section view of a panel for a vehicle interior component according to an exemplary embodiment.

FIG. 22D is a schematic partial cut-away section view of a panel for a vehicle interior component according to an exemplary embodiment.

FIG. 26A is a schematic cut-away perspective view of a cover layer for a panel for a vehicle interior component according to an exemplary embodiment.

FIG. 26B is a schematic cut-away perspective view of a cover base for a panel for a vehicle interior component according to an exemplary embodiment.

FIG. 26C to 26D are schematic partial section views of a panel for a vehicle interior component according to an exemplary embodiment.

FIG. 27A is a schematic cut-away perspective view of a cover layer for a panel for a vehicle interior component according to an exemplary embodiment.

FIG. 27B is a schematic cut-away perspective view of a cover base for a vehicle interior component according to an exemplary embodiment.

FIGS. 27C to 27D are schematic partial section views of a panel for a vehicle interior component according to an exemplary embodiment.

FIGS. 29A to 29B are schematic diagrams of a process for producing a panel for a vehicle interior component according to an exemplary embodiment.

FIG. 30A is a schematic section view of a panel for a vehicle interior component according to an exemplary embodiment.

FIGS. 30B and 30C are schematic partial section views of a panel for a vehicle interior component according to an exemplary embodiment.

FIG. 33A to 33C are schematic flow diagrams of methods for forming a panel for a vehicle interior component according to an exemplary embodiment.

DESCRIPTION

Figure 1A:
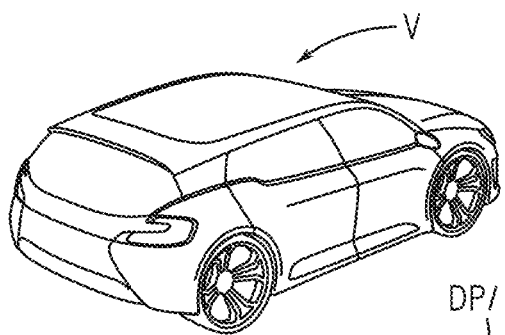
FIG. 1A is a schematic perspective view of a vehicle according to an exemplary embodiment.
Figure 1B:
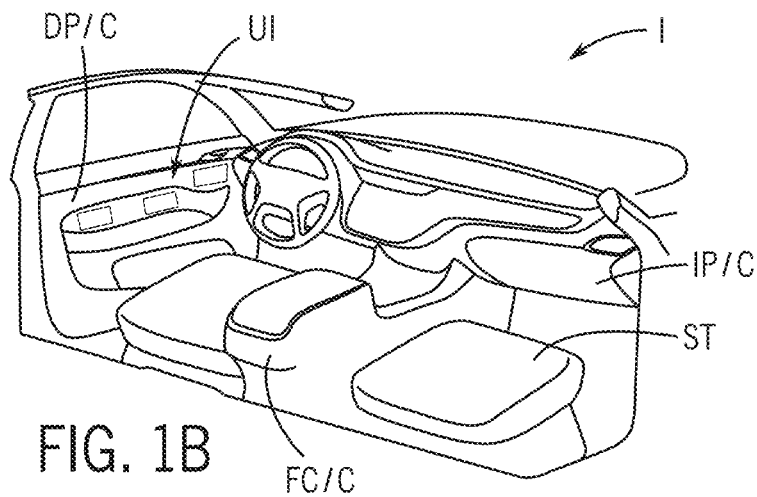
FIG. 1B is a schematic perspective cut-away view of the vehicle showing a vehicle interior according to an exemplary embodiment.
Figure 2A:
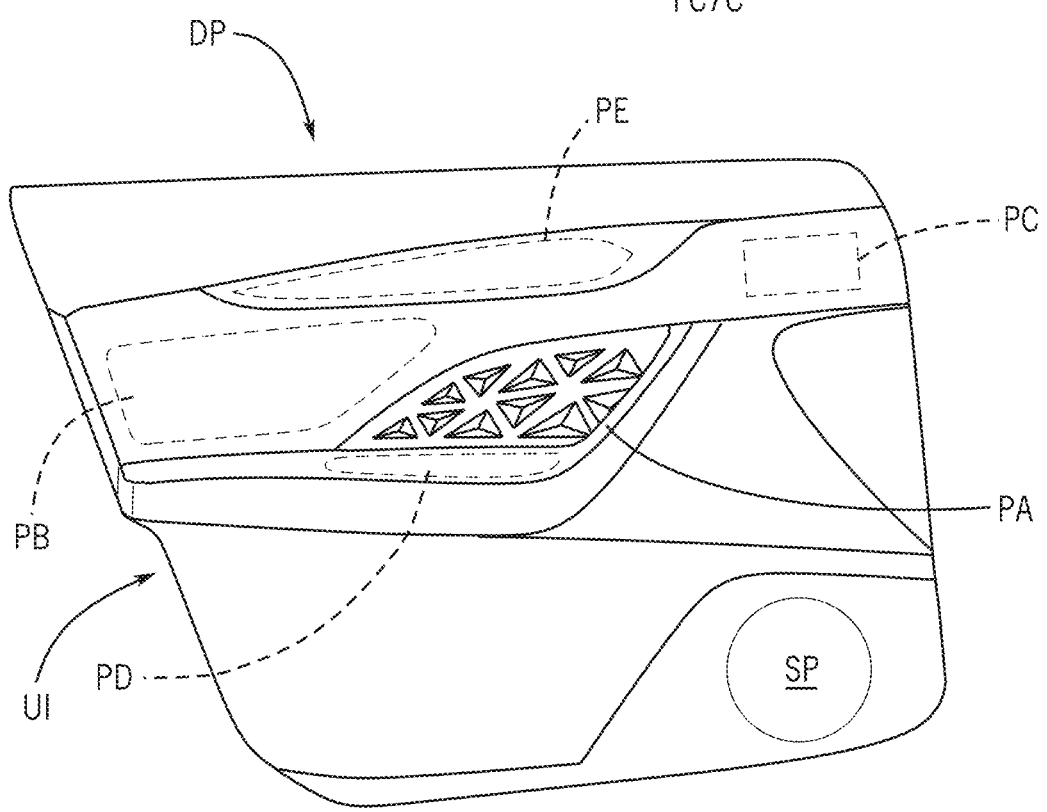
FIGS. 2A to 2I are schematic perspective views of a vehicle interior component with a panel/user interface according to an exemplary embodiment.
Figure 2B:
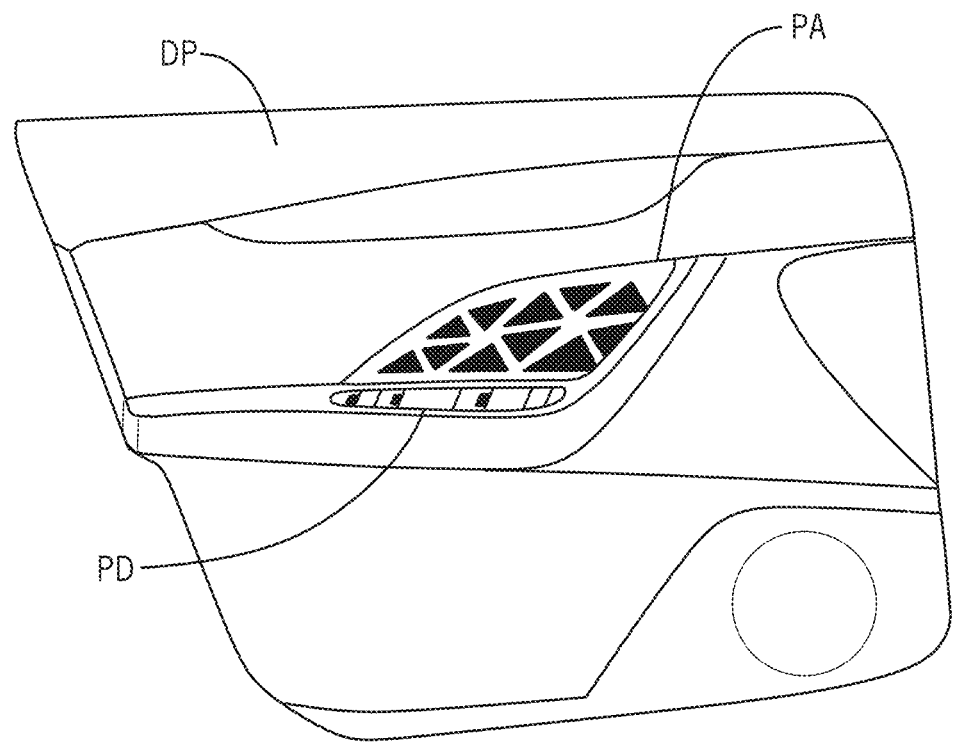
Figure 2C:
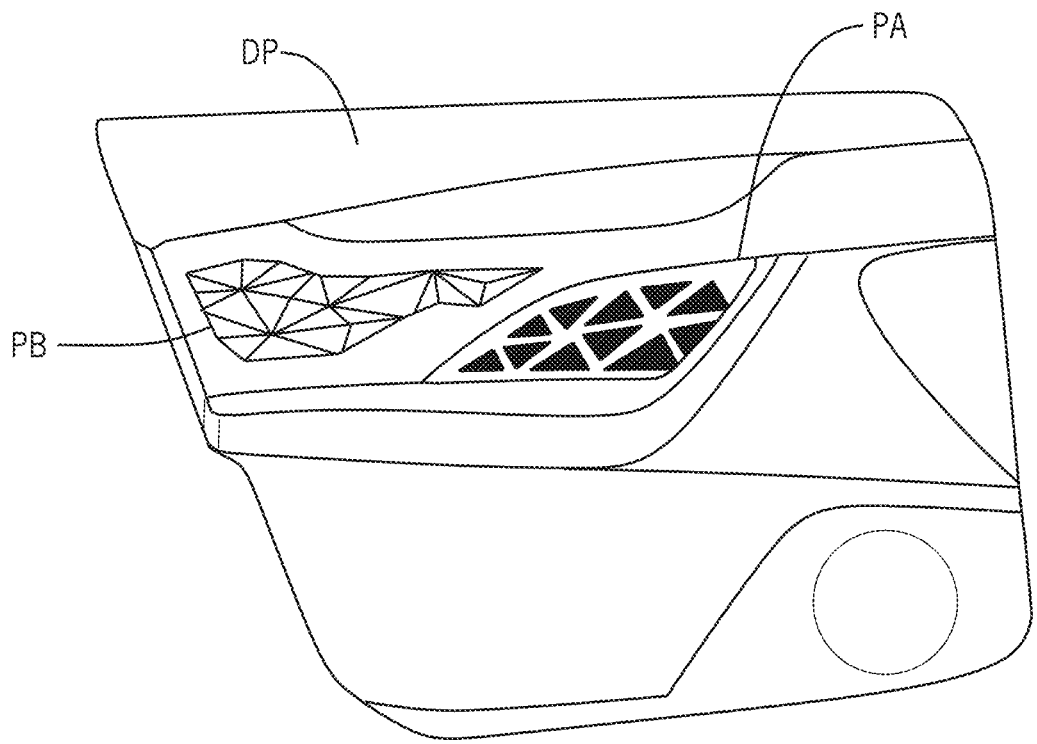
Figure 2D:
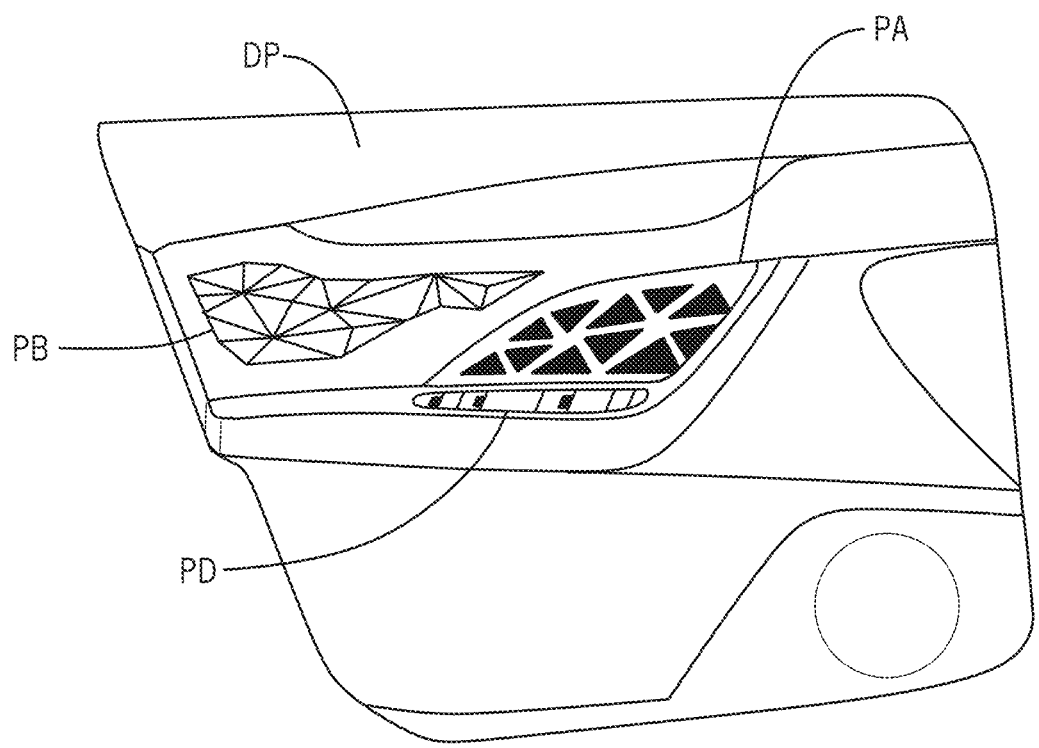
Figure 2E:
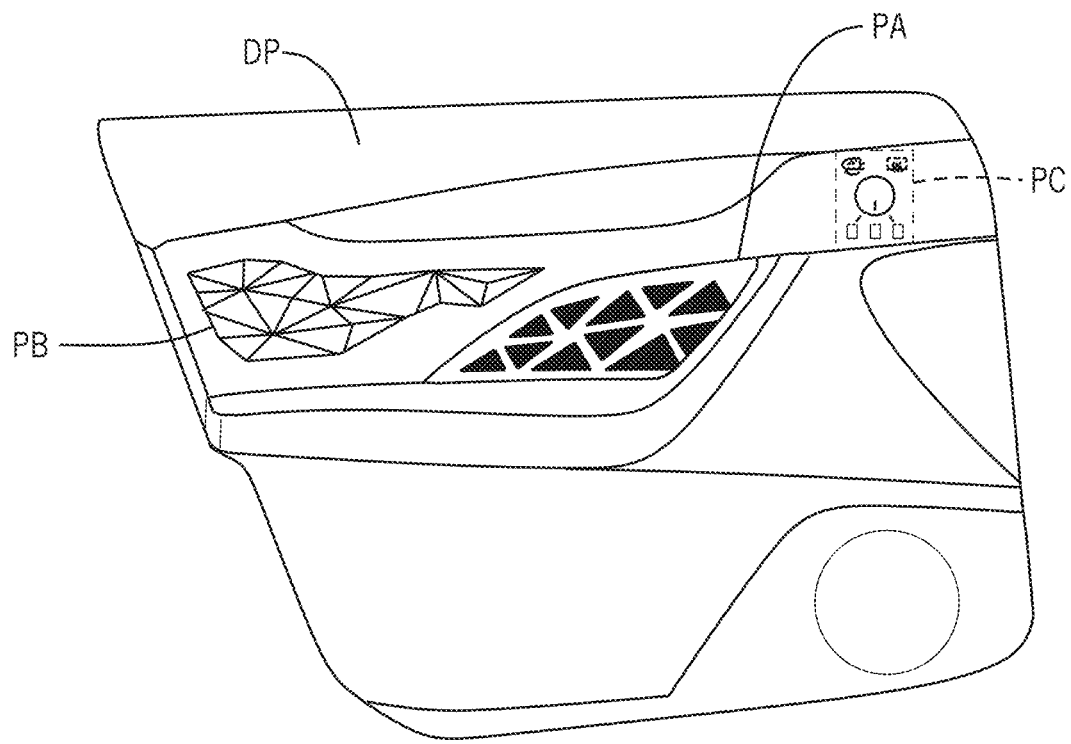
Figure 2F:
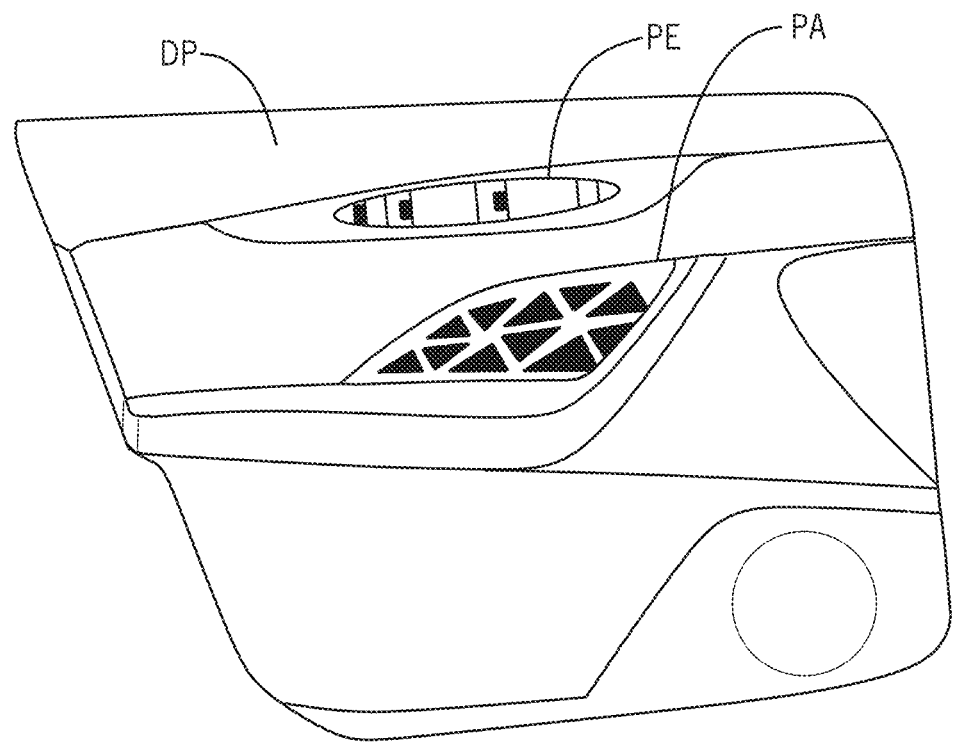
Figure 2G:
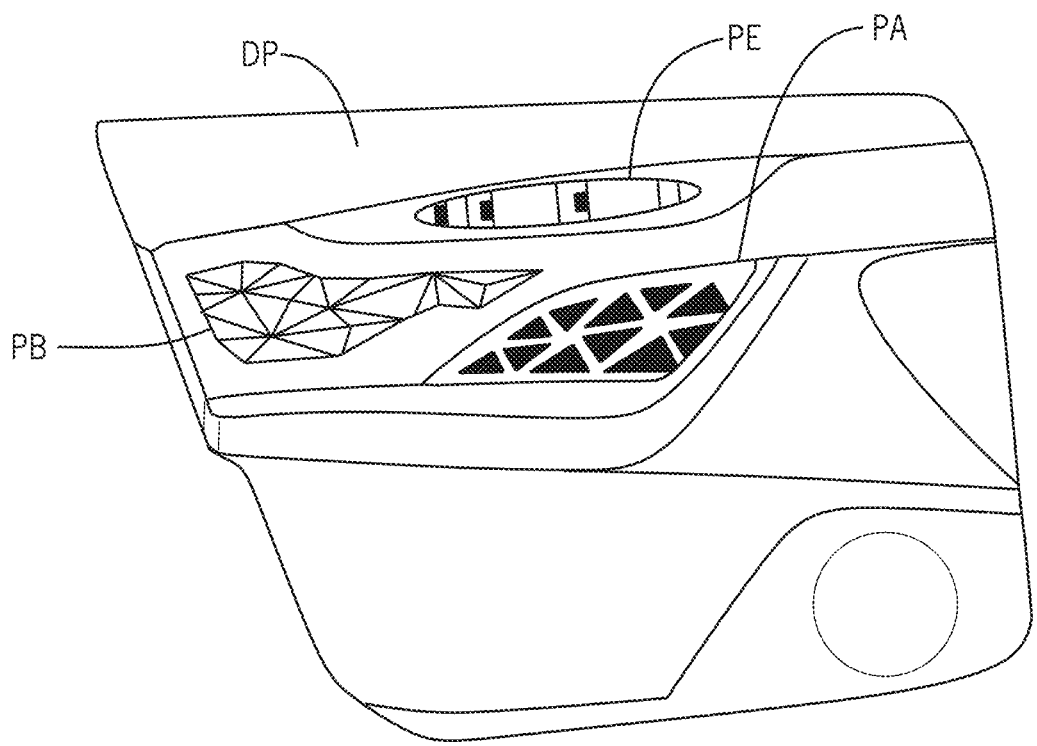
Figure 2H:
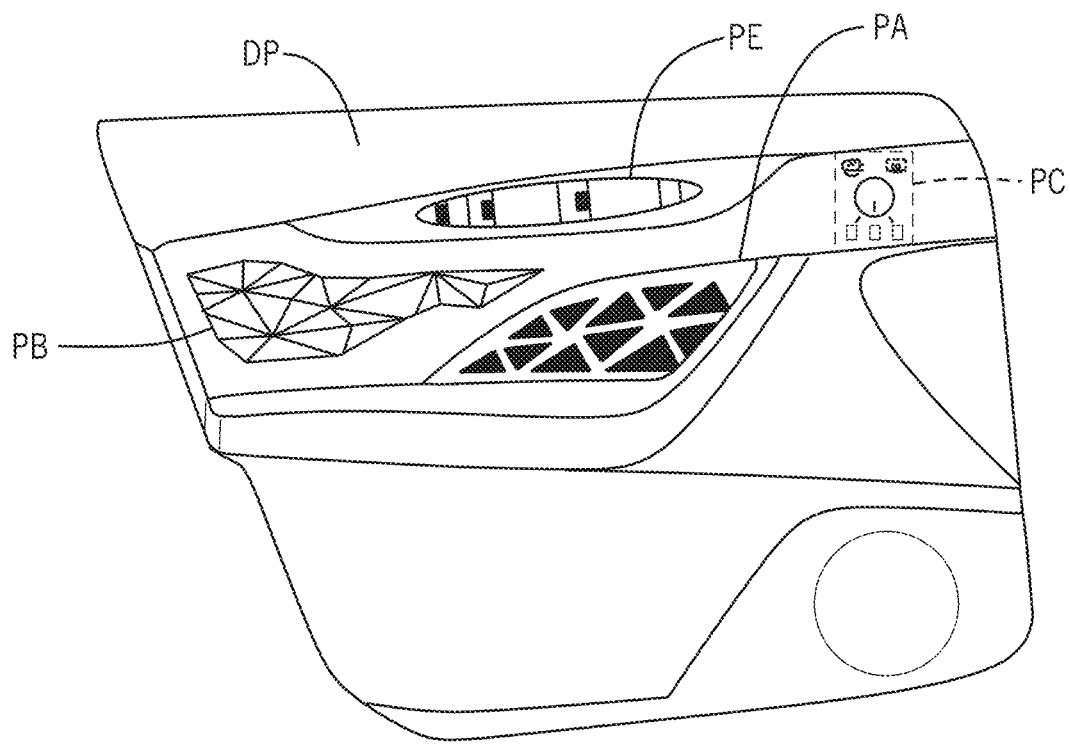
Figure 2I:
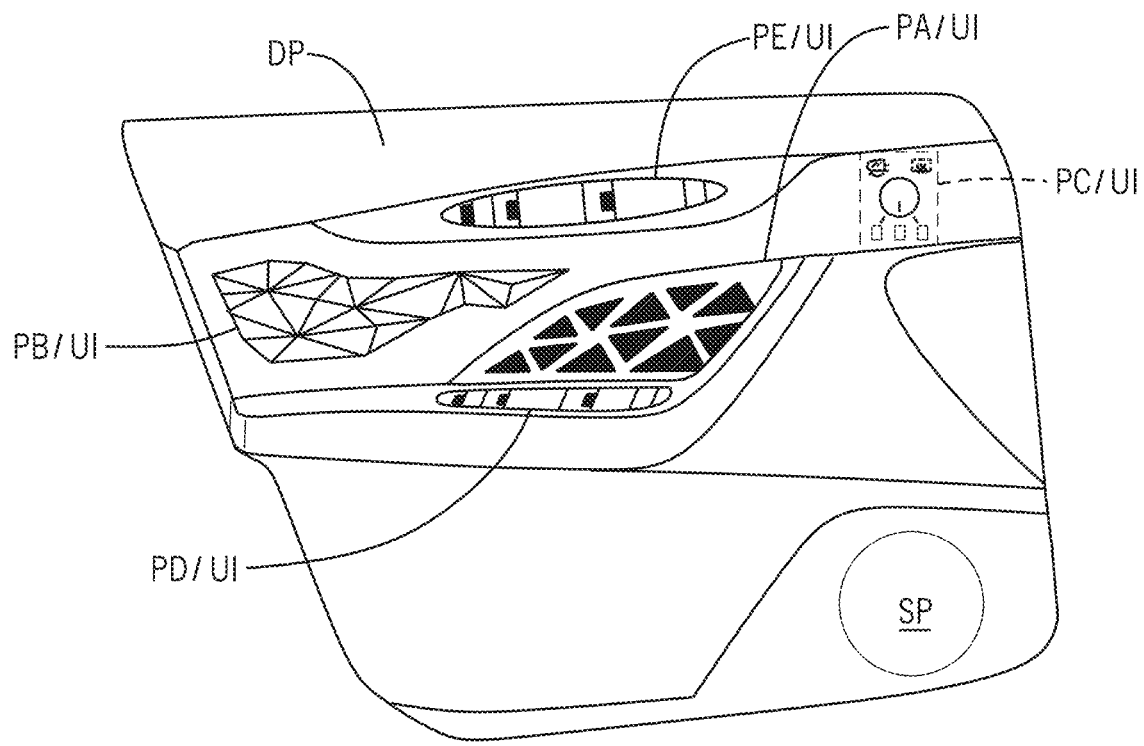
Figure 3A:
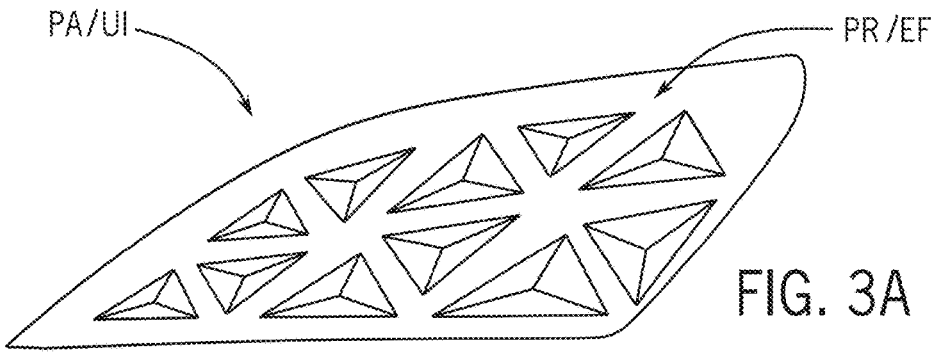
FIGS. 3A to 3C are schematic plan views of a panel/user interface for a vehicle interior component according to an exemplary embodiment.
Figure 3B:
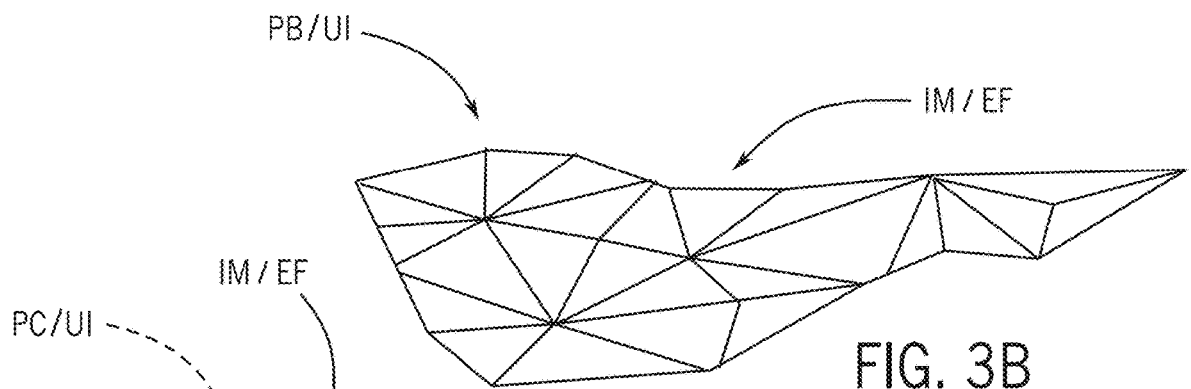
Figure 3C:
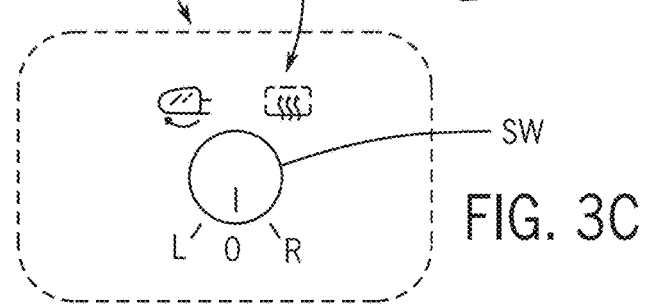
Figure 3D:
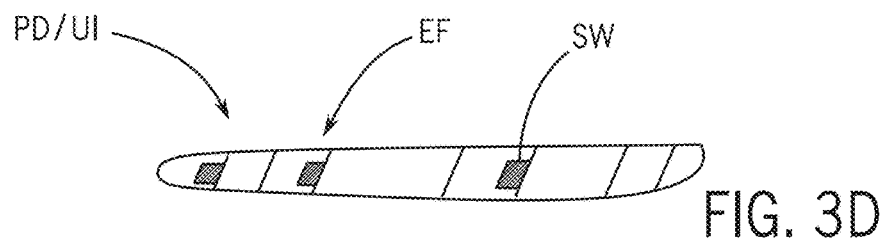
FIGS. 3D to 3E are schematic perspective views of a panel/user interface for a vehicle interior component according to an exemplary embodiment.
Figure 3E:
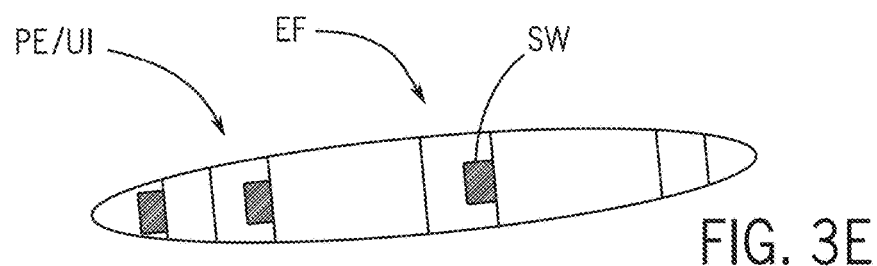
Figures 6A, 6B:
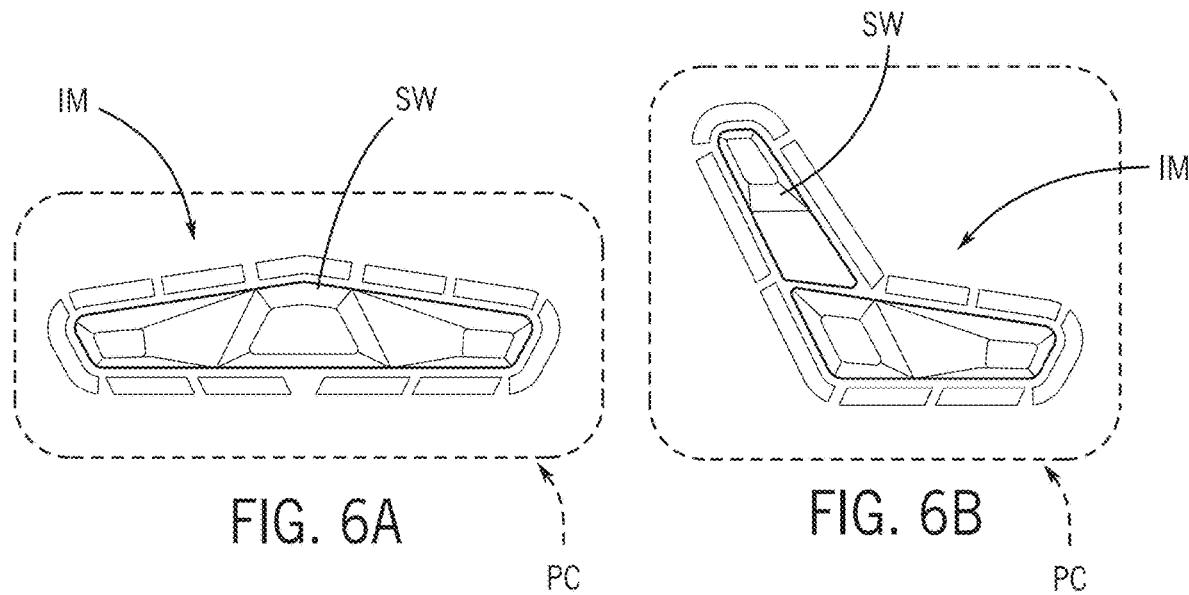
FIGS. 6A to 6B are schematic plan views of a panel/user interface for a vehicle interior component according to an exemplary embodiment.
Figure 7A:
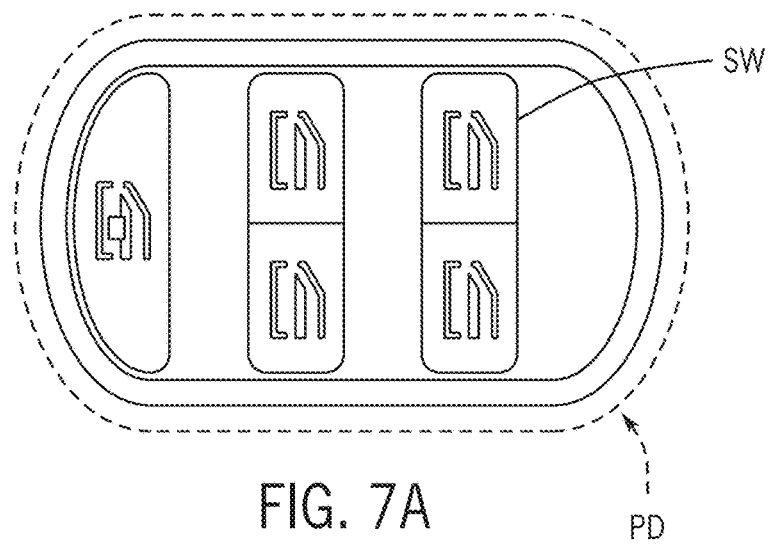
FIGS. 7A to 7B are schematic plan views of a panel/user interface for a vehicle interior component according to an exemplary embodiment.
Figure 7B:
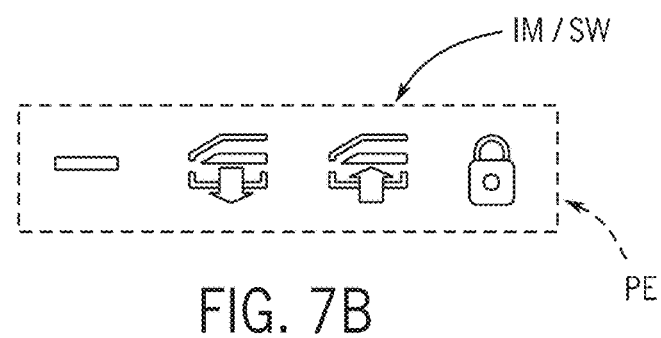
Figure 8A:
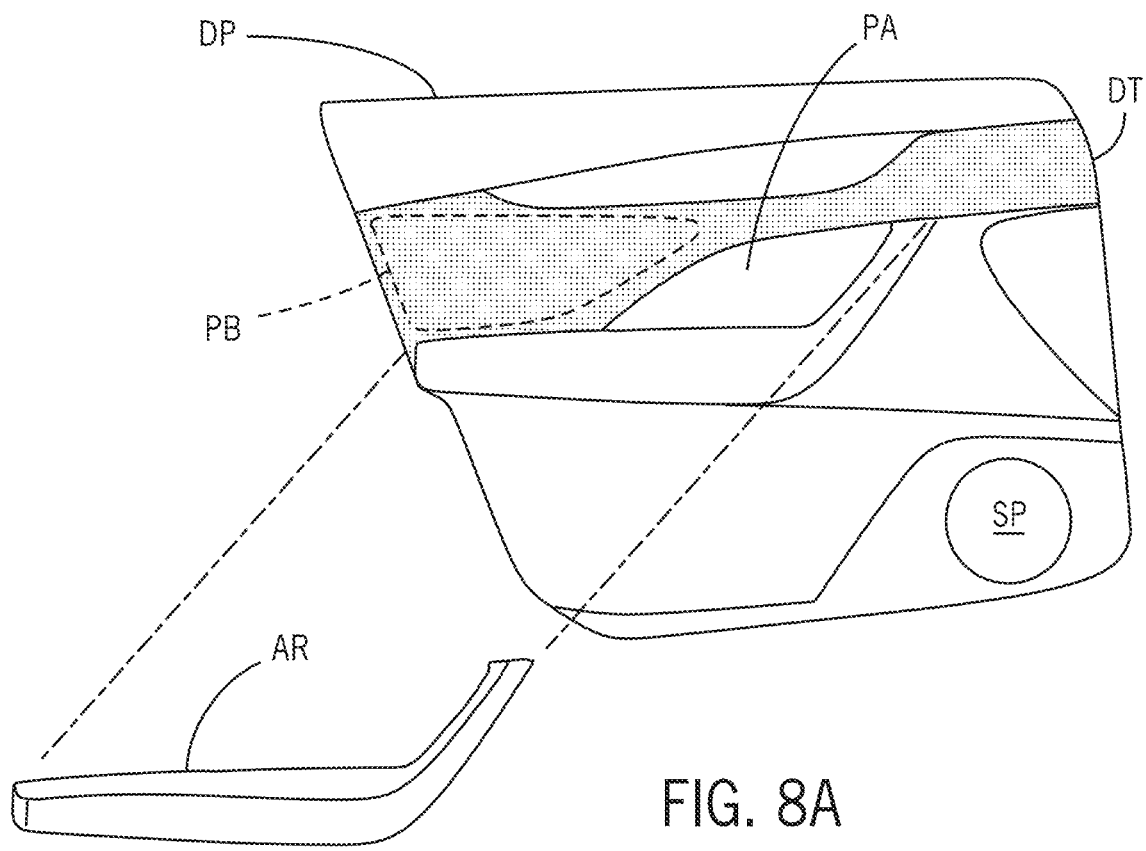
FIG. 8A is a schematic exploded perspective view of a vehicle interior component shown as a door panel according to an exemplary embodiment.
Figure 8B:
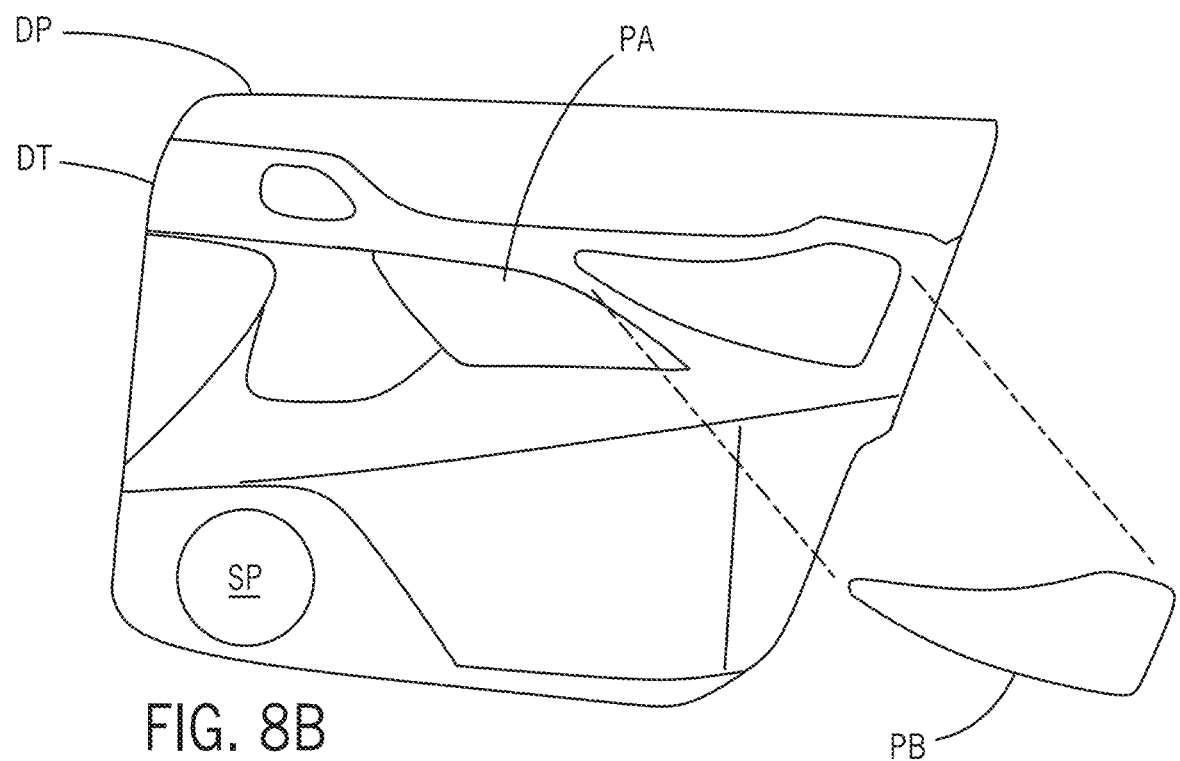
FIG. 8B is a schematic perspective view of a vehicle interior component shown as a door panel according to an exemplary embodiment.
Figure 9A:
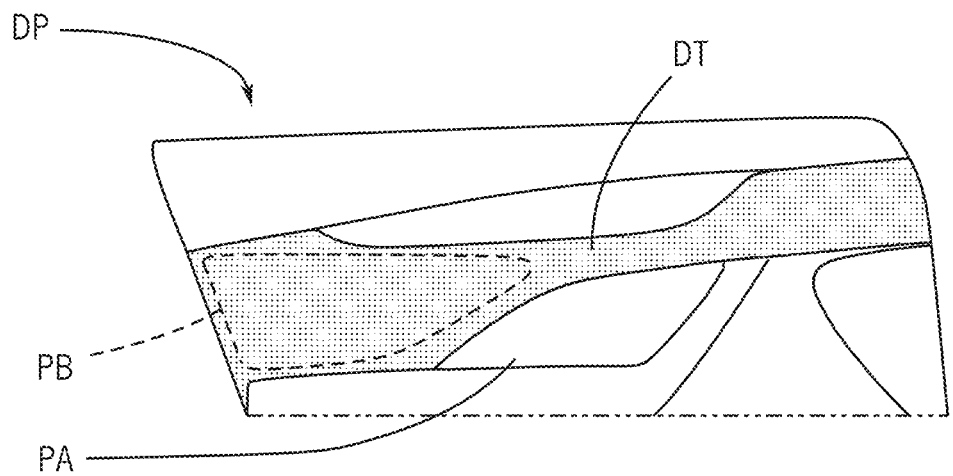
FIG. 9A is a schematic partial perspective view of a vehicle interior component shown as a door panel according to an exemplary embodiment.
Figure 9B:
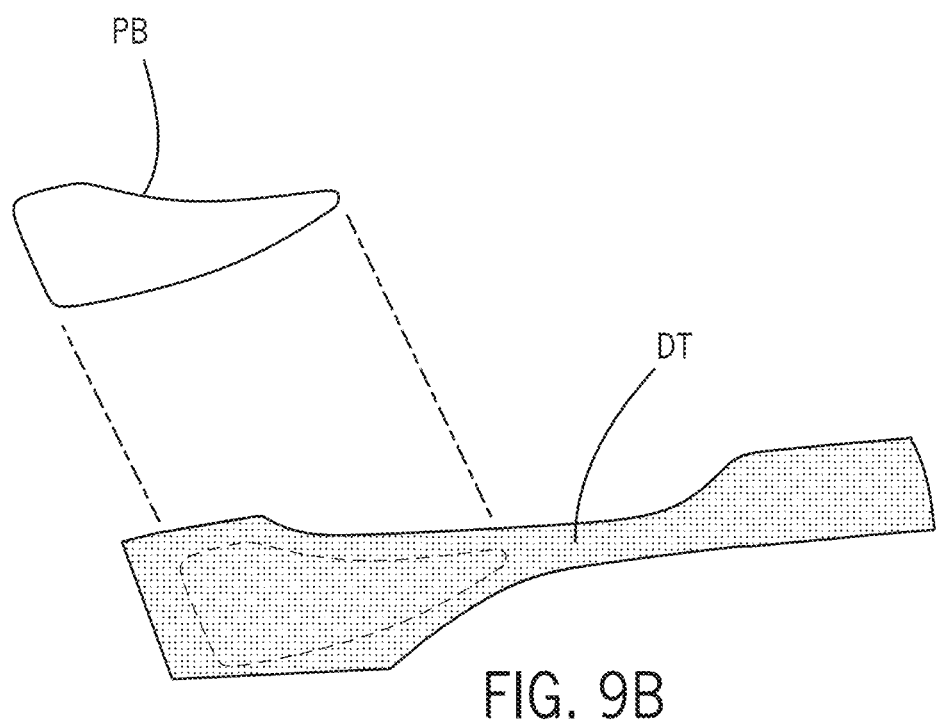
FIG. 9B is a schematic partial exploded perspective view of a vehicle interior component shown as a door panel according to an exemplary embodiment.

Referring to FIGS. 1A-1B, a vehicle V is shown with an interior I comprising components C such as an instrument panel IP, console shown as floor console FC and door panel DP. As indicated schematically according to an exemplary embodiment in FIGS. 1B and 2A, the vehicle interior components may comprise multiple panels PA/PB/PC/PD/PE configured to present a user interface UI configured to provide output and/or input for interaction with a vehicle occupant (e.g. passive, active, etc.). As shown schematically according to an exemplary embodiment in FIGS. 1B, 2A-2I, the component may comprise one panel providing a user interface or multiple panels each configured to provide a user interface; a user interface may comprise output such as an illumination effect (e.g. lighting, image, etc.) and/or input such as from an input device (e.g. sensor, switch, button, operator control, etc.); operation of the user interface/panel may comprise localized action at the component or connected interaction such as output and/or input with and from vehicle systems and/or information/communications by connectivity with other network/data sources. See FIGS. 31A-31C. As indicated schematically, a user interface may also be configured to provide haptic feedback, sound, etc. such as with a transducer/speaker SP (or other element/system). See FIGS. 1B and 2A-2I.

As indicated schematically according to an exemplary embodiment in FIGS. 1B, 2A-2I, 3A-3E, 4A-4B, 5A-5B, 6A-6B and 7A-7B, the component shown as door panel DP/C (with armrest AR) may comprise a user interface presented at one panel PA and/or a variety of combinations of additional/multiple panels on the component shown as panel PB and panel PC and panel PD and panel PE each configured to present a user interface for the vehicle occupant. As indicated schematically in FIGS. 2I, 3A-3E, 4A-4B, 5A-5B, 6A-6B and 7A-7B, each of the panels may be configured and positioned in a variety of arrangements to present a user interface and a variety of effects on the component.

As indicated in FIGS. 2A-2I and 3A, panel PA may be configured to present a user interface UI and effect EF; as shown schematically, panel PA may be provided on door panel DP to provide a profile PR comprising a three-dimensional form as a surface effect and to be illuminated to present a visual effect such as an illumination effect and/or dynamic lighting effect. See also FIGS. 28A-28G and 31A-31C. As indicated schematically in FIGS. 10A-10B, 11A-11B, 12A-12B, 13A-13B, 14A-14B, 15A-15B, 16A-16L and 21A-21B, panel PA may comprise a composite structure with a base/substrate SB and cover TC in any of a variety of forms.

Figure 28A:
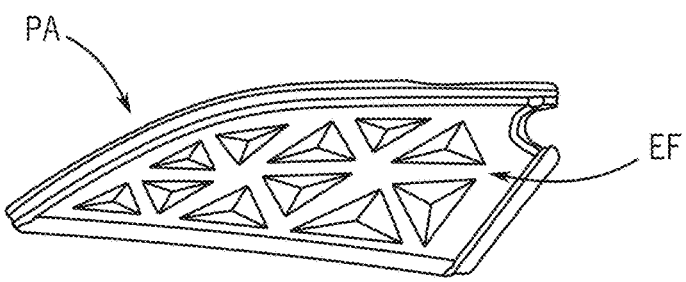
FIGS. 28A to 28G are schematic perspective views of effects for panels for a vehicle interior component according to an exemplary embodiment.
Figure 28B:
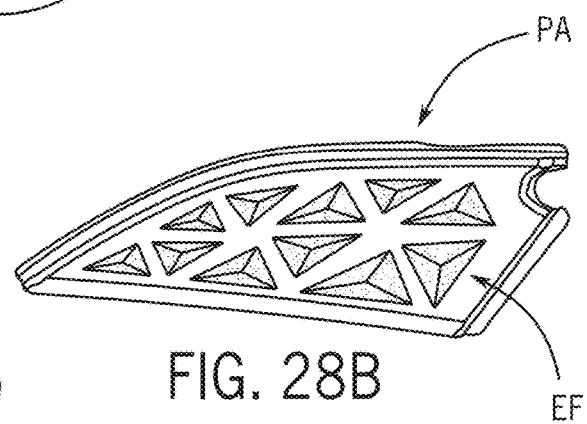
Figure 28C:
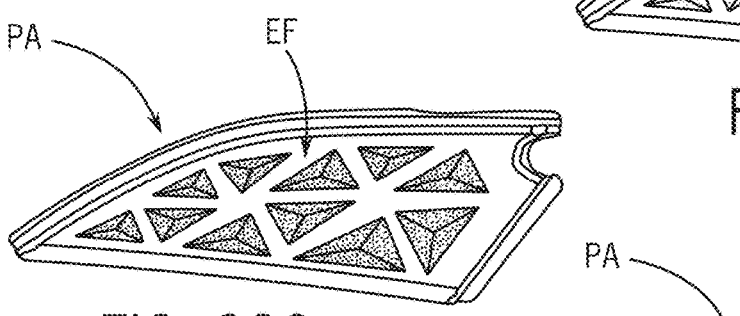
Figure 28D:
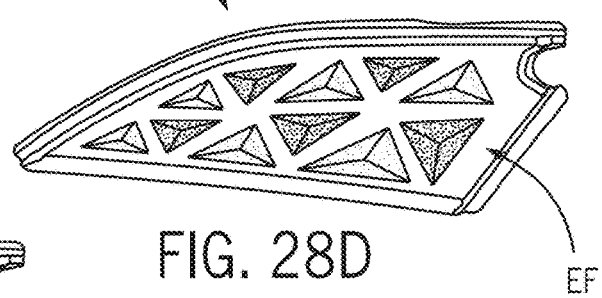
Figure 28E:
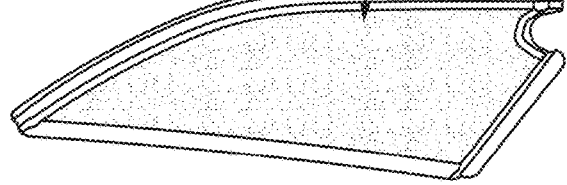
Figure 28F:
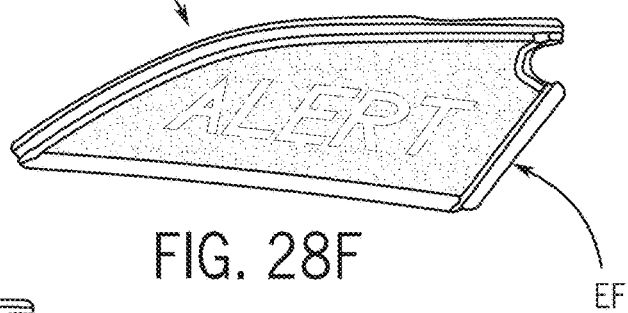
Figure 28G:
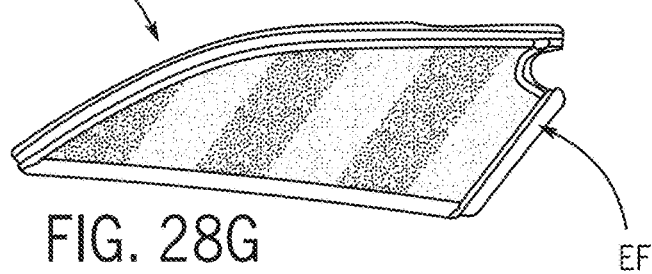

As shown schematically according to an exemplary embodiment in FIGS. 28A-28G, the effect EF for the panel PA of the component may at the user interface comprise an illumination effect such as a dynamic lighting effect with multiple variations, such as color variations, sequencing variations, shading variations, messaging/communications, animation effects, etc. As shown in FIGS. 28A-28D, the panel PA may have lighting/illumination off (FIG. 28A) and then on in one color (FIG. 28B) and on in another color (FIG. 28C) and then on in multiple colors (FIG. 28D); the dynamic lighting effect may produce variations in the ambient environment in the vehicle interior. As shown in FIGS. 28E-28F, messaging such as alerts, warnings, information, etc. may be presented in the vehicle environment by the panel. As shown in FIG. 28G, a decorative effect may be provided with the dynamic lighting effect of the panel. As indicated schematically, the panel may be configured to provide a variety of illumination effects.

As indicated in FIGS. 2C, 2D-2I and 3B, 4A-4B, 8A-8B and 9A-9B, panel PB may be configured to present a user interface UI and effect EF; as shown schematically, panel PB may be provided under a cover shown as on door trim DT of door panel DP to provide a surface effect (e.g. texture, color, etc.) and to be illuminated such as by a light guide LG or light panel LP to present a visual effect such as an illumination effect and/or dynamic lighting effect shown as image IM. See also FIGS. 31A-31C. As indicated schematically in FIGS. 3B and 4A-4B, panel PB may comprise a composite structure with a cover shown as comprising a cover layer TX and cover base TB with functional layers such as diffuser layer DL/FL and mask layer ML with light guide elements LG configured to be illuminated by a light source to present the image IM for the effect EF. As indicated schematically in FIGS. 8A-8B and 9A-9B, panel PB may be configured to be at least partially concealed behind a cover of door trim DT until illuminated to present the illumination effect/image IM as indicated schematically in FIGS. 2C, 2D-2I and 3B.

As indicated in FIGS. 2E, 2H-2I and 3C, 5A-5B, and 6A-6B, panel PC may be configured to present a user interface UI and effect; as shown schematically, panel PC may be provided on door panel DP to provide an effect and to be illuminated such as to present an image IM and with an input device SW. See also FIGS. 31A-31C. As indicated schematically in FIGS. 3C, 5A-5B and 6A-6B, the input device SW of panel PC may comprise an operator control such as a button, switch, dial, sensor, etc.; panel PC may comprise a composite structure with a cover shown as comprising a cover layer TX and cover base TB with functional layers such as diffuser layer DL/FL and mask layer ML with light guide elements LG configured to be illuminated by a light source LS comprising LED elements on a module M; light guide LG may be configured with light source LS and diffuser DL to present the illumination effect shown as image IM; module M may comprise a sensor/sensor grid SG for the input device SW. As indicated schematically in FIGS. 3C, 5A-5B and 6A-6B, the input device SW may comprise an illuminated operator control (e.g. button, switch, dial, etc.) with light segments (e.g. icons, text, indicators, etc.) comprising the image IM.

As indicated in FIGS. 2B, 2D, 2F, 2G-2I and 7A-7B, panel PD and/or panel PE may be configured to present a user interface UI and effect; as shown schematically, panel PD and/or panel PE may be provided on door panel DP to provide an effect and to be illuminated such as to present an image IM and with an input device SW. See also FIGS. 31A-31C. As indicated schematically in FIGS. 2B, 2D, 2F, 2G-2I and 7A-7B, the input device SW of panel PD and/or panel PE may comprise an operator control such as a button, switch, dial, sensor, etc.; input device SW may comprise an illuminated operator control (e.g. button, switch, dial, etc.) with light segments (e.g. icons, text, indicators, etc.) comprising the image IM.

As indicated schematically in FIGS. 3A, 10A-10B, 11A-11B, 12A-12B, 13A-13B, 14A-14B, 15A-15B, 16A-16L and 21A-21B, panel PA may comprise a composite structure with a base/housing shown as substrate SB and a cover TC (e.g. as an assembly with cover base TB and cover layer TX); the panel may be configured to be illuminated from a light source LS module M comprising LED elements configured to provide light L for an effect EF shown as an illumination effect/dynamic lighting effect. See FIGS. 28A-28G.

Figures 10A, 10B:
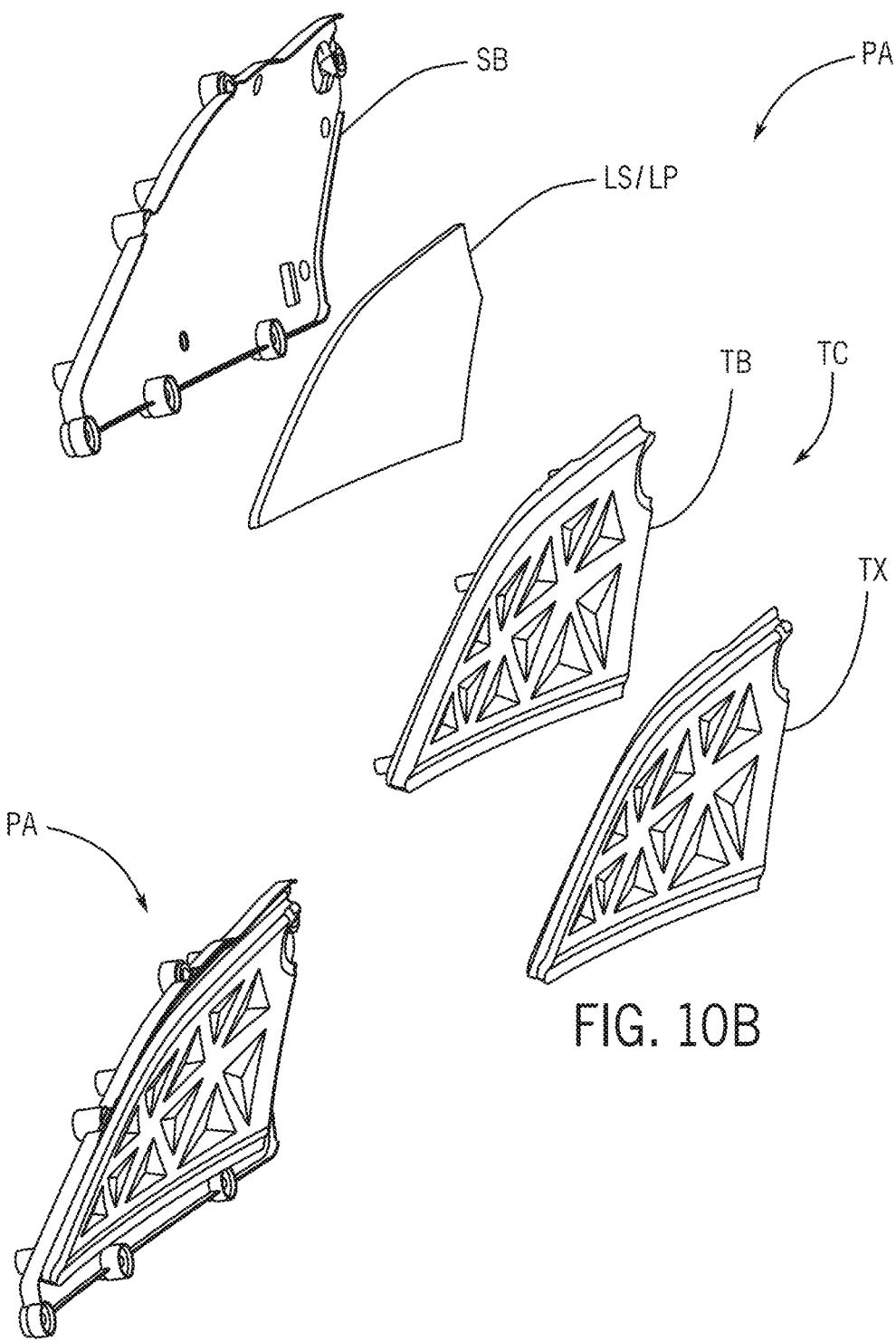
FIG. 10A is a schematic perspective view of a panel for a vehicle interior component according to an exemplary embodiment.
FIG. 10B is a schematic exploded perspective view of a panel for a vehicle interior component according to an exemplary embodiment.

As indicated schematically in FIGS. 10A-10B, panel PA may comprise an assembly of substrate SB with a light source LS shown as a light panel LP and a cover TC comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G.

Figures 11A, 11B:
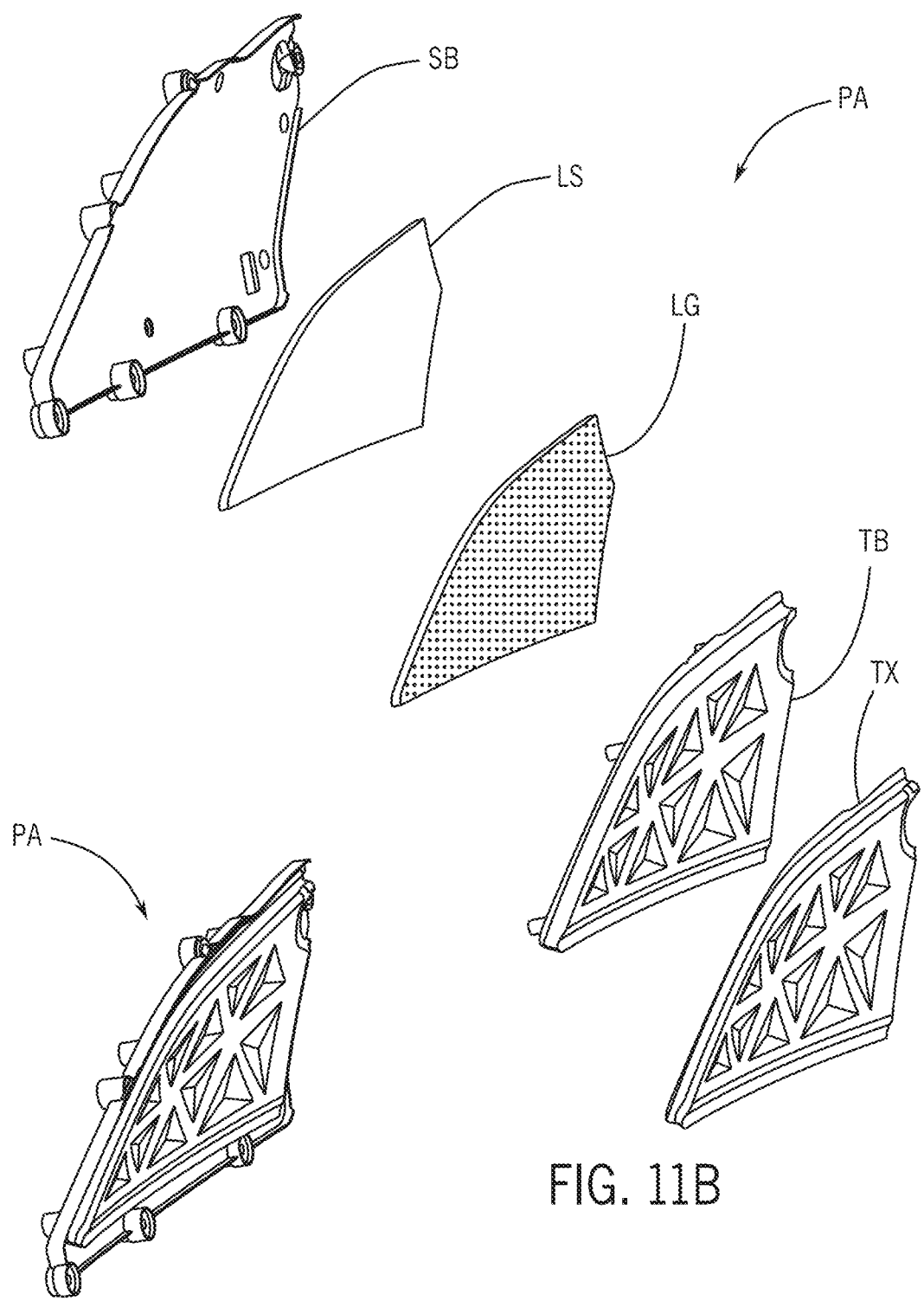
FIG. 11A is a schematic perspective view of a panel for a vehicle interior component according to an exemplary embodiment.
FIG. 11B is a schematic exploded perspective view of a panel for a vehicle interior component according to an exemplary embodiment.

As indicated schematically in FIGS. 11A-11B, panel PA may comprise an assembly of substrate SB with a light source LS and light guide LG and a cover comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G.

Figures 12A, 12B:
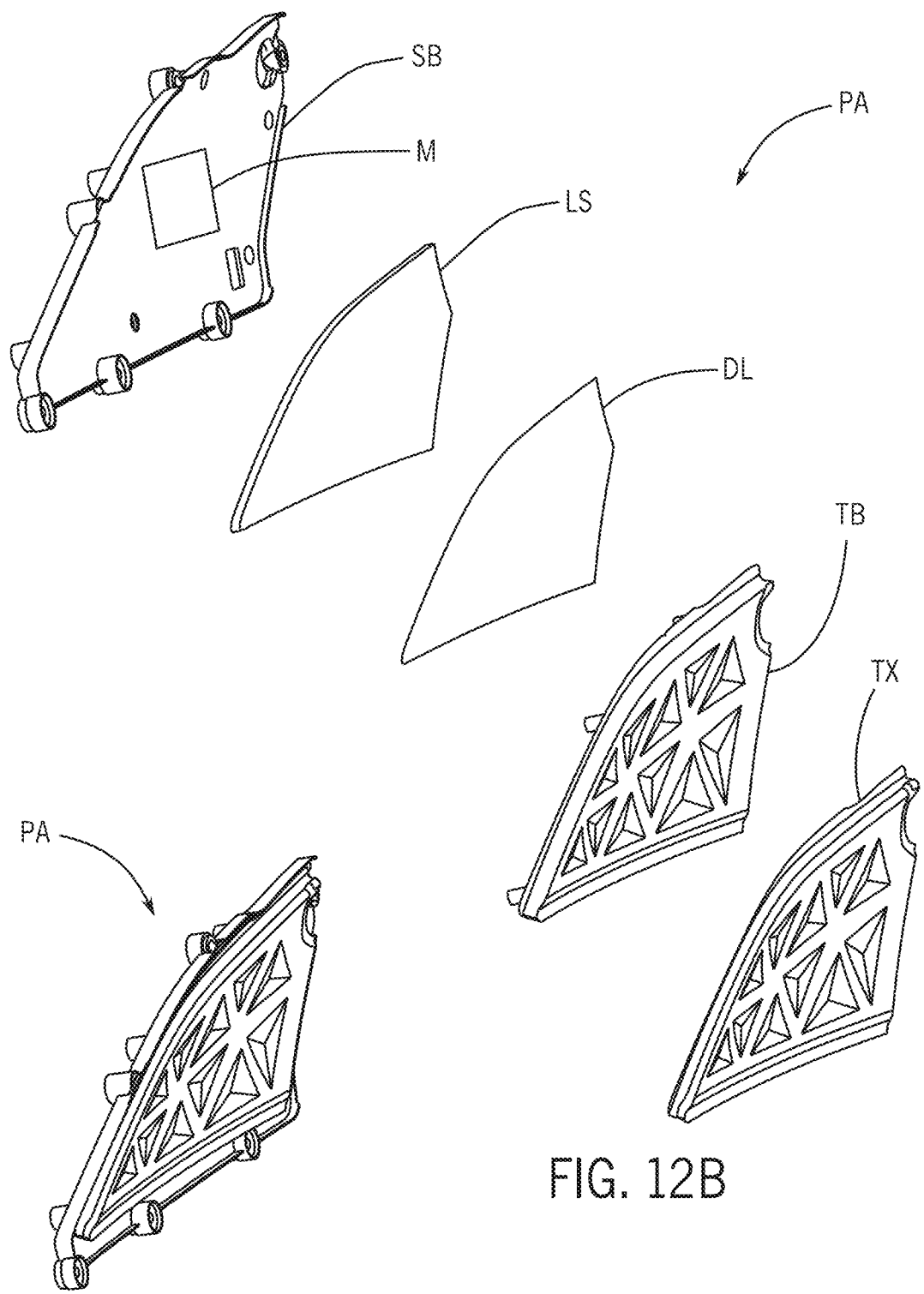
FIG. 12A is a schematic perspective view of a panel for a vehicle interior component according to an exemplary embodiment.
FIG. 12B is a schematic exploded perspective view of a panel for a vehicle interior component according to an exemplary embodiment.

As indicated schematically in FIGS. 12A-12B, panel PA may comprise an assembly of substrate SB with a light source LS operated by a module M and light diffuser DL and a cover comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G.

Figures 13A, 13B:
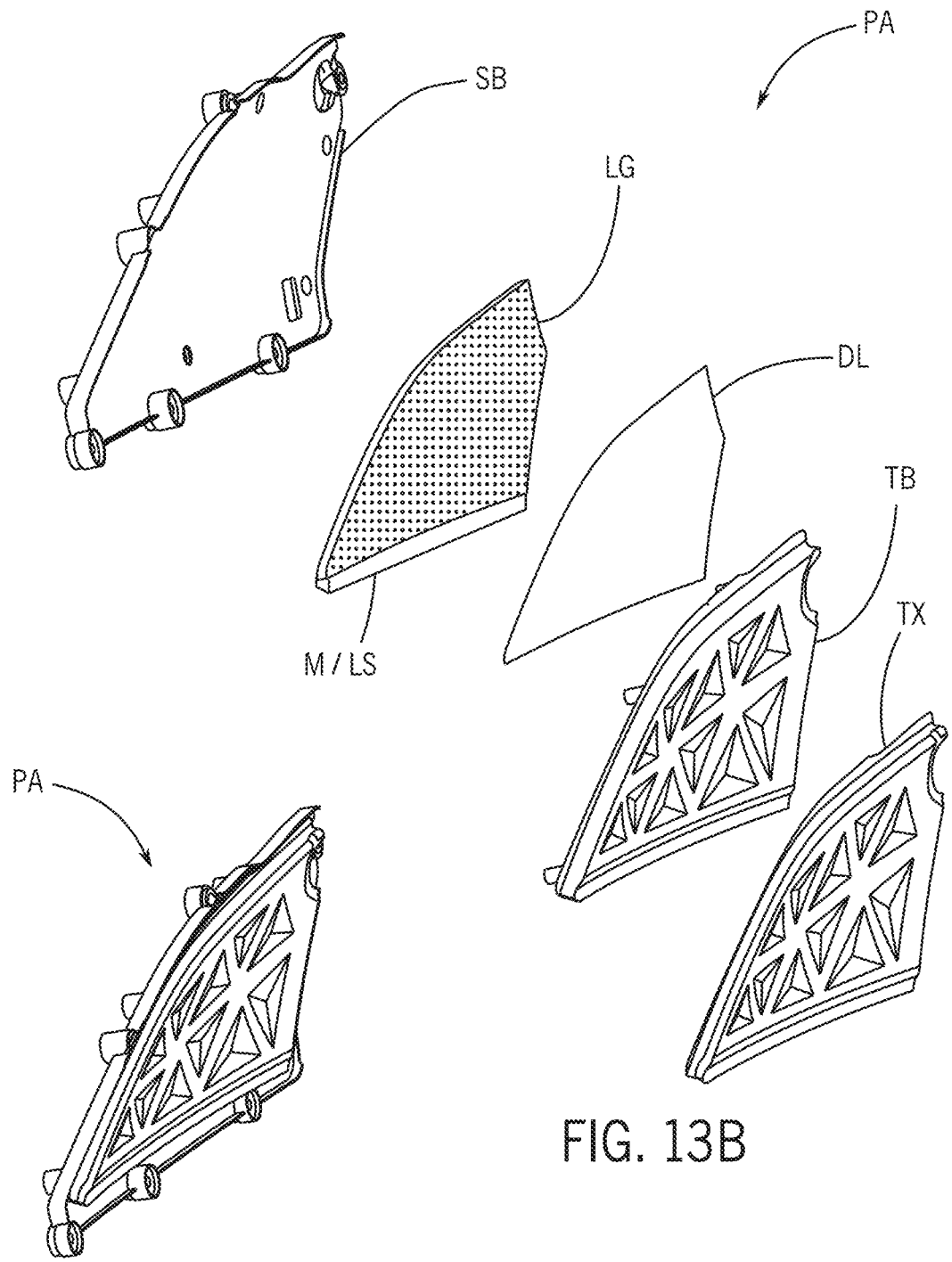
FIG. 13A is a schematic perspective view of a panel for a vehicle interior component according to an exemplary embodiment.
FIG. 13B is a schematic exploded perspective view of a panel for a vehicle interior component according to an exemplary embodiment.

As indicated schematically in FIGS. 13A-13B, panel PA may comprise an assembly of substrate SB with a light source LS operated by a module M and light guide LG and a cover comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G.

Figures 14A, 14B:
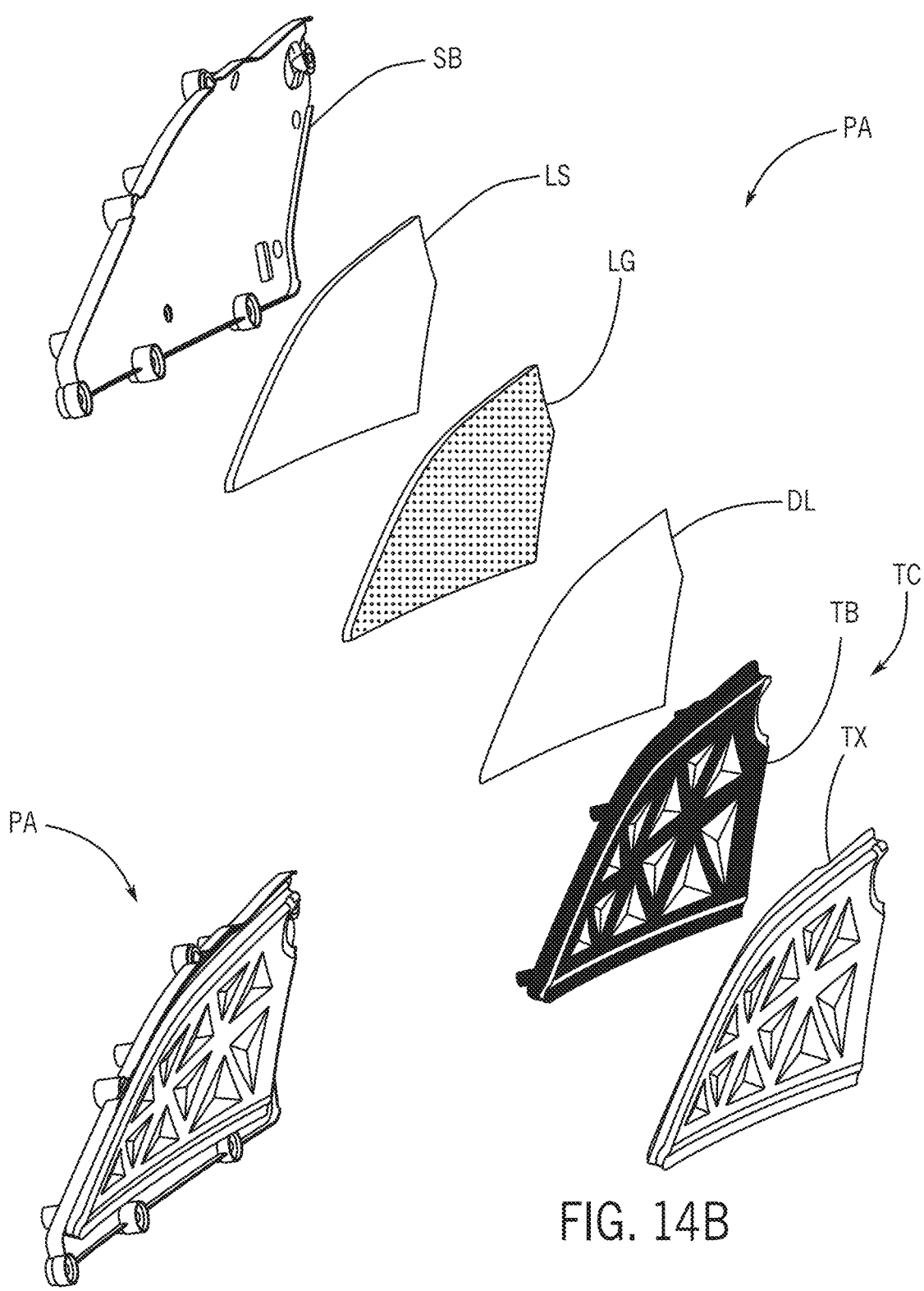
FIG. 14A is a schematic perspective view of a panel for a vehicle interior component according to an exemplary embodiment.
FIG. 14B is a schematic exploded perspective view of a panel for a vehicle interior component according to an exemplary embodiment.
Figures 15A, 15B:
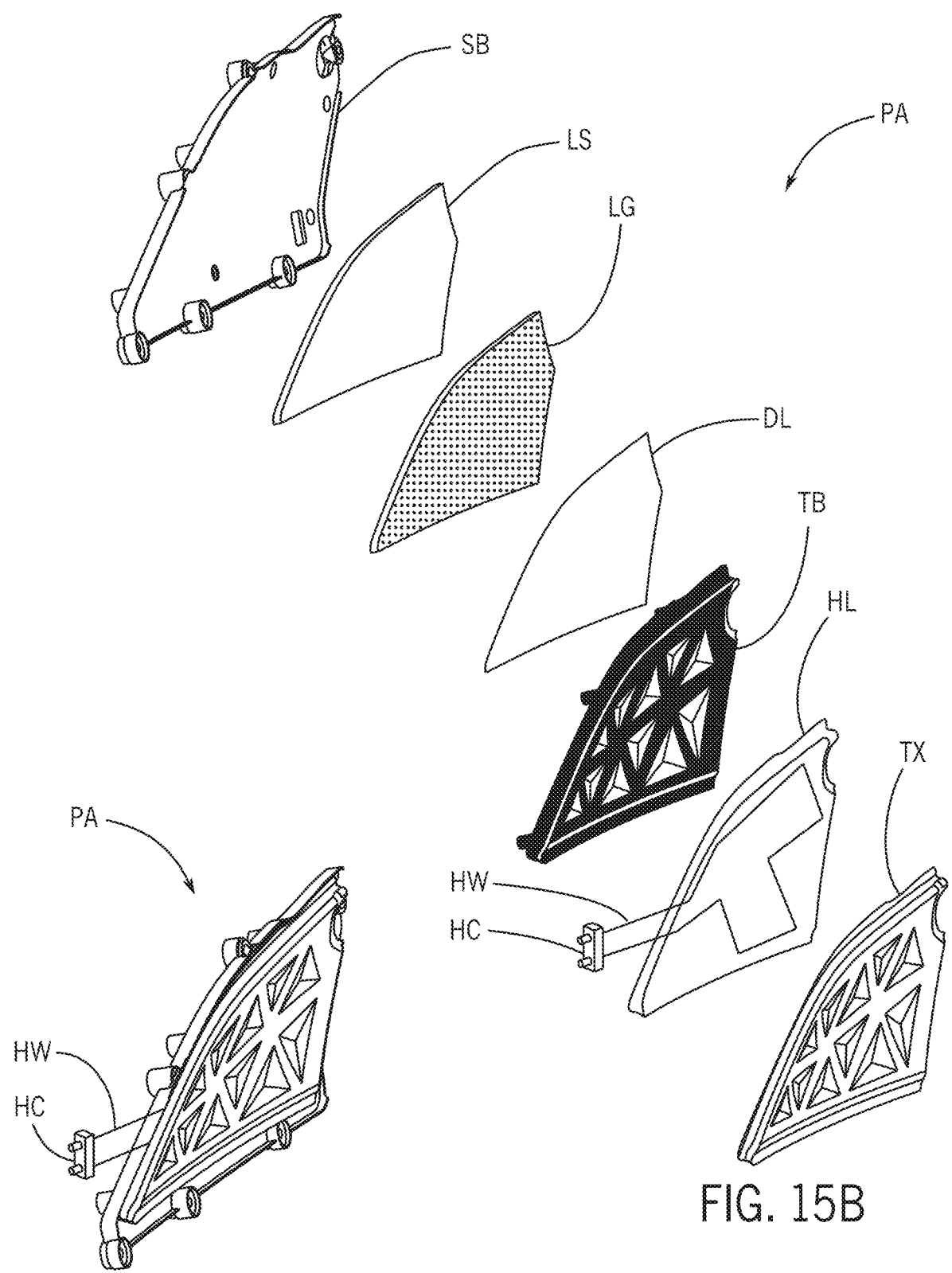
FIG. 15A is a schematic perspective view of a panel for a vehicle interior component according to an exemplary embodiment.
FIG. 15B is a schematic exploded perspective view of a panel for a vehicle interior component according to an exemplary embodiment.
Figure 16A:
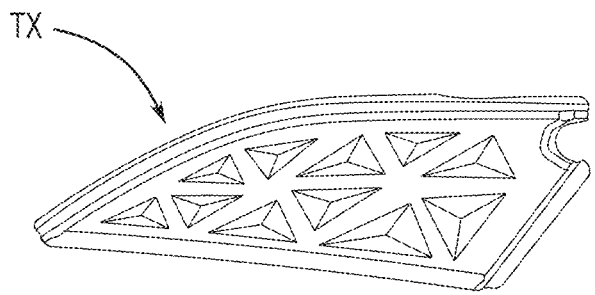
FIG. 16A is a schematic perspective view of a cover for a panel for a vehicle interior component according to an exemplary embodiment.
Figure 16B:
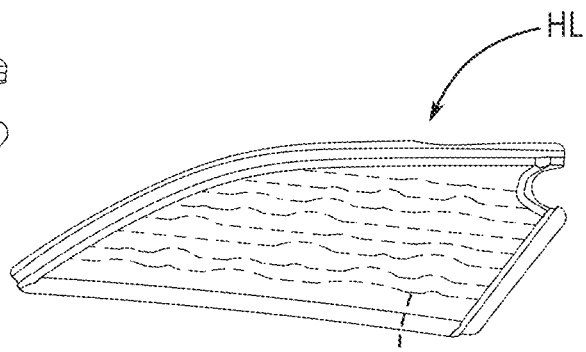
FIG. 16B is a schematic perspective view of a heating element for a panel for a vehicle interior component according to an exemplary embodiment.
Figure 16C:
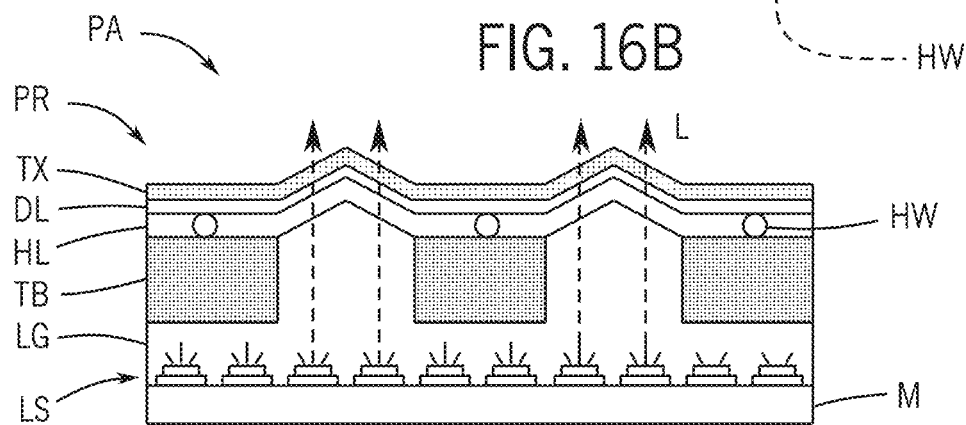
FIG. 16C is a schematic partial section view of a panel with heating element for a vehicle interior component according to an exemplary embodiment.
Figure 16D:
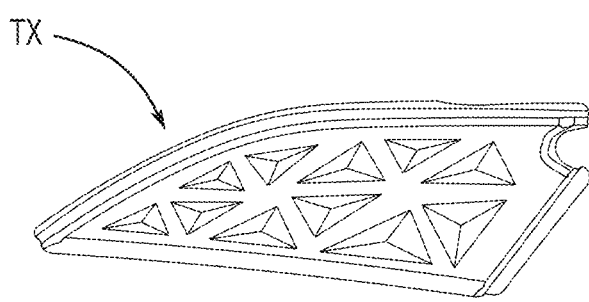
FIG. 16D is a schematic perspective view of a panel for a vehicle interior component according to an exemplary embodiment.
Figure 16E:
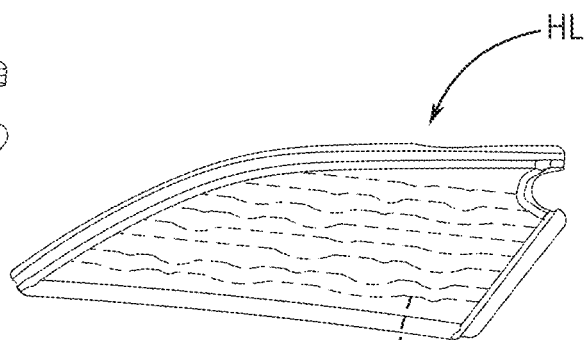
FIG. 16E is a schematic perspective view of a heating element for a vehicle interior component according to an exemplary embodiment.
Figure 16F:
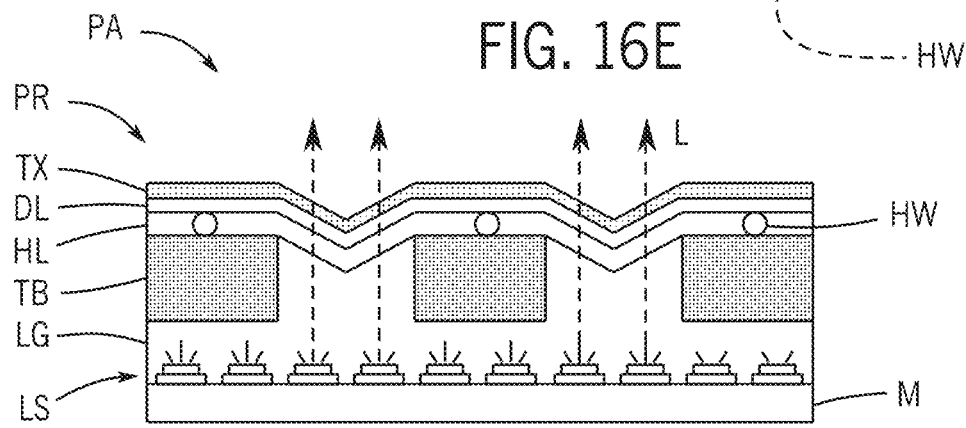
FIG. 16F is a schematic partial section view of a panel with heating element for a vehicle interior component according to an exemplary embodiment.
Figure 16G:
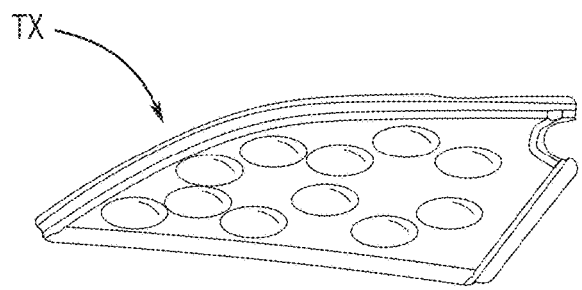
FIG. 16G is a schematic perspective view of a panel for a vehicle interior component according to an exemplary embodiment.
Figure 16H:
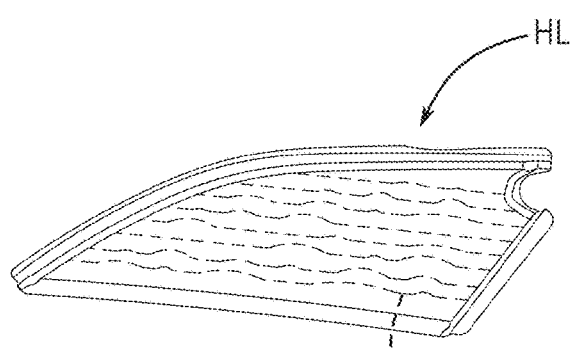
FIG. 16H is a schematic perspective view of a heating element for a panel for a vehicle interior component according to an exemplary embodiment.
Figure 16I:
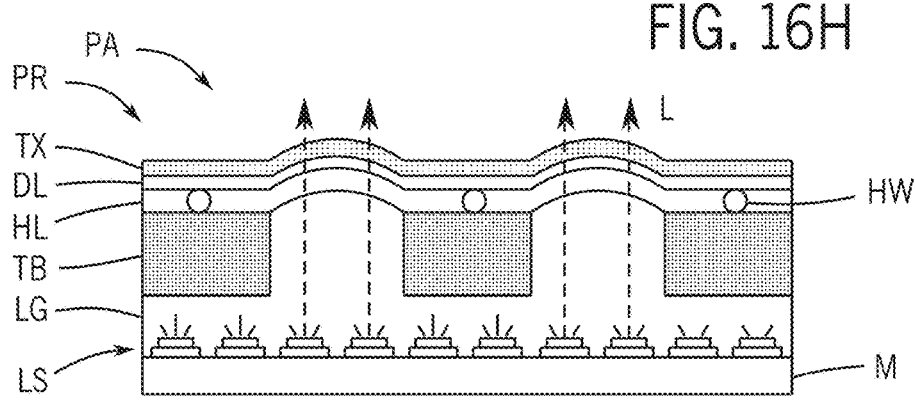
FIG. 16I is a schematic partial section view of a panel with heating element for a vehicle interior component according to an exemplary embodiment.
Figure 16J:
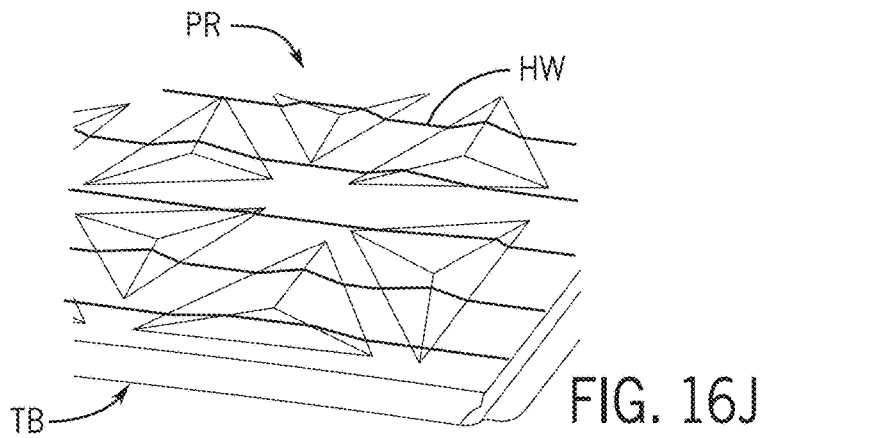
FIGS. 16J to 16L are a schematic cut-away perspective view of a panel with heating element for a vehicle interior component according to an exemplary embodiment.
Figure 16K:
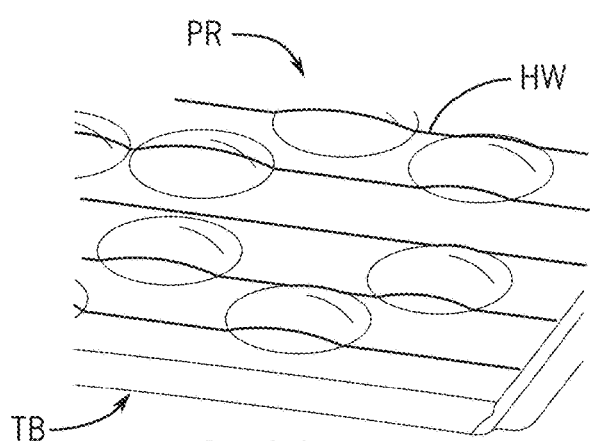
Figure 16L:
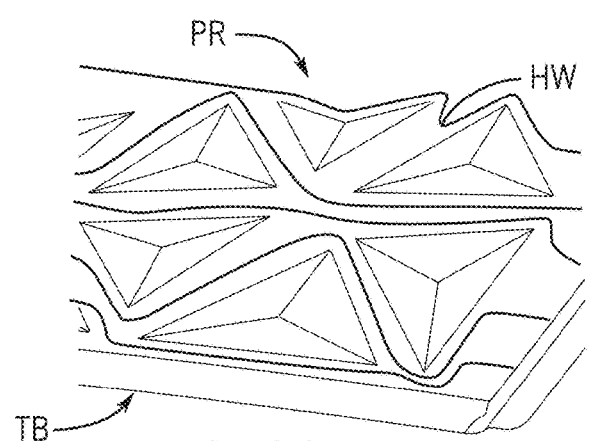
Figure 17A:
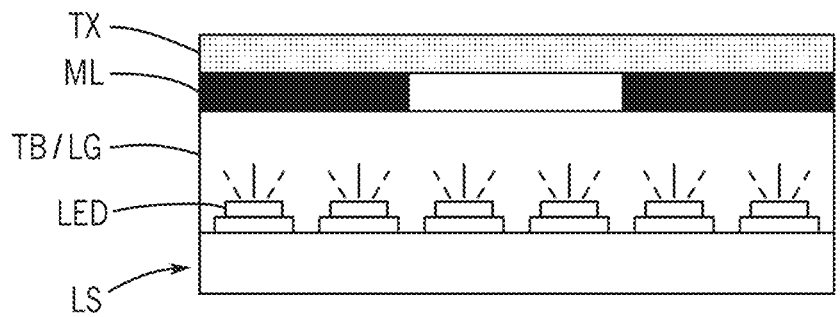
FIGS. 17A to 17F are schematic partial section views of a panel for a vehicle interior component according to an exemplary embodiment.
Figure 17B:
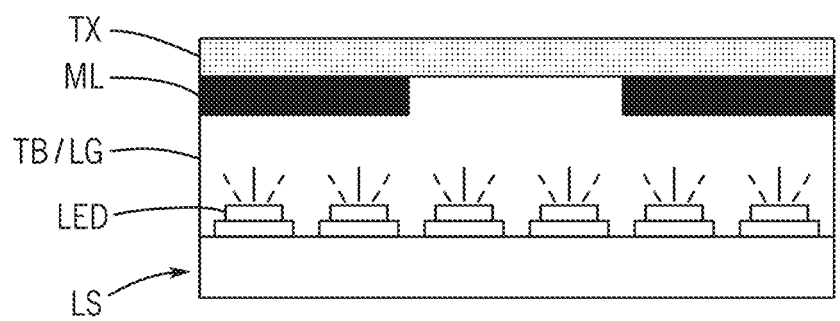
Figure 17C:
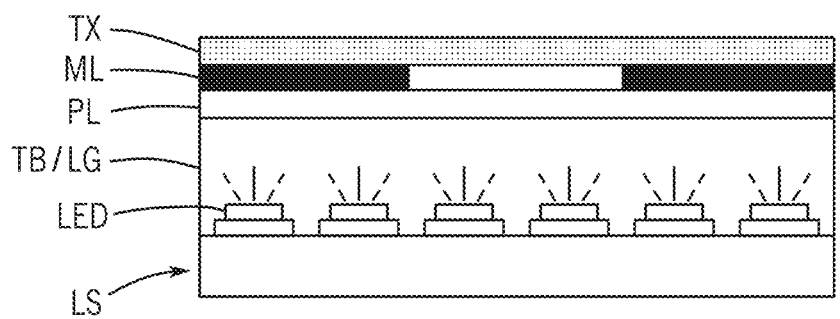
Figure 17D:
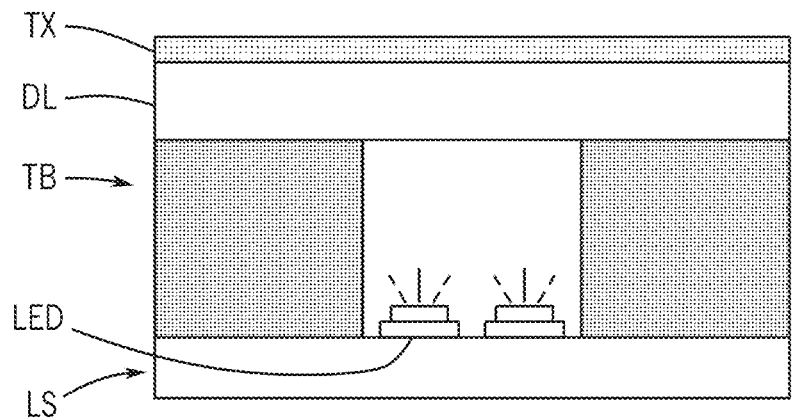
Figure 17E:
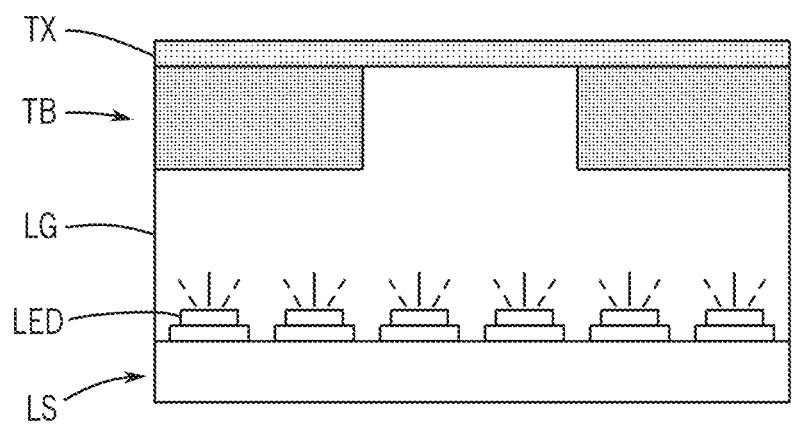
Figure 17F:
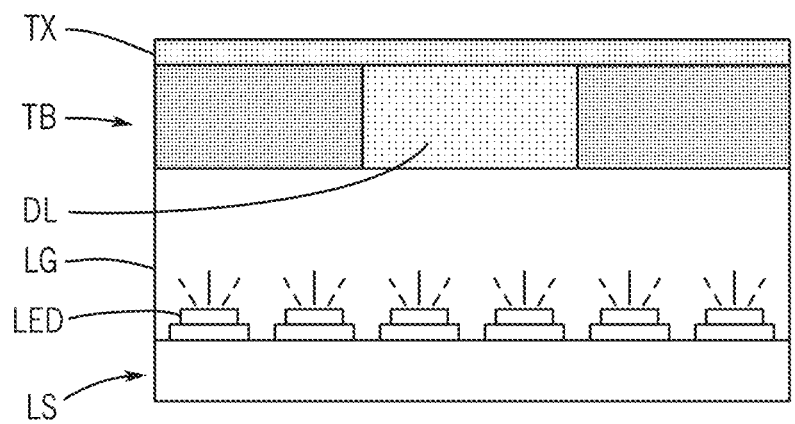
Figure 18:
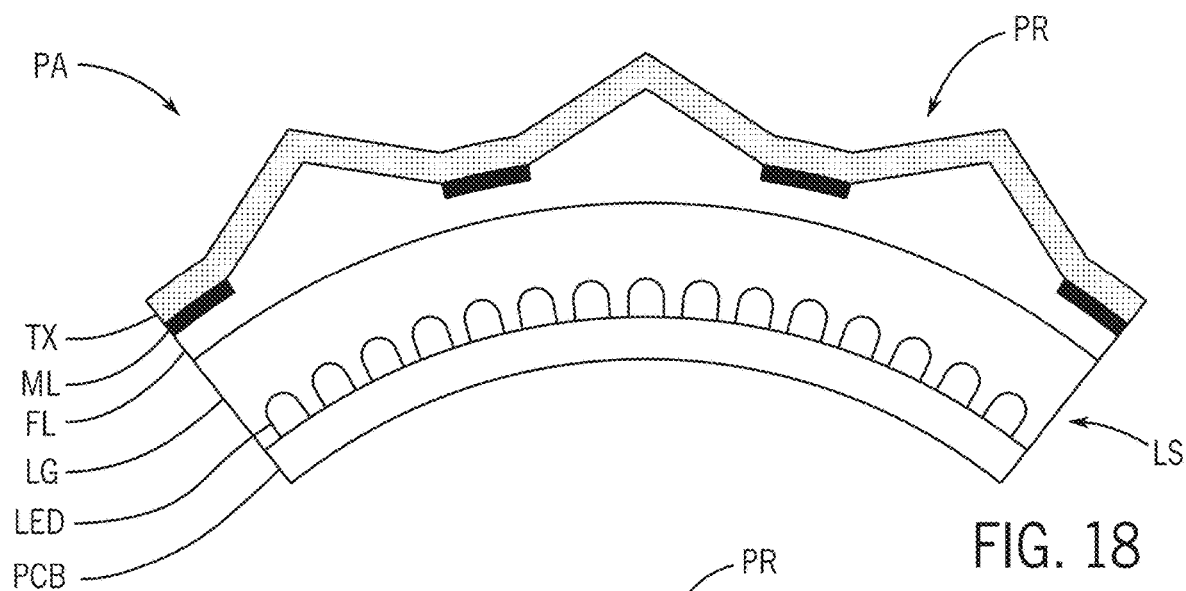
FIG. 18 is a schematic partial section view of a panel for a vehicle interior component according to an exemplary embodiment.
Figure 19A:
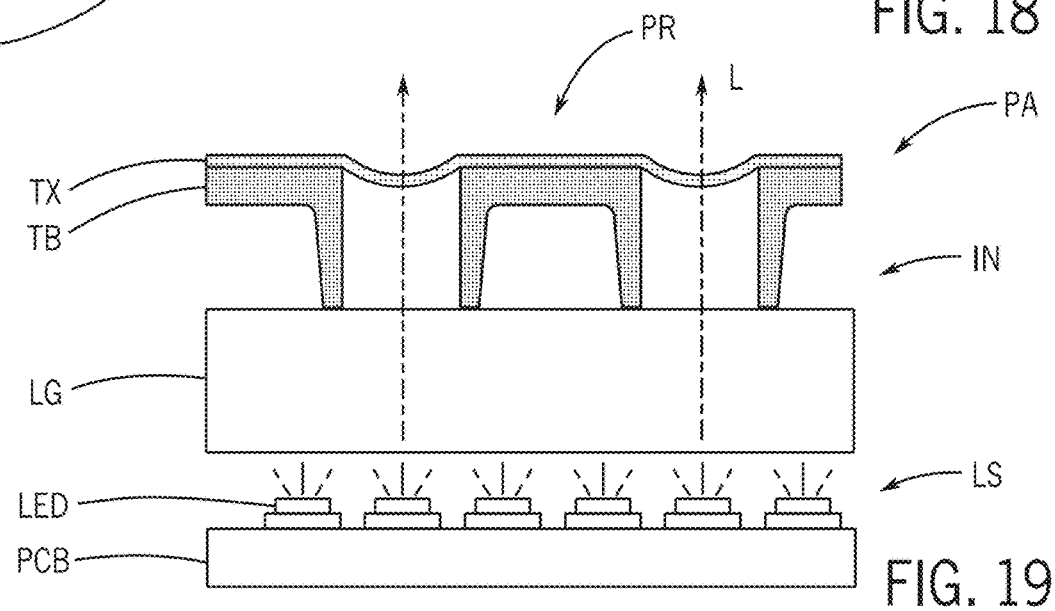
FIGS. 19A to 19D are schematic partial section views of panel for a vehicle interior component according to an exemplary embodiment.
Figure 19B:
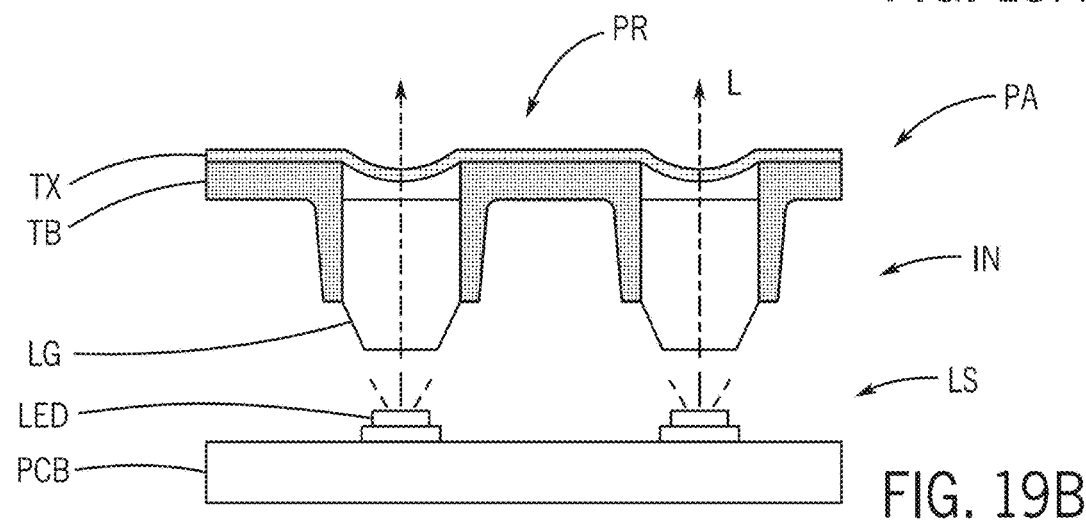
Figure 19C:
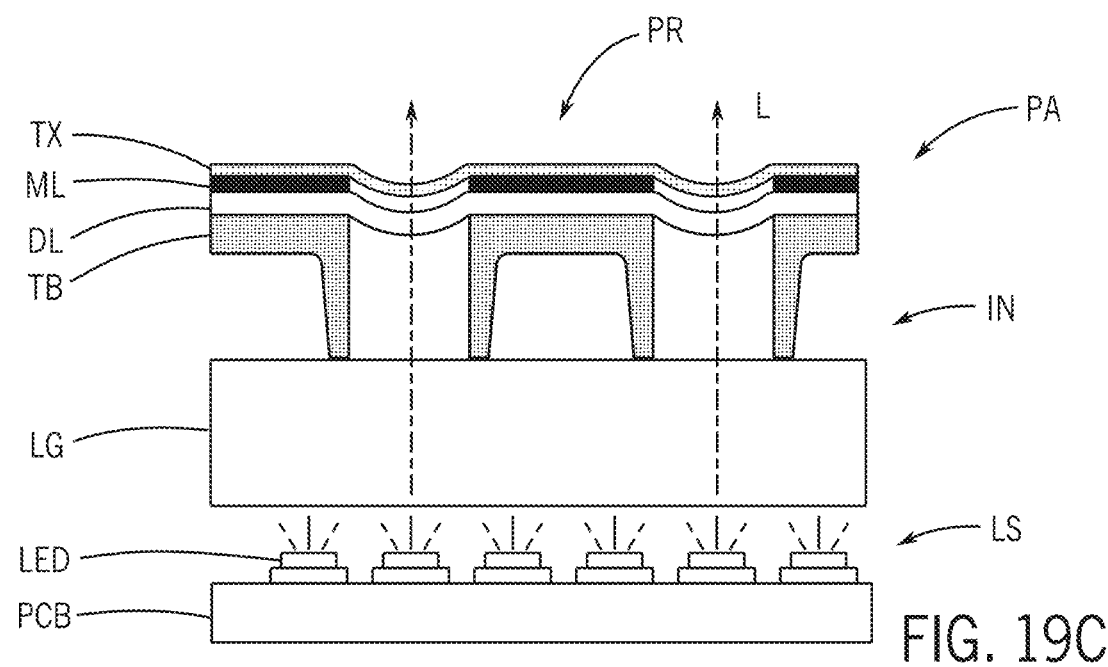
Figure 19D:
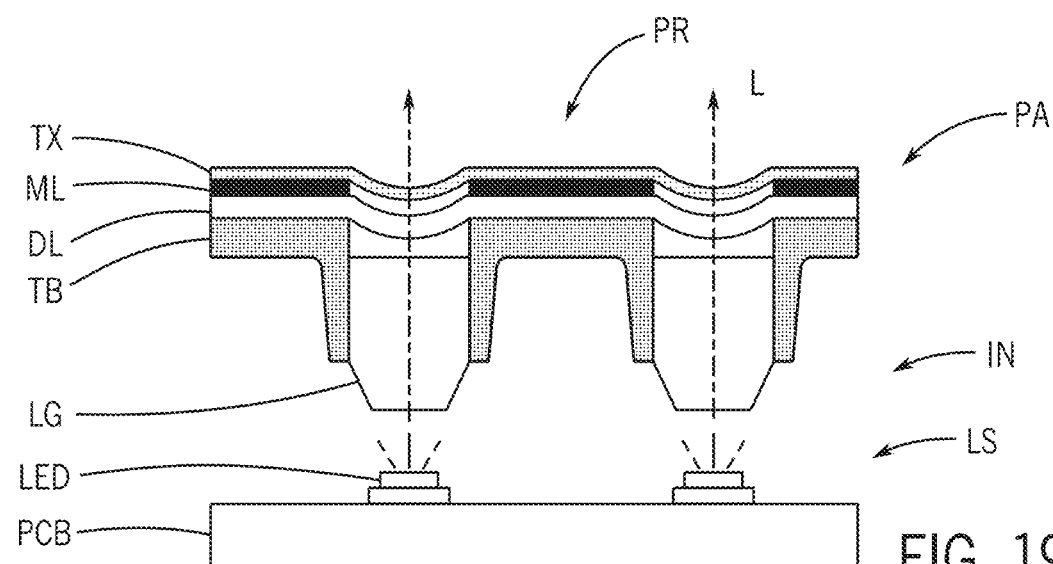
Figure 20A:
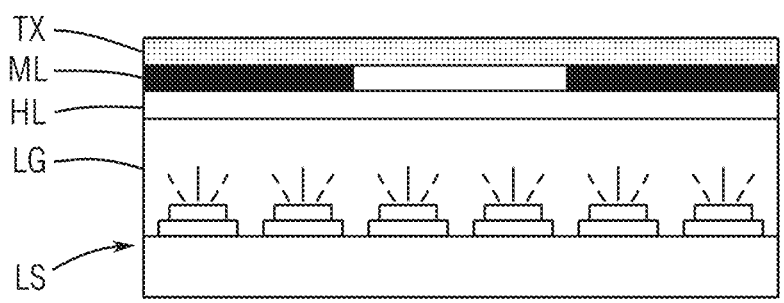
FIGS. 20A to 20E are schematic partial section views of panel for a vehicle interior component according to an exemplary embodiment.
Figure 20B:
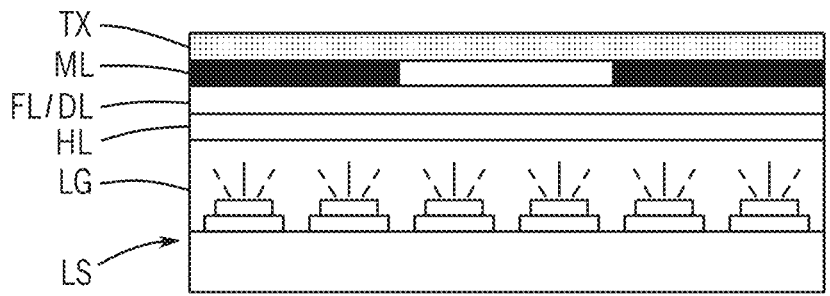
Figure 20C:
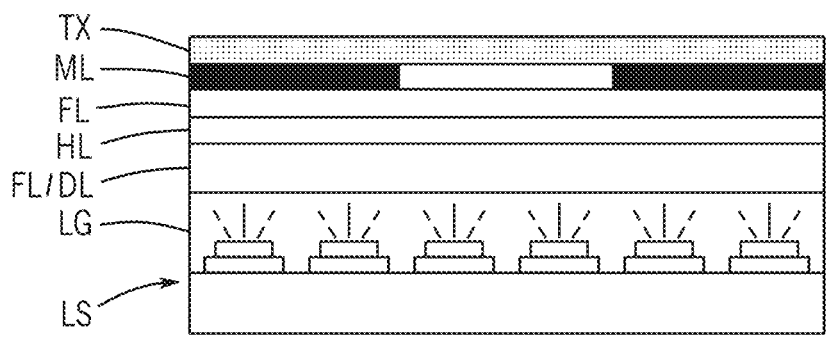
Figure 20D:
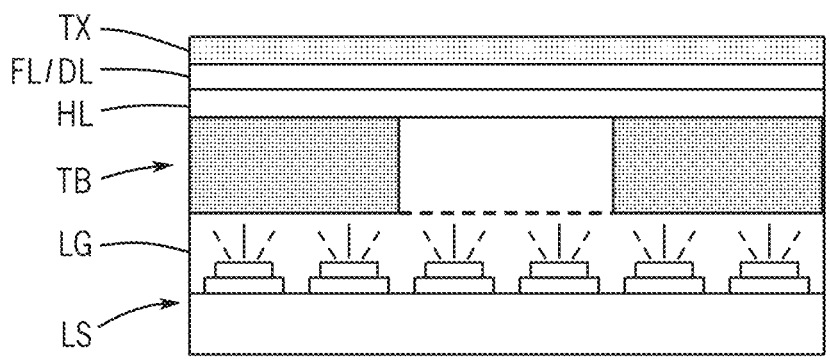
Figure 20E:
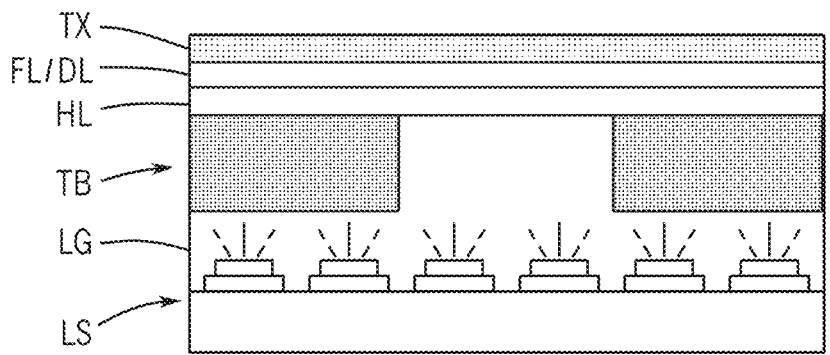
Figure 21A:
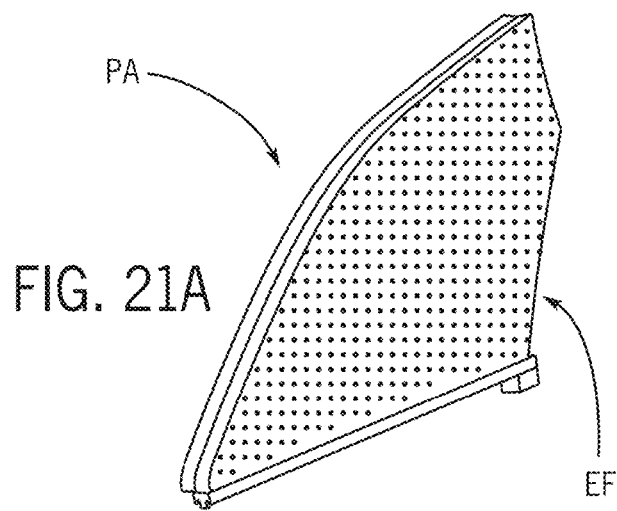
FIG. 21A is a schematic perspective view of a panel for a vehicle interior component according to an exemplary embodiment.
Figure 21B:
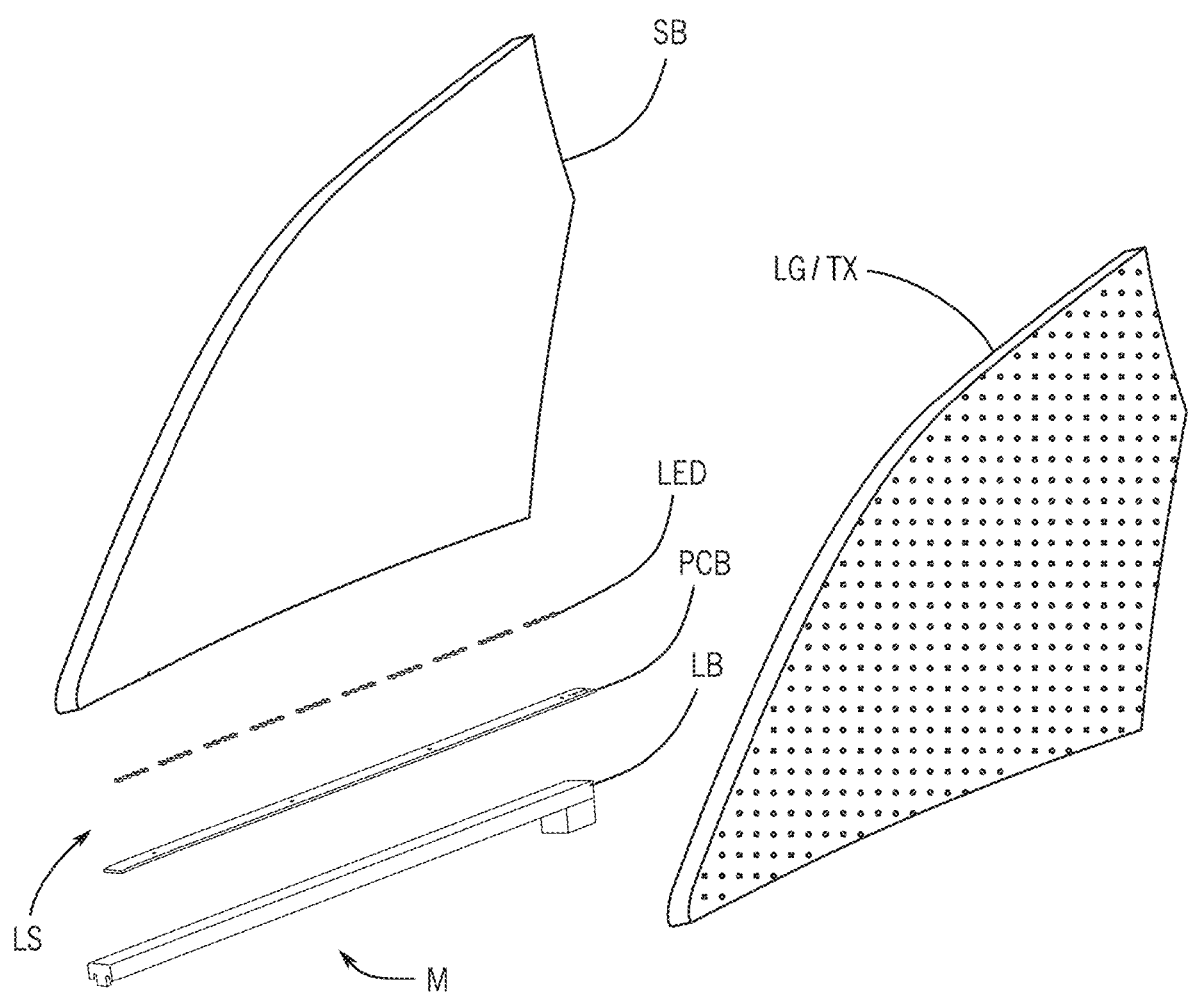
FIG. 21B is a schematic exploded perspective view of a panel for a vehicle interior component according to an exemplary embodiment.
Figure 23A:
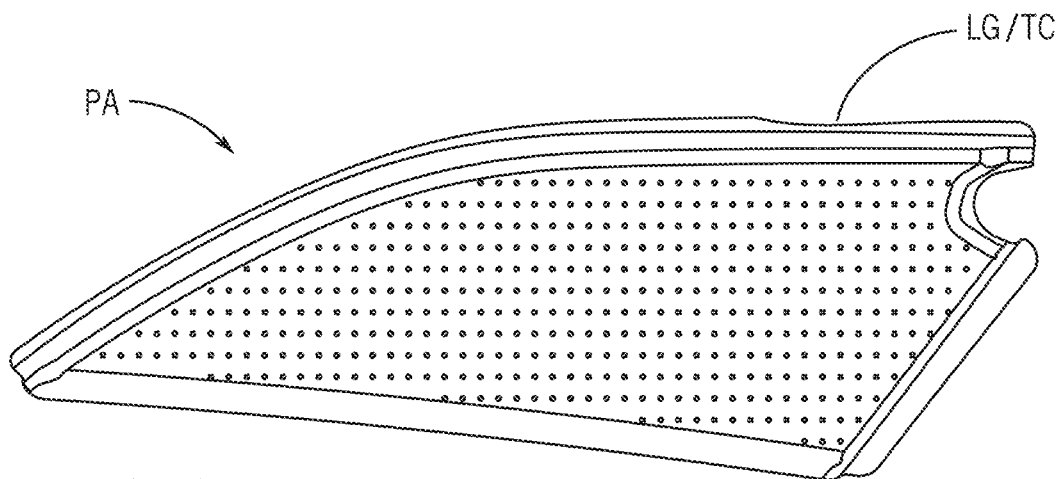
FIG. 23A is a schematic perspective view of a panel for a vehicle interior component according to an exemplary embodiment.
Figure 23B:
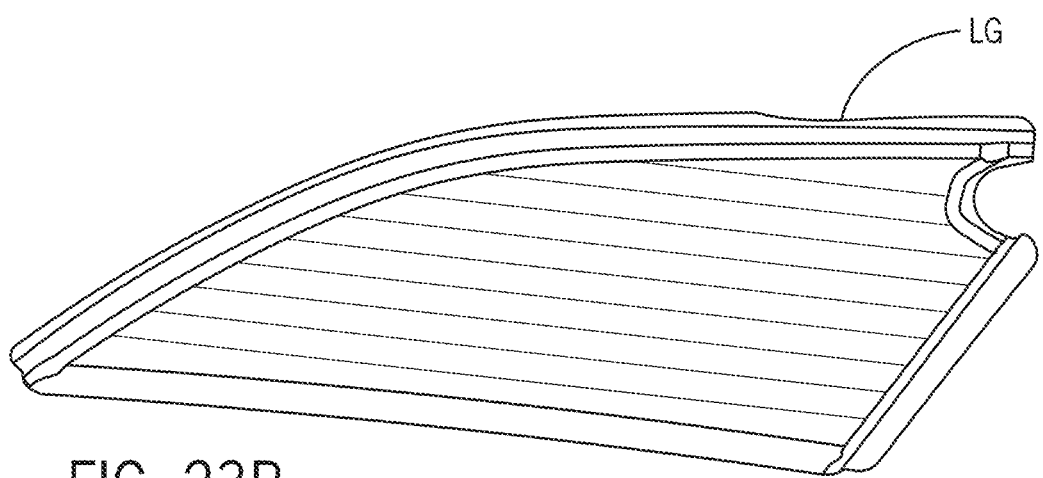
FIG. 23B is a schematic perspective view of a light guide for a panel for a vehicle interior component according to an exemplary embodiment.
Figure 23C:
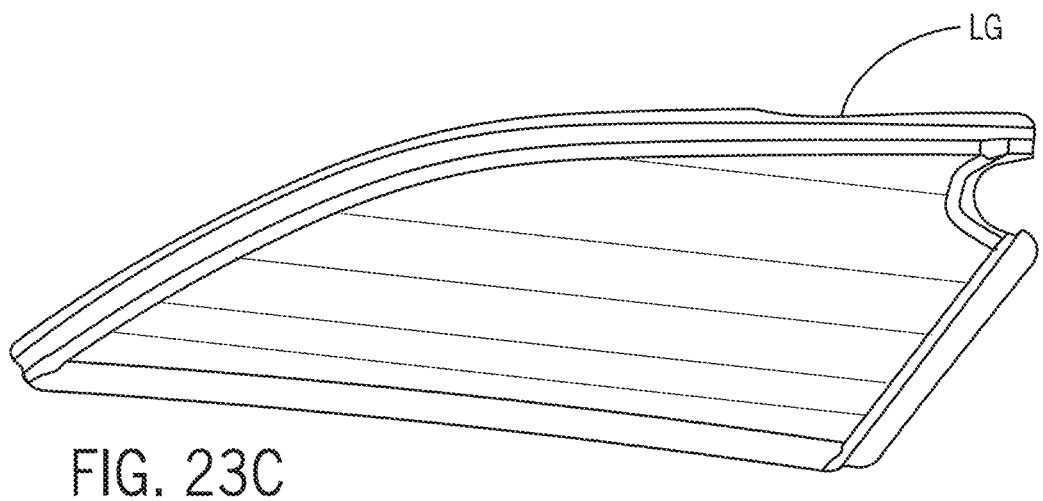
FIG. 23C is a schematic perspective view of a light guide for a panel for a vehicle interior component according to an exemplary embodiment.
Figure 24A:
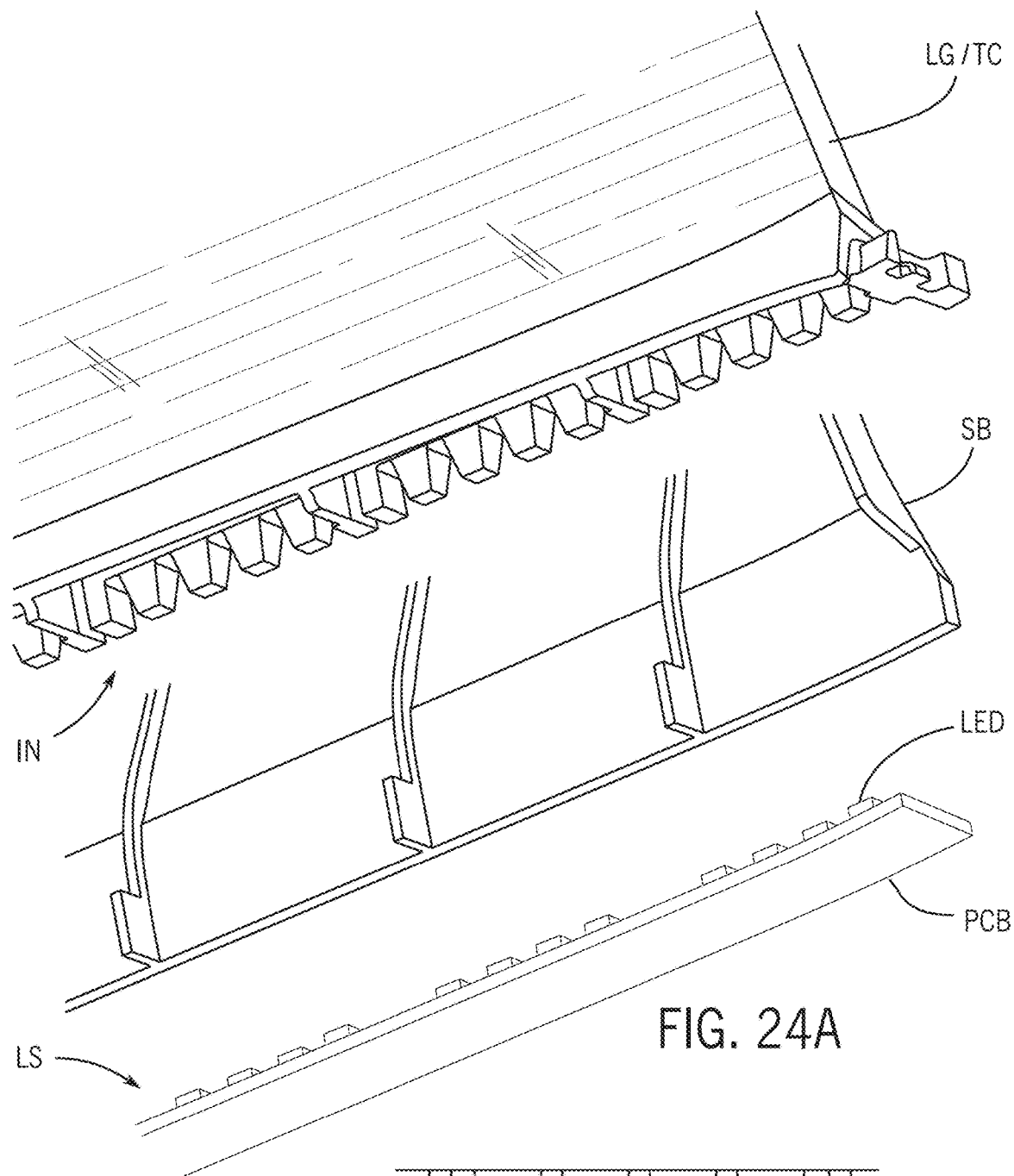
FIG. 24A is a schematic exploded partial cut-away perspective view of a panel for a vehicle interior component according to an exemplary embodiment.
Figure 24B:
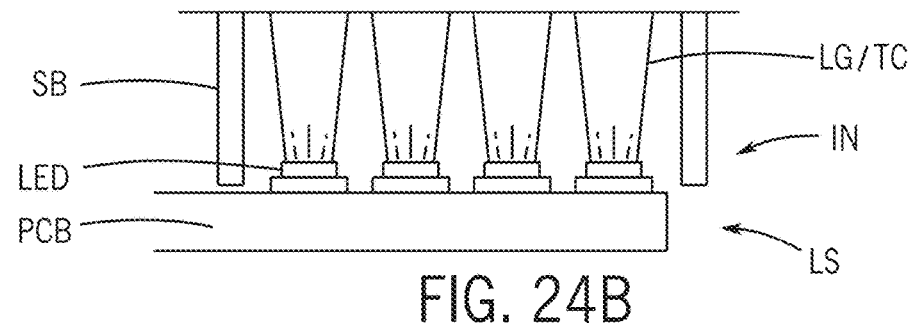
FIG. 24B is a schematic cut-away section view of a panel for a vehicle interior component according to an exemplary embodiment.
Figure 25A:
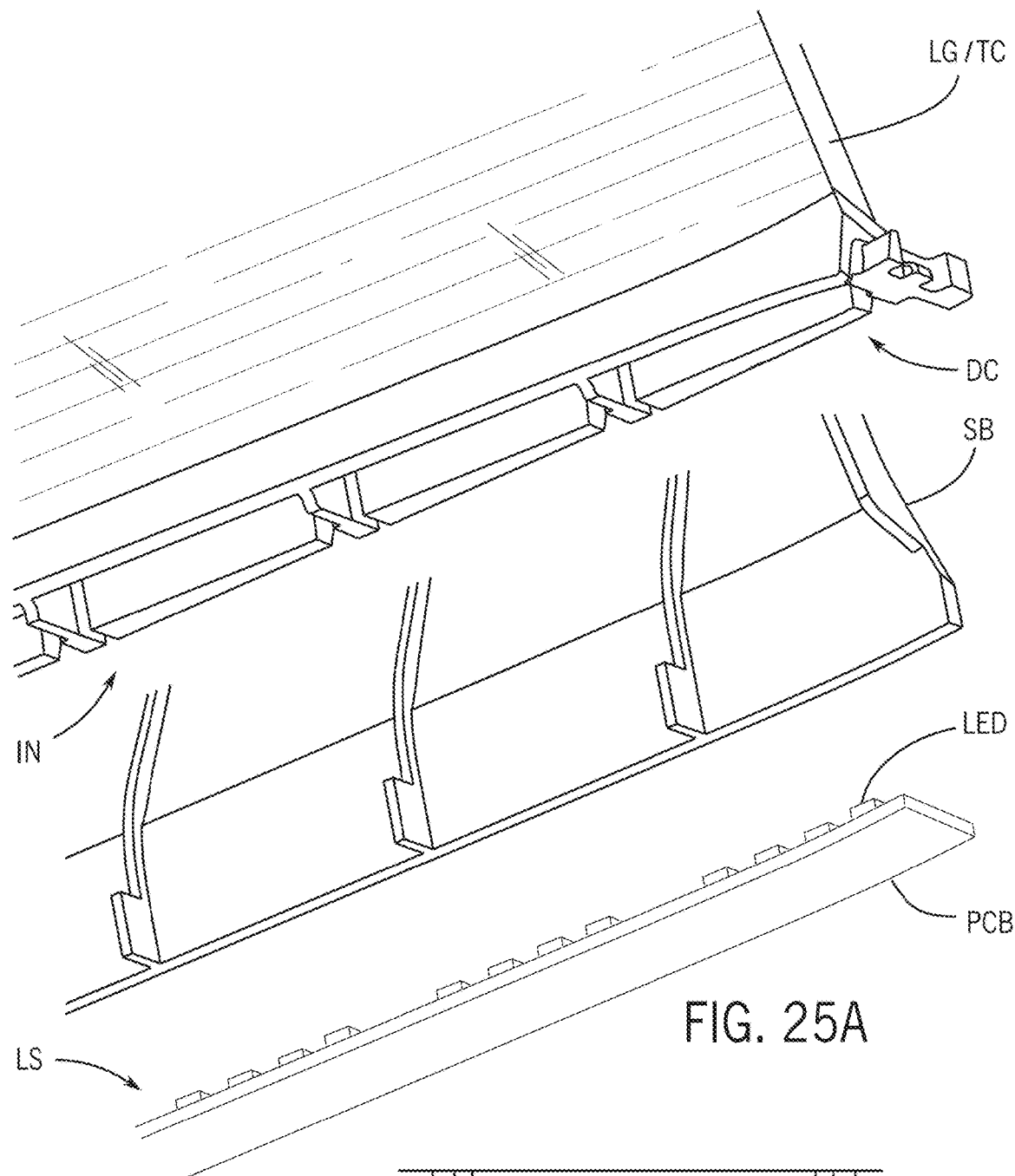
FIG. 25A is a schematic exploded partial cut-away perspective view of a panel for a vehicle interior component according to an exemplary embodiment.
Figure 25B:
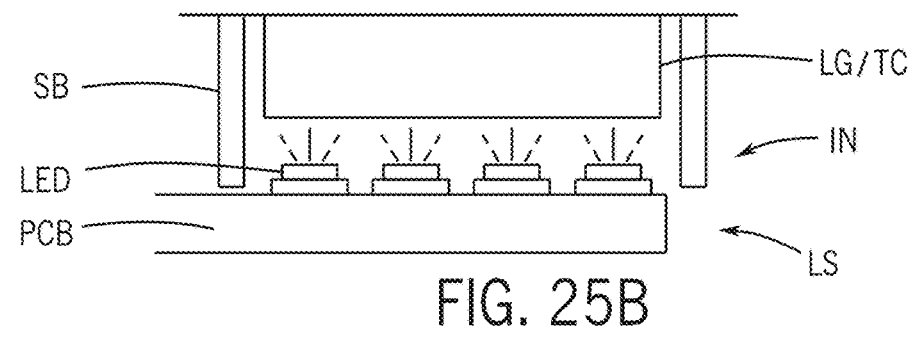
FIG. 25B is a schematic cut-away section view of a panel for a vehicle interior component according to an exemplary embodiment.

As indicated schematically in FIGS. 14A-14B, panel PA may comprise an assembly of substrate SB with a light source LS and light guide LG and light diffuser DL and a cover comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G.

As indicated schematically in FIGS. 15A-15B and 16A-16L, panel PA may comprise an assembly of substrate SB with a light source LS and light guide LG and a cover comprising a cover base TB and a cover layer TX to provide a profile PR comprising a three-dimensional form as a surface effect and to be illuminated to present a visual effect such as an illumination effect and/or dynamic lighting effect for the component. See also FIGS. 28A-28G. As indicated schematically in FIGS. 15A-15B and 16A-16L, panel PA may comprise a heating element HL comprising heating wires HW and a connector HC; heating element HL may be integrated/formed within the profile/form PR of panel PA; as indicated in FIGS. 16B, 16C, 16E, 16F, 16H, 16I and 16J-16L, the heating wires HW of heating element HL may be configured to fit/form on (FIGS. 16J-16K) and/or around (FIG. 16L) the shape/form and profile to provide an intended thermal effect and an intended visual effect/concealment. See also FIGS. 37 and 38 (representational diagrams of visual effect and thermographic/uniform heating of panel). As indicated schematically in FIGS. 16C, 16F and 16I, panel PA may comprise a cover comprising cover base TB and cover layer TX with heating element HL/wires HW and a light guide LG configured to be illuminated by light L from a light source LS comprising LED elements on a module M; light guide LG may be configured with light source LS and diffuser DL to present the illumination effect shown from light L shown as image IM and/or as a dynamic lighting effect. See FIGS. 28A-28G. As indicated schematically according to an exemplary embodiment in FIGS. 37 and 38 (visual effect and of representative thermographic imaging), integrated heating element HL with heating wires HW is configured to be generally concealed from appearance in the visual effect of panel PA but will provide generally uniform heating/temperature across the surface of panel PA to provide for enhanced/reliable comfort in the vehicle interior. See also FIGS. 16A-16L.

As indicated schematically in FIGS. 21A-21B, 22A-22D, 24A-24B and 25A-25B, panel PA may comprise an assembly of substrate SB with a cover TC comprising a cover layer TX and light guide LG configured to be illuminated by a light source LS/module M comprising a circuit board PCB with LED elements to present a visual effect such as an illumination effect and/or dynamic lighting effect for the component. As indicated schematically in FIGS. 22C-22D, 24A-24B and 25A-25B, an interface IN is provided for the light guide LG and substrate SB and light source LS; interface IN may comprise a mechanical connection/fit to assemble the panel and optical connection for direction and transmission of light L for the effect at the cover of the panel (including by direct coupling of LED elements or with separation and/or with light blocking as indicated). As indicated schematically in FIGS. 22A-22B, 23A-23C, 24A-24B and 25A-25B, the light guide LG may comprise a construction/internal structure configured to provide a diffusion effect, color effect, design, gradient effect, etc. for transmission of light and/or structure to separate/segment transmission of light from LED elements (e.g. with optical blocking within light guide or with substrate ribs, etc.).

As shown schematically according to an exemplary embodiment in FIGS. 3A, 10A-10B, 11A-11B, 12A-12B, 13A-13B, 14A-14B, 15A-15B, 16A-16L, 17A-17F, 18, 19A-19D, 20A-20E and 30A-30C, the panel may be constructed as a composite structure in any of a variety of forms on a base/substrate SB with a cover comprising a cover layer TX and cover base TB and a light guide LG; the composite structure of the panel may comprise a functional layer FL such as a mask layer ML and/or heating element HL and/or diffuser layer DL and/or positioning/spacer layer, etc. See also FIGS. 29A-29B, 32, 33A-33C, 34A-34C, 35A-35C and 36A-36C. As shown schematically according to an exemplary embodiment in FIGS. 17A-17F, 18 and 30A-30C, the panel may be illuminated to provide the illumination effect EF with light L from a light source LS with LED elements; the light source LS may be operated by a module M (e.g. with a circuit board PCB). As indicated schematically in FIGS. 19A-19D, the light guide LG may comprise a set of segments and/or a form configured for an interface IN with the housing/substrate SB to provide both a mechanical connection/fit and an optical connection with light source LS for assembly of panel PA; the mechanical/optical connection may comprise structure elements such as dividers/ribs and slots/groove for assembly and/or for optical performance (e.g. blocking, segmenting, directing, etc. of light).

As shown schematically according to an exemplary embodiment in FIGS. 26A-26D and 27A-27D, the panel PA may comprise a light-transmissive cover layer TX with a profile PR and a light-transmissive cover base TB with a profile PR; the panel PA may be provided in a profile/form PR such as a curved form with the light source LS and flexible circuit board PCB with light elements such as an LED array or flat/surface-mount LED elements conformed to fit the shape of the structure/form; the profile PR may comprise projections that provide effect EF such as a surface effect for the panel PA.

As shown schematically according to an exemplary embodiment in FIGS. 29A-29B and 30A-30C, light guide LG of the panel PA may be formed in a tool MT (e.g. by injection molding) as a molded form in a shape/profile with the light source LS conformed for assembly; a film such as an optical film OF may be applied at and/or as the cover layer TX for the cover TC of the panel PA.

Figure 31A:
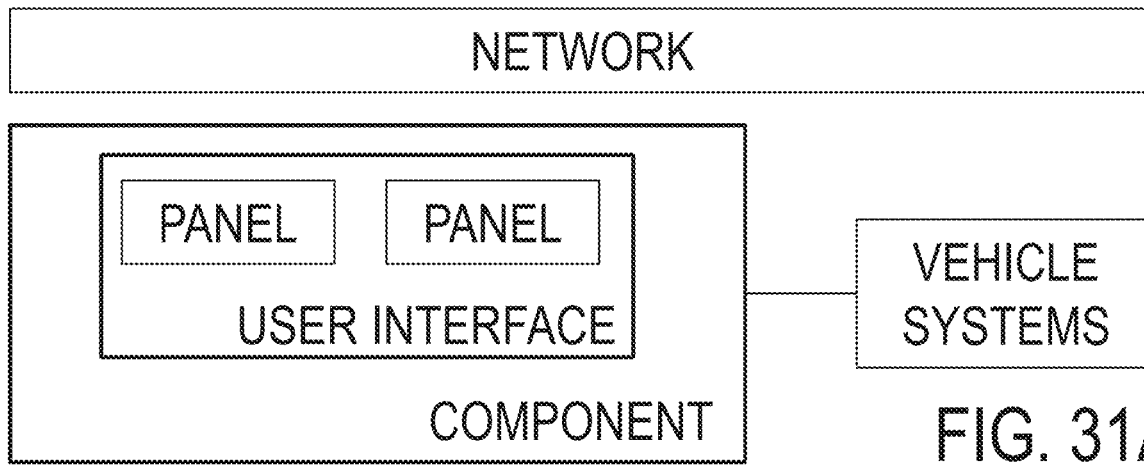
FIGS. 31A to 31C are schematic block diagrams of integration of a component providing a user interface with vehicle systems and/or network according to an exemplary embodiment.
Figure 31B:
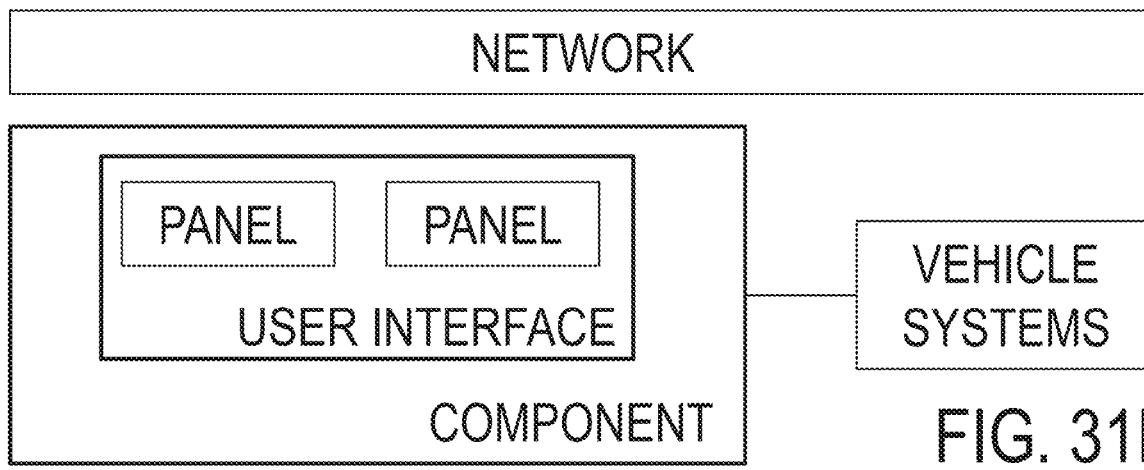
Figure 31C:
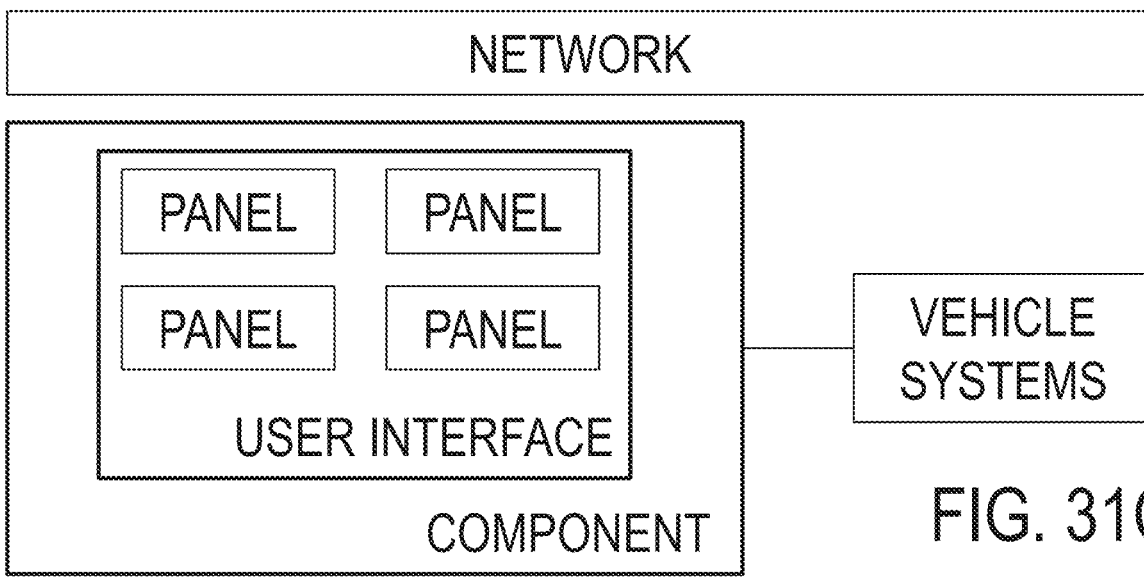
Figure 32:
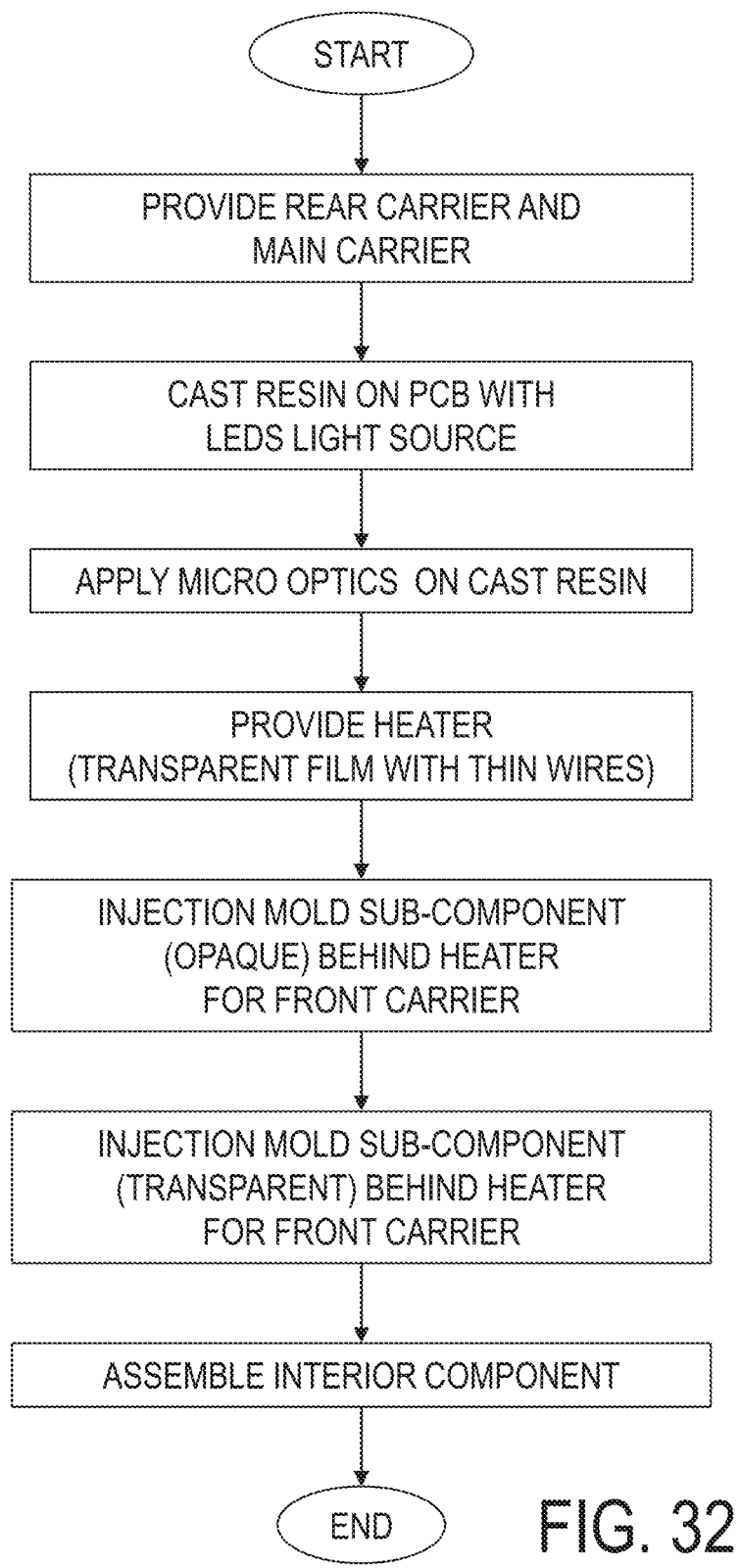
FIG. 32 is a schematic flow diagram of a method for forming a vehicle interior component according to an exemplary embodiment.
Figures 34A, 34B, 34C:
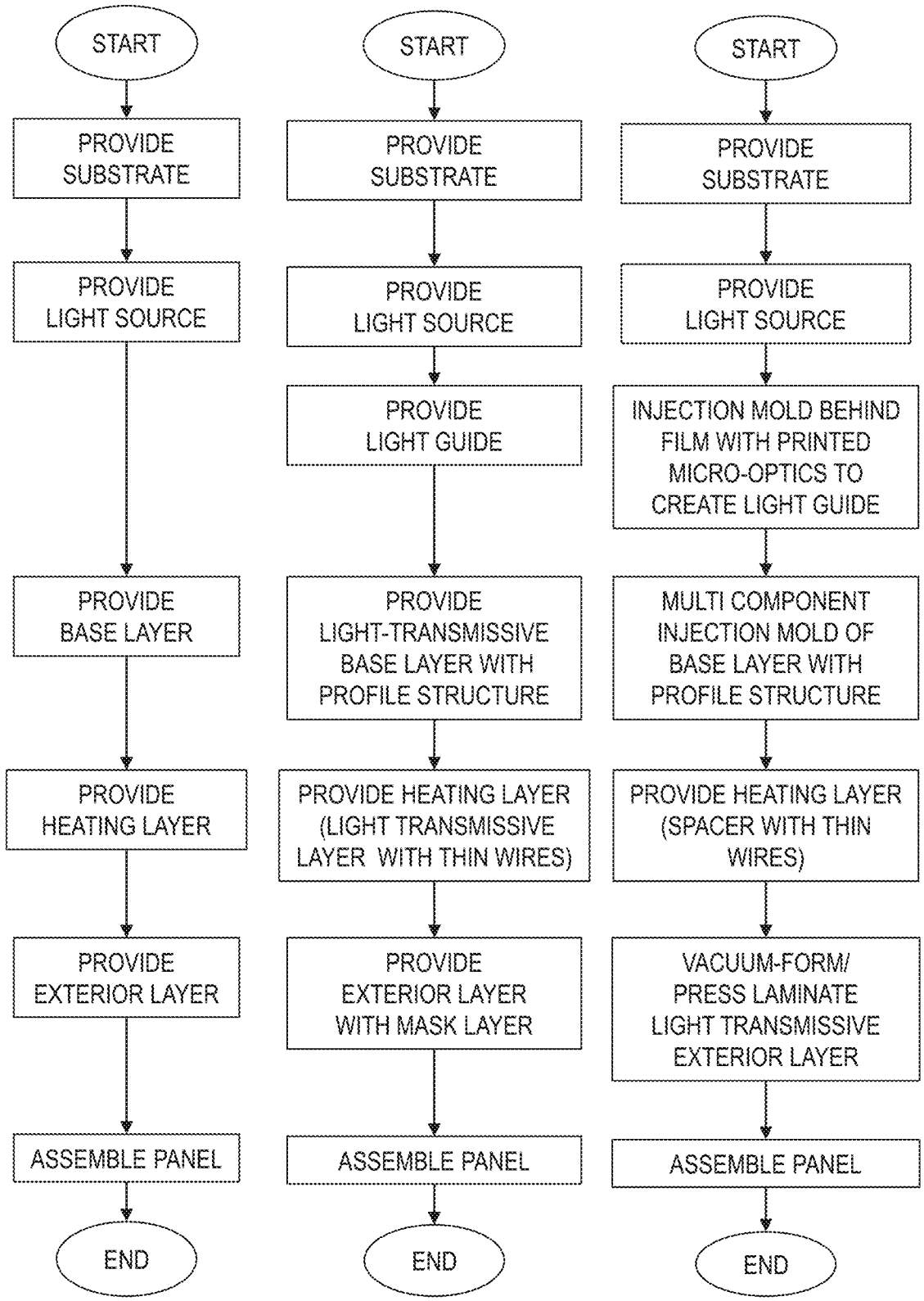
FIG. 34A to 34C are schematic flow diagrams of methods for forming a panel for a vehicle interior component according to an exemplary embodiment.
Figures 35A, 35B, 35C:
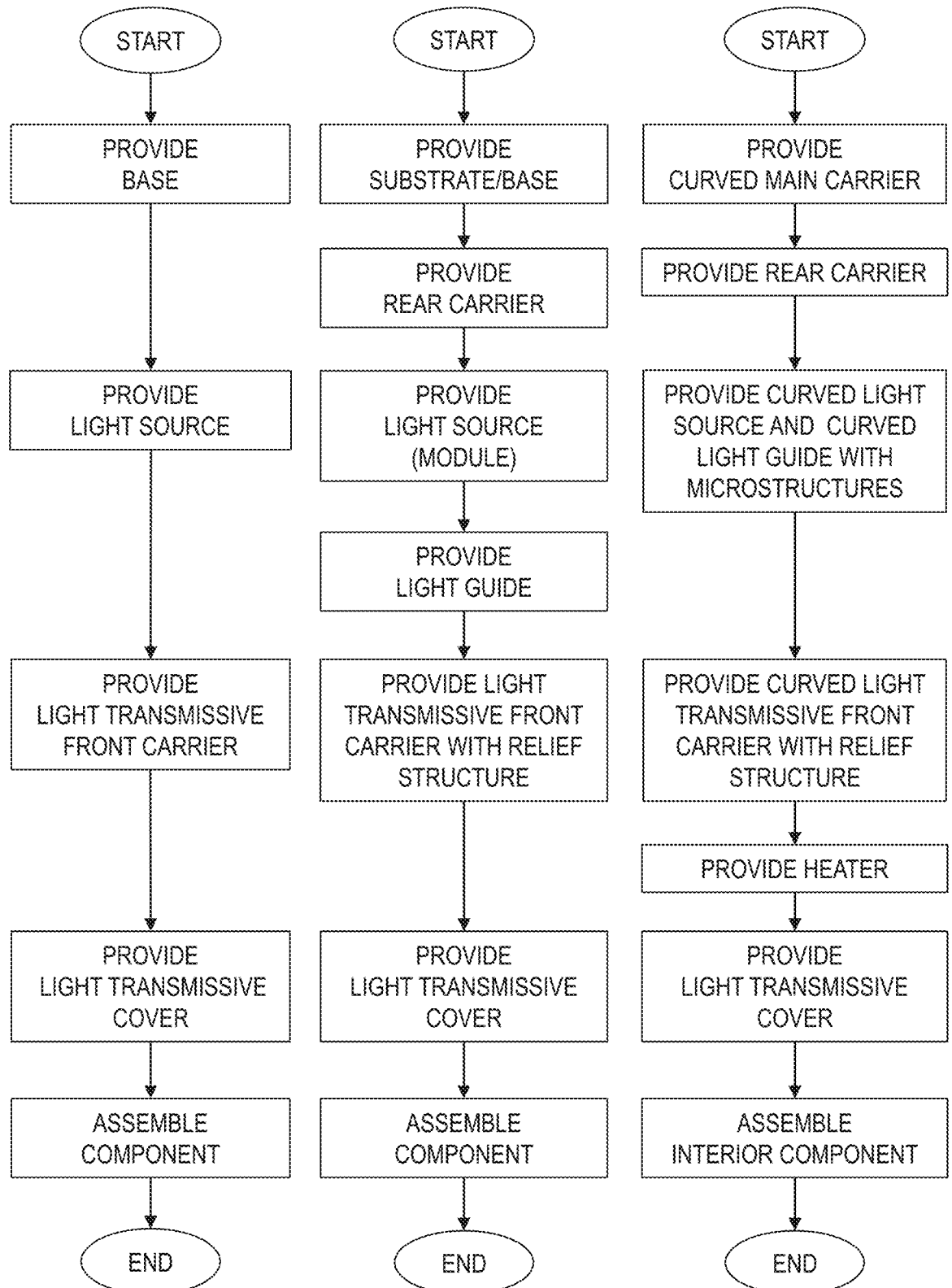
FIG. 35A to 35C are schematic flow diagrams of methods for forming a component according to an exemplary embodiment.
Figure 36A:
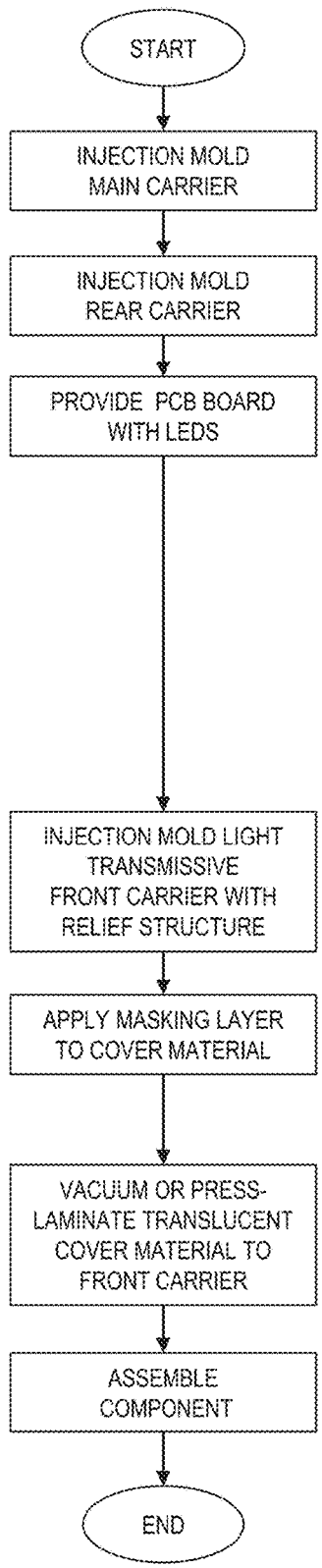
FIG. 36A to 36C are schematic flow diagrams of methods for forming a component according to an exemplary embodiment.
Figure 36B:
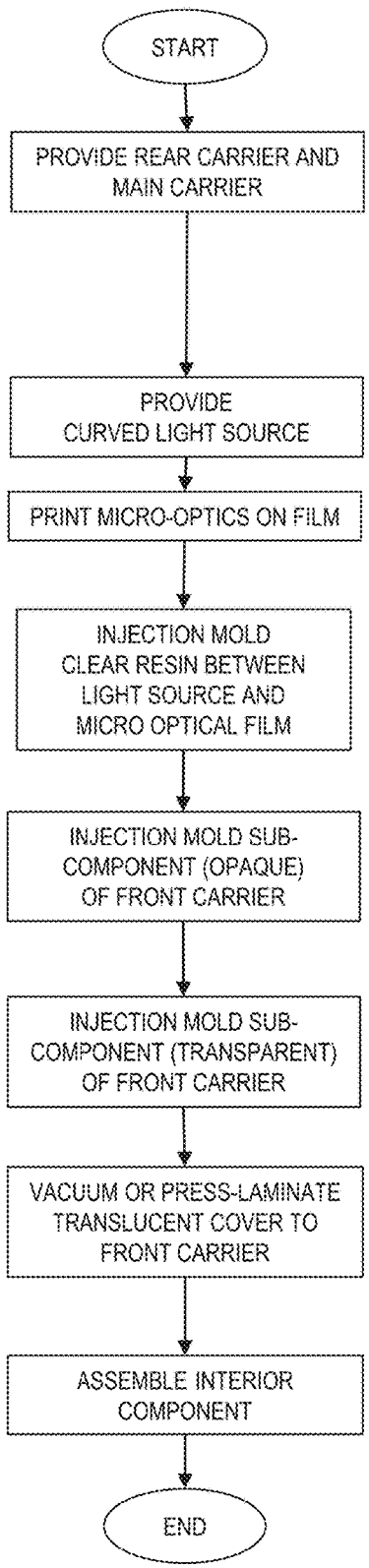
Figure 36C:
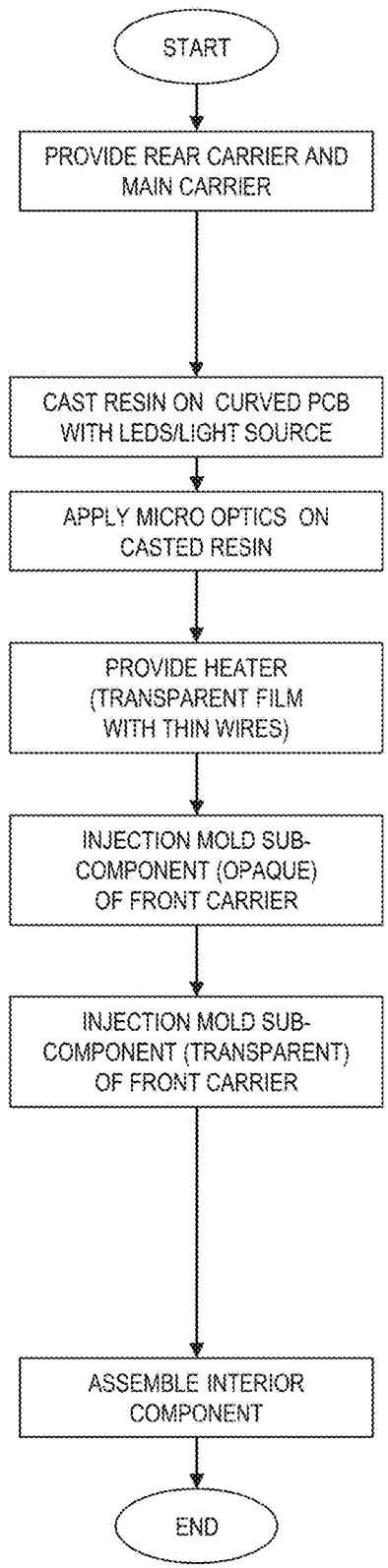

As shown schematically according to an exemplary embodiment in FIGS. 31A to 31C, the component providing user interface with a panel and/or panels may be integrated with vehicle systems and/or a network; operation of the user interface/panel may comprise localized action at the component or connected interaction such as output and/or input with and from vehicle systems and/or information/communications by connectivity with other network/data sources. See also FIGS. 1B, 2A-2I, 3A-3E, 4A-4B, 5A-5B, 6A-6B and 7A-7B. As shown schematically according to an exemplary embodiment in FIGS. 28A-28G and 31A to 31C, the component providing user interface with panel and/or panels may be integrated with vehicle systems and/or a network to provide any of a variety of effects including ambient effects, user-selectable ambient effects, user-responsive effects, system-selected effects, system/network information, images, variations, dynamic effects, dynamic lighting effects, etc. at a user interface of the component. As shown schematically according to an exemplary embodiment in FIGS. 1B, 2A-2I and 31A-31C, the component may comprise one panel providing a user interface or multiple panels each configured to provide a user interface; a user interface may comprise output such as an illumination effect (e.g. lighting, image, etc.) and/or input such as from an input device (e.g. sensor, switch, button, operator control, etc.). A user interface may also be configured to provide haptic feedback, sound, etc.; as indicated schematically, a variety of different types of user interface configurations may be provided.

As shown schematically according to an exemplary embodiment in FIGS. 29A-29B, 32, 33A-33C, 34A-34C, 35A-35C and 36A-36C, the panel with component and/or component may be produced/manufactured by any of a variety of methods/processes.

Figure 37:
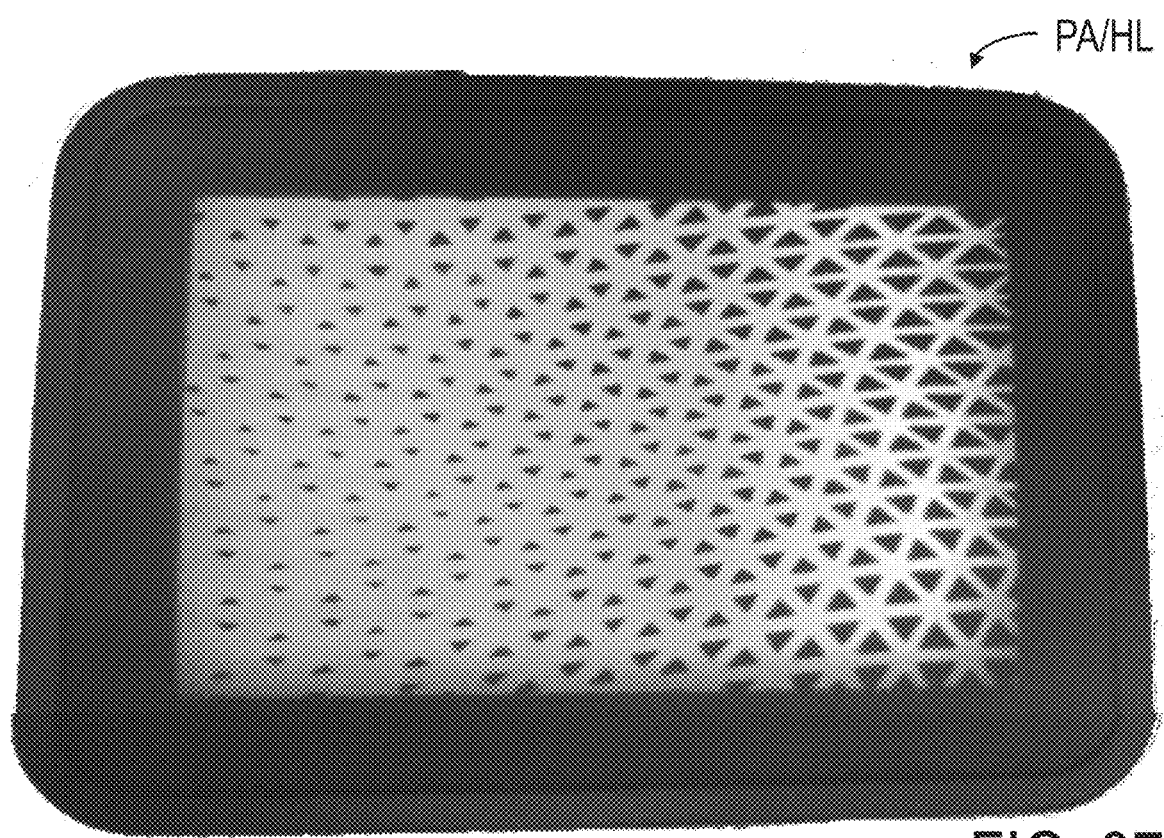
FIG. 37 is a schematic diagram of a visual effect of a panel with integrated heating element for a vehicle interior component according to an exemplary embodiment.
Figure 38:
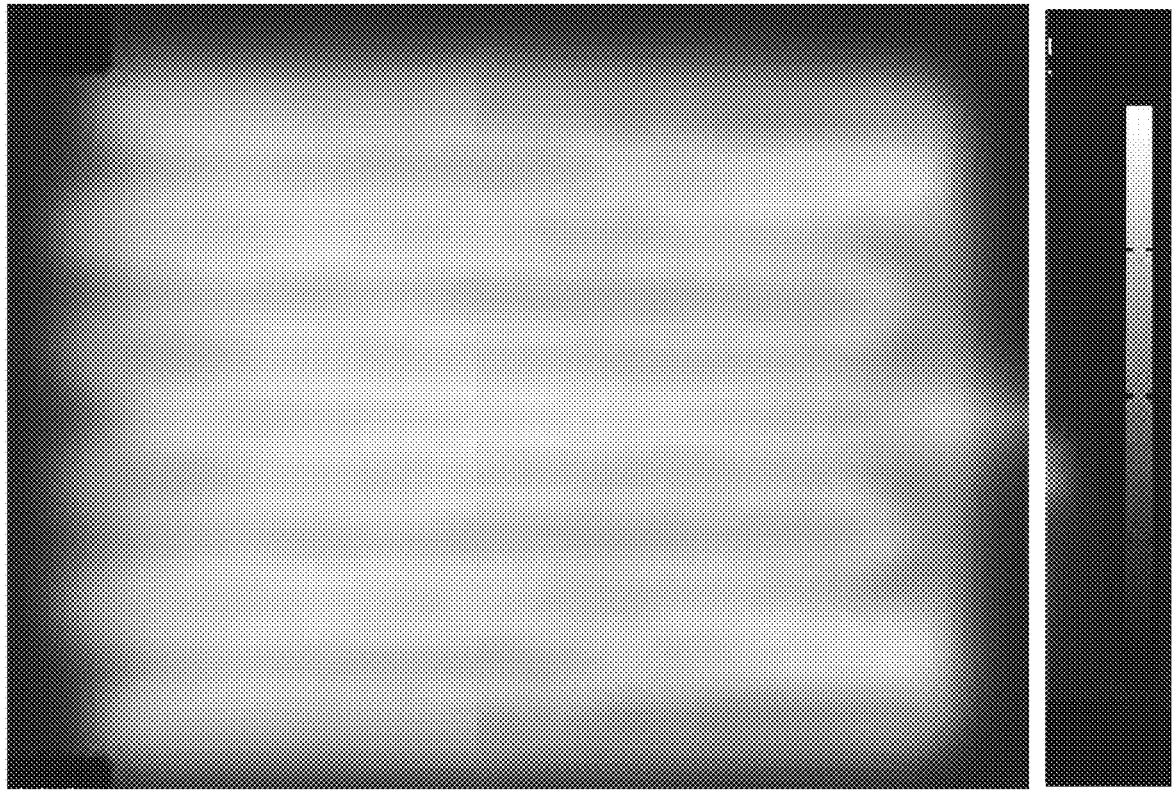
FIG. 38 is a schematic diagram representative of thermographic imaging of a panel with integrated heating element for a vehicle interior component according to an exemplary embodiment.

FIGS. 37 and 38 are schematic diagrams of a visual effect and of representative thermographic imaging of a panel PA with integrated heating element HL for a vehicle interior component according to an exemplary embodiment; as indicated schematically, the heating element/wires are configured to be generally concealed from appearance in the visual effect but will provide generally uniform heating/temperature across the surface of the panel to provide for enhanced/reliable comfort in the vehicle interior.

Exemplary Embodiments

According to an exemplary embodiment as shown schematically in the figures, a component for a vehicle interior configured to be illuminated by light from a light source may comprise a substrate, a light guide and a cover comprising an exterior surface. The light guide may be configured to transmit light between the substrate and the cover. The cover may be at least partially light-transmissive. The cover may be configured to present an effect on the exterior surface. The effect may comprise an illumination effect when illuminated by light from the light source. The cover may comprise a profile. The profile may be configured to present the effect; the effect may comprise a visual effect and a surface effect. The effect may comprise a visual effect. The cover may be configured to present a user interface; the user interface may comprise the illumination effect. The illumination effect may comprise a dynamic lighting effect. The cover may comprise a cover base and a cover layer. The cover base may comprise a carrier. The cover base may comprise a carrier for the light guide. The cover may comprise a cover base/base layer and a cover layer configured to present the effect. The cover may comprise the light guide. The cover may comprise a profile; the profile of the cover may be configured to present the effect; the effect may comprise a visual effect and a surface effect. The effect may comprise a visual effect. The component may comprise a heating element. The heating element may comprise a foil. The cover may comprise a cover base and a cover layer; the heating element may be between the cover base and the cover layer. The effect may be configured to conceal the heating element. The illumination effect at the exterior surface of the cover may be configured to conceal the heating element. The heating element may comprise a set of heating wires. The heating wires may be concealed by the effect. The cover may comprise a profile; the heating wires may be provided on the profile. The profile may comprise a three-dimensional form at the cover. The profile at the cover may be configured to form the heating element behind the cover. The heating element may comprise a three-dimensional form behind the cover. The illumination effect at the exterior surface of the cover may be configured to conceal the heating element. The heating element may be configured for simultaneous operation with the illumination effect at the exterior surface of the cover. The cover may comprise at least one of a TPO, TPE, TPU. The profile may comprise a surface effect for the cover. The cover may be formed into a three-dimensional form for the surface effect. The cover may comprise a cover base and a cover layer; the cover base/base layer of the cover may be provided on the substrate. The cover layer may be formed into a three-dimensional form for the surface effect. The cover base may be formed into a three-dimensional form for the surface effect. The cover base may comprise a light-transmissive carrier. The cover base may comprise a transparent carrier. The cover base may comprise a light-transmissive carrier formed into a three-dimensional form. The cover base may comprise a three-dimensional form; the three-dimensional form may comprise a relief structure. The relief structure may comprise a profile for the cover. The cover may comprise a decorative layer. The cover may comprise a light-transmissive three-dimensional form with a decorative layer. The light guide may be optically coupled to the light source. The light source may comprise at least one LED. The light source may comprise a set of LED elements. The LED elements may comprise OLED elements, RGB-LED elements, smart LED (ISELED) elements (calibrated, digitally addressable), smart RGB LED modules with integrated driver, LED elements with smart LED driver, or other technology presently available (or that may become available). The light source may comprise a module. The component may comprise a module comprising the light source. The module may comprise a circuit board comprising a set of LED elements. The circuit board may comprise a flexible circuit board. The LED elements may comprise surface mount LEDs. The component may comprise an interface between the light source and the light guide. The component may comprise an interface at the light source and the light guide. The interface may comprise a mechanical connection. The component may comprise an interface for the light source and the light guide. The component may comprise an interface between the light source and the light guide. The interface may comprise an optical connection. The interface may comprise an optical coupling of the light source to the light guide. The interface may comprise a mechanical connection. The mechanical connection may comprise engagement between the light guide and the substrate. The engagement may comprise fit of the light guide into the substrate. The interface may comprise fit of the light guide into the substrate. The substrate may comprise a set of slots; the mechanical connection may comprise engagement of the light guide into the set of slots. The light guide may comprise a set of segments; the mechanical connection may comprise fit of the set of segments of the light guide into the set of slots/grooves of the substrate. The light guide may comprise a set of segments. The light guide may comprise a set of dividers between each set of segments. The substrate may comprise a set of dividers configured to provide an optical barrier. The substrate may comprise a set of dividers configured to provide an optical barrier between each set of segments. The substrate may comprise an opaque material. The substrate may comprise a set of ribs. The set of ribs may be configured to provide an optical barrier. The substrate may comprise a set of projections configured to provide an optical barrier. The substrate may comprise a set of projections configured to provide an optical barrier adjacent to the interface.

The light source may be configured to selectively illuminate each set of the set of segments of the light guide. The light source may comprise a set of LED elements configured to illuminate each set of the set of segments of the light guide. Each set of LED elements may comprise at least one LED element optically coupled to each set of segments of the light guide. The substrate may comprise a base. The substrate may comprise a housing. The substrate may comprise a carrier. The component may comprise a diffuser between the light source and the cover. The diffuser may comprise a light-transmissive layer. The diffuser may comprise a diffuser layer between the light guide and the cover. The component may comprise a mask layer between the substrate and the cover. The mask layer may be between the light guide and the cover. The mask layer may comprise an opaque material. The component may comprise a functional layer between the substrate and the cover. The functional layer may comprise a diffuser. The functional layer may comprise a spacer. The functional layer may comprise a spacer fabric. The functional layer may comprise a heating element such as a heating foil. The heating element/foil may comprise a set of wires. The functional layer may comprise a film. The functional layer may comprise an optical film. The functional layer may comprise micro-optical structures. The light guide may comprise micro-optical structures. The cover may be configured to present a user interface; the user interface may comprise the illumination effect. The user interface may comprise a light display. The user interface may comprise an input device. The illumination effect may comprise an ambient lighting effect for the vehicle interior. The illumination effect may comprise an alert for an occupant in the vehicle interior. The component may comprise a trim component. The component may comprise a panel. The panel may be configured for installation on a vehicle interior component. The panel may comprise a light display configured to provide the user interface on the vehicle interior component. The panel may be configured for installation on a door panel.

According to an exemplary embodiment as shown schematically in the FIGURES, a component for a vehicle interior configured to provide a user interface illuminated by light from a light source may comprise a base and a light-transmissive cover comprising an exterior surface. The base may comprise a housing. The cover may be configured to present an effect on the exterior surface. The effect may comprise an illumination effect when illuminated by light from the light source. The illumination effect may comprise a dynamic lighting effect. The component may comprise a light guide configured to transmit light to the cover. The component may comprise a light guide configured to transmit light through the cover. The cover may comprise a light guide. The light guide may comprise micro-optical structures. The light guide may comprise printed micro-optical structures. The light guide may comprise micro-optical structures on a three-dimensional form. The light guide may comprise micro-optical structures formed by injection molding. The cover may comprise a cover base/base layer and a cover layer. The dynamic lighting effect may comprise an ambient light for the vehicle interior. The dynamic lighting effect may comprise a signal for at least one vehicle system. The dynamic lighting effect may comprise an alert for an occupant of the vehicle interior. The dynamic lighting effect may comprise a user-selectable lighting effect for the vehicle interior. The dynamic lighting effect may comprise at least one of an ambient light for the vehicle interior and/or a signal for at least one vehicle system and/or an alert for an occupant of the vehicle interior and/or a warning from a vehicle system and/or a warning from a network and/or information from a vehicle system. The dynamic lighting effect may comprise a user-selectable lighting effect for the vehicle interior; the user-selectable lighting effect may comprise an ambient light effect. The dynamic light effect may comprise an on state with the illumination effect and an off state with no illumination effect. The illumination effect may comprise ambient lighting for the vehicle interior. The illumination effect may comprise a multi-color visual effect. The base may comprise an opaque material. The cover may comprise a substantially transparent cover base/base layer. The cover may comprise a mask layer. The component may comprise a module comprising the light source. The light source may comprise a set of LED elements. The illumination effect may comprise selective illumination of each set of LED elements of the light source. The component may comprise a light guide comprising a set of segments configured to be illuminated by the module. Where the base may comprise a set of dividers for each set of segments of the light guide. The base may comprise a housing; the cover may comprise a light guide configured to fit within the base. The illumination effect may comprise a gradient of light along the cover. The gradient may comprise variation in the illumination effect along the cover. The light source may comprise a side light. The light source may comprise a back light. The light source may comprise a display panel. The cover may comprise a cover base/base layer and a cover layer; the cover layer may comprise a decorative layer; the illumination effect may be presented at the decorative layer. The component may comprise a functional layer. The functional layer may comprise at least one of a light guide and/or a mask layer and/or a spacer layer and/or a diffuser layer and/or a heating element and/or a decorative layer and/or a positioning layer and/or a cushioning/padding layer and/or any of a variety of other elements/materials to provide a function for the panel/component. The functional layer may comprise a diffuser layer. The diffuser layer may comprise a spacer fabric. The diffuser layer may comprise a foam material. The diffuser layer may comprise a molded plastic material. The diffuser layer may be positioned between the light guide and the cover. The diffuser layer may be positioned between the light guide and the cover. The functional layer may comprise a diffuser; the diffuser may comprise a spacer fabric and/or a foam material and/or a plastic material and/or a molded plastic material and/or a diffuser layer. The component may comprise a heating element between the cover and the substrate. The component may comprise a heating element between the cover base/base layer and the cover layer. The component may comprise a heating element behind the cover. The cover may comprise a profile. The component may comprise a heating element with the profile of the cover. The heating element may be thermally formed into a three-dimensional form. The heating element may comprise heating wires formed into a three-dimensional form. The heating element may be formed into a three-dimensional form. The heating element may be thermo-formed into a three-dimensional form. The heating element may be molded into a three-dimensional form. The heating element may comprise a heating foil formed into a three-dimensional form. The heating element may be integrated with a light guide so that the illumination effect conceals the heating element. The heating element may comprise a conductive material comprising at least one of (a) wires; (b) copper alloy wires (c) carbon fiber wires; (d) light transmissive conductive polymers; (e) polyaniline (PANI) (f) light transmissive conductive ceramics; (g) indium tin oxide (ITO); (h) antimony tin oxide (ATO); (i) polyaniline (PANI); (j) Poly (3,4-ethylenedioxythiophene); (k) PEDOT; (l) PEDT; (m) EDOT. The heating element may comprise conductive wires stitched in loops to a spacer fabric or a non-woven fabric. The heating element may comprise conductive ceramics or polymers applied by a coating process to a foil or substrate. The heating element may provide a heated surface at the cover configured to provide uniformity of temperature at the cover and comfort. The illumination effect may be configured to provide information relating to the operation of the heating element. The dynamic lighting effect may comprise integration with the operation of the heating element; the dynamic lighting effect may comprise a color effect; the color effect may comprise red for warm and blue for cold.

According to an exemplary embodiment as shown schematically in the FIGURES, a component for a vehicle interior may comprise a first user interface comprising a panel comprising a substrate and a cover and a light source configured to provide light to present an illumination effect at the cover and a second user interface at the cover. The illumination effect of the first user interface may comprise a dynamic lighting effect. The panel of the first user interface may comprise a functional layer. The functional layer may comprise at least one of a light guide and/or a mask layer and/or a spacer layer and/or a diffuser layer and/or a heating element and/or a decorative layer. The cover of the first user interface may comprise a cover base/base layer and a cover layer. The cover of the first user interface may comprise a light-transmissive cover. The second user interface may comprise a panel configured to provide light to present an illumination effect at the cover. The panel of the second user interface may be behind a decorative layer of the cover. The second user interface may comprise a mechanical operator. The mechanical operator may comprise at least one of a dial and/or a button and/or a switch and/or a sensor. The second user interface may comprise a mechanical operator and a panel configured to provide light to present an illumination effect at the cover. The component may comprise a third user interface; the third user interface may comprise a panel. The third user interface may comprise an input device for at least one vehicle system. The panel may comprise a set of control elements. The panel may be configured to present an illumination effect. The panel may comprise at least one button. The component may comprise a fourth user interface; the fourth user interface may comprise a panel; the panel may comprise at least one switch. The fourth user interface may comprise output from an illumination effect and input detected at or adjacent to the cover. According to an exemplary embodiment, the user interface may comprise output from an illumination effect and input detected at or adjacent to the cover.

According to an exemplary embodiment as shown schematically in the FIGURES, a method of manufacturing a component into a three-dimensional form for a vehicle interior may comprise the steps of providing a substrate and providing a light-transmissive cover with an external surface on the substrate. The cover may be formed by at least one of injection molding, deep-draw forming, vacuum forming, lamination; so that the component may comprise the three-dimensional form; so that the cover may be configured to transmit light from a light source to provide an effect at the external surface. The method may comprise the step of providing a light guide behind the cover. The method of may comprise the step of providing a light guide for the cover. The method may comprise the step of providing a decorative layer on the cover. The step of providing a light-transmissive cover may comprise the step of forming a light-transmissive cover base and a cover layer for the cover. The three-dimensional form may comprise a profile for the cover. The method may comprise the step of forming a heating element for the component; the heating element may be provided by at least one of injection molding, thermo-forming, vacuum forming, deep-draw forming, lamination, stamping. The step of providing a light-transmissive cover may comprise the step of forming a light-transmissive cover base and a cover layer for the cover; the heating element may be formed between the cover base and the cover layer. The heating element may comprise the profile. The heating element may be integrated and concealed within the component. The method may comprise the step of forming the light source on a base by at least one of (a) as a polymer resin casting with LED elements on the base or (b) as surface-mount LED elements arranged on the base; wherein the base comprises at least one of a flexible board and/or a flexible circuit board and/or a flexible film and/or a formable film.

According to an exemplary embodiment, a vehicle interior component may comprise a panel comprising a substrate and cover with exterior surface that may be configured to present a user interface. The panel/user interface may be illuminated by light from a light source. A light guide may be configured to transmit light from a light source to the cover; the cover may be at least partially light-transmissive. The cover may comprise a profile such as a three-dimensional form/shape. The panel may produce an effect such as a surface effect, illumination effect when illuminated by light, visual effect, etc. The illumination effect may comprise a dynamic lighting effect. The panel may comprise an integrated heating element; the heating element may be formed with the profile. The light source may comprise an LED arrangement. The component may comprise a door panel, instrument panel, console, etc. The component may comprise multiple panels/user interfaces.

According to an exemplary embodiment as shown schematically in the FIGURES, a component may be provided for an interior of a vehicle. The component may comprise a trim panel. The component may comprise a housing such as a rear housing, a light source and a base/substrate such as a main carrier. The component may comprise a three-dimensional form/shape such as profile as may be formed in a relief-structured carrier and/or a relief-structured cover layer. The relief-structured carrier may be formed form a light transmissive material. The relief-structured carrier may comprise at least two injection molded materials. The materials may have different light transparency grades. The relief structured cover layer may be light transmissive. The component may comprise a light guide. The light guide may comprise a micro-structured surface. The light guide may comprise micro-structures prepared by a forming, printing, engraving or a lasering process. The light guide may be in direct contact with the light source. The component may comprise a light diffuser. The light diffuser may comprise at least one of foam; a non-woven fabric; a spacer fabric; polymeric resin; a plastic film; a plastic sheet. The component may comprise a heating layer. The heating layer may comprise a relief-structured heating layer and/or be integrated within the component (e.g. for uniform thermal performance/distribution of heat to the vehicle interior as to provide comfort for occupants). The heating layer may comprise a plastic film. The heating layer may comprise at least one of thin electrical conductive wires; conductive ink; printed conductive ink; a conductive foil. The component may comprise a functional layer to improve heat insulation and/or haptics. The functional layer may comprise at least one of a foam; a spacer fabric; a non-woven fabric. The functional layer may be light transmissive. The component may comprise a mask layer and/or other optical/light barriers for directed presentation of light at the user interface for an illumination effect. The visual/illumination effect may comprise a dynamic lighting effect including an image, color-effects, information, alerts, ambient lighting variations for the interior, user-selectable lighting, etc. The component may comprise multiple panels; each panel may present a user interface for interaction with a vehicle occupant by output and/or input.

Construction/Materials of Construction and Formation/Assembly Methods

As shown schematically according to an exemplary embodiment in FIGS. 29A-29B, 32, 33A-33C, 34A-34C, 35A-35C and 36A-36C, the panel for the component and/or component comprising the substrate with cover and/or light guide and functional layer, etc. may be produced/manufactured by any of a variety of methods/processes.

According to an exemplary embodiment as indicated schematically in FIGS. 10A-10B, 11A-11B, 12A-12B, 13A-13B, 14A-14B, 15A-15B, 16A-16L, 21A-21B, 22A-22D, 23A-23C, 24A-24B, 25A-25B, 26A-26D and 27A-27D, the panel may comprise a substrate and/or housing and/or cover/base that may comprise a materials such a plastic, resin, polypropylene, PC, PMMA, other thermoplastic resins, etc.; the cover may comprise the base and an exterior layer that comprises a TPE, TPO, TPU, fabric/leather material (authentic or synthetic), woven material, non-woven material, etc. and/or combinations of layers of cover materials; forming may comprises molding, injection molding, vacuum forming, vacuum lamination, in-mold grain forming, etc.; various such forming processes and/or other methods can be used to provide the profile, shape, form, etc.

As indicated schematically in FIGS. 4B, 5B, 16C, 16F, 16I, 17A-17F, 18, 19A-19D, 20A-20E, 21A-21B, 26A-26D and 27A-27D, the panel may comprise a functional layer that may comprise at least one of a light guide and/or a mask layer and/or a spacer layer and/or a diffuser layer and/or a heating element and/or a decorative layer and/or a positioning layer and/or a cushioning/padding layer and/or any of a variety of other elements/materials to provide a function for the panel/component. According to an exemplary embodiment, the functional layer may comprise a spacer, a spacer fabric, a fabric, a foam, a plastic material, a positioning material/layer, etc.; the functional layer may comprise a light/optical diffuser, a diffuser layer, a diffuser material, etc.; the functional layer may comprise a rigid/semi-rigid/flexible material (e.g. a light-transmissive material/plastic, polycarbonate (PC), polymethacrylate (PMMA), etc.) and/or soft material (e.g. foam, padding for touch surfaces, light-transmissive foam/material, etc.); the functional layer may comprise multiple functions, multiple layers and/or multiple materials, etc.

According to an exemplary embodiment as indicated in FIGS. 4B, 5B, 16C, 16F, 16I, 17A-17F, 18, 19A-19D, 20A-20E, 21A-21B, 26A-26D and 27A-27D, the panel may comprise light-transmissive materials that generally may be generally translucent, generally transparent, generally light-transmissive, with colorants/pigments, with shading, generally clear, with clays, with nano-particles, etc.

According to an exemplary embodiment, light-transmissive materials such as for the light guide and/or light diffuser and/or substrate and/or film and/or micro-optical structures may generally comprise plastic/resin materials, injection moldable materials, deposited/printed materials, light-transmissive material/plastic, polycarbonate (PC), polymethacrylate (PMMA), generally clear PC/PMMA, etc. (e.g. with properties to facilitate light transmission and distribution from the light source with uniformity, intensity/amplitude, reduced distortion such as spots and lines, etc.); forming may comprise molding, injection molding, vacuum forming, vacuum lamination, in-mold grain forming, etc.; assembly may comprise treatments, finishing, adhesives, bonding, drilling, laser treatment, painting, coating, etc.

According to an exemplary embodiment, a mask layer may comprise materials such as a film, a coating, paint, ink, resin, plastic, etc. (e.g. as a generally opaque layer in the indicated location) and/or with ablation, laser ablation, laser treatment, painting, etching, engraving, multi-component forming/molding, etc.

Materials of construction, forming/assembly, etc. may generally be as provided in U.S. Pat. No. 11,104,229 (which patent/disclosure is incorporated by reference in full in the present application/disclosure).

REFERENCE SYMBOL LIST

| ELEMENT, PART OR COMPONENT | REFERENCE SYMBOL |
|---|---|
| Component | C |
| Door panel | DP |
| Door panel trim | DT |
| Door armrest | AR |
| Diffuser | DL |
| Effect (visual, surface, illumination, decorative, etc.) | EF |
| Floor Console | FC |
| Functional layer (spacer, fabric, spacer fabric, diffuser, heating layer, etc.) | FL |
| Heating element connector (plug) | HC |
| Heating element (foil, grid, mesh, web, etc.) | HL |
| Heating wire | HW |
| Interior | I |
| Image (e.g. at user interface) | IM |
| Interface (optical connection, optical coupling, mechanical connection, etc.) | IN |
| Instrument panel | IP |
| Light | L |
| Lighting base | LB |
| LED (LED array, LED lamp, LED element, LED elements, OLED, ISELED, etc.) | LED |
| Light guide | LG |
| Light source | LS |
| Light panel | LP |
| Module | M |
| Mask layer | ML |
| Film (decorative film, optical film, film with micro optical structures, etc.) | OF |
| Panel (user interface) | PA |
| Panel (user interface) | PB |
| Panel (user interface) | PC |
| Panel (user interface) | PD |
| Panel (user interface) | PE |
| Circuit board (e.g, printed circuit board, flat, curved, flexible, rigid, etc.) | PCB |
| Profile (e.g. surface, contour, shape, texture, form, etc.) | PR |
| Sensor/sensor grid (with module, for input device, etc.) | SG |
| Substrate (carrier, housing, etc.) | SB |
| Speaker | SP |
| Seat | ST |
| Input device (operator control dial, switch, button, etc.) | SW |
| Cover (composite) | TC |
| Cover base (base layer, carrier, light-transmissive carrier, etc.) | TB |
| Cover layer (exterior layer, decorative layer, etc.) | TX |
| User interface | UI |
| Vehicle | V |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to be illuminated by light from a light source comprising:
    (a) a substrate;
    (b) a light guide; and
    (c) a cover comprising an exterior surface;
    wherein the light guide is configured to transmit light between the substrate and the cover;
    wherein the cover comprises a cover layer comprising a three-dimensional form comprising a profile;
    wherein the cover is at least partially light-transmissive;
    wherein the cover is configured to present an effect on the exterior surface;
    wherein the effect comprises an illumination effect when illuminated by light from the light source;
    wherein the effect comprises a surface effect configured to be provided by the profile of the cover layer;
    wherein the illumination effect comprises a dynamic lighting effect comprising light from the light source;
    wherein the light source comprises a set of LED elements configured to illuminate each set of a set of segments to provide the dynamic lighting effect;
    wherein a set of dividers is provided between each set of segments;
    wherein each set of dividers is configured to provide an optical barrier;
    wherein the light source is configured to selectively illuminate each set of the set of segments;
    wherein the set of LED elements comprises at least one LED element for a segment of the set of segments
    further comprising a heating element comprising a three-dimensional form comprising a profile;
    wherein the profile of the heating element is integrated with the profile of the cover layer so that the heating element is at least partially concealed at the exterior surface of the cover.

2. The component of claim 1 wherein the cover comprises a texture on the cover layer configured to present the effect; wherein the effect comprises a visual effect and a surface effect provided by the texture of the cover layer and by the three-dimensional form of the profile of the cover layer.

3. The component of claim 1 wherein the cover comprises a cover base and the cover layer; further comprising the heating element between the cover base and the cover layer.

4. The component of claim 3 wherein the heating element comprises a set of heating wires; wherein the cover comprises the profile; wherein the set of heating wires is provided within the profile; wherein the profile comprises a three-dimensional form at the cover.

5. The component of claim 3 wherein the heating element comprises a three-dimensional form behind the cover.

6. The component of claim 3 wherein the heating element is configured for simultaneous operation with the illumination effect at the exterior surface of the cover.

7. The component of claim 1 wherein the effect comprises a surface effect at the cover layer; wherein the cover is formed into a three-dimensional form comprising the profile for the surface effect at the cover layer; wherein the three-dimensional form comprising the profile at the cover layer comprises a relief-structured cover layer.

8. The component of claim 1 wherein the effect comprises a surface effect; wherein the cover comprises a cover base and the cover layer; wherein the cover layer is formed into the three-dimensional form and wherein the cover base is formed into a three-dimensional form for the surface effect.

9. The component of claim 1 wherein the light guide comprises micro-optical structures.

10. A component for a vehicle interior configured to provide a user interface illuminated by light from a light source comprising:
    (a) a base;
    (b) a light-transmissive cover comprising an exterior surface;
    wherein the base comprises a housing;
    wherein the cover is configured to present an effect on the exterior surface;
    wherein the effect comprises an illumination effect when illuminated by light from the light source;
    wherein the illumination effect comprises a dynamic lighting effect comprising light from the light source;
    wherein the light source comprises a set of LED elements configured to illuminate each set of a set of segments to provide the dynamic lighting effect;
    wherein a set of dividers is provided between each set of segments;
    wherein each set of dividers is configured to provide an optical barrier;
    wherein the light source is configured to selectively illuminate each set of the set of segments;
    wherein the set of LED elements comprises at least one LED element for a segment of the set of segments
    further comprising a heating element comprising a three-dimensional form comprising a profile;
    wherein the profile of the heating element is integrated with the profile of the cover layer so that the heating element is at least partially concealed at the exterior surface of the cover.

11. The component of claim 10 further comprising a light guide configured to transmit light from the light source to the cover; wherein the light guide comprises micro-optical structures on a three-dimensional form.

12. The component of claim 10 wherein the dynamic lighting effect comprises at least one of an ambient light for the vehicle interior or a signal for at least one vehicle system or an alert for an occupant of the vehicle interior or a warning from a vehicle system or a warning from a network and/or or information from a vehicle system or network.

13. The component of claim 10 wherein the light source comprises a set of LED elements; wherein the illumination effect comprises selective illumination of at least one LED element of the set of LED elements.

14. A component for a vehicle interior configured to be illuminated by light from a light source comprising:
    (a) a substrate;
    (b) a cover comprising an exterior surface;
    wherein the cover comprises a cover layer comprising a three-dimensional form comprising a profile;
    wherein the cover is at least partially light-transmissive;
    wherein the cover is configured to present an effect on the exterior surface;
    wherein the effect comprises an illumination effect when illuminated by light from the light source;
    wherein the effect comprises a surface effect configured to be provided by the profile of the cover layer;

wherein the illumination effect comprises a dynamic lighting effect comprising light from the light source;

wherein the light source comprises a set of LED elements configured to illuminate each set of a set of segments to provide the dynamic lighting effect;

wherein a set of dividers is provided between each set of segments;

wherein each set of dividers is configured to provide an optical barrier;

wherein the light source is configured to selectively illuminate each set of the set of segments;

wherein the set of LED elements comprises at least one LED element for a segment of the set of segments further comprising a heating element comprising a three-dimensional form comprising a profile;

wherein the profile of the heating element is integrated with the profile of the cover layer so that the heating element is at least partially concealed at the exterior surface of the cover.

\* \* \* \* \*